(12) United States Patent
Steinberg

(10) Patent No.: US 9,188,994 B2
(45) Date of Patent: *Nov. 17, 2015

(54) SYSTEM AND METHOD FOR OPTIMIZING USE OF PLUG-IN AIR CONDITIONERS AND PORTABLE HEATERS

(71) Applicant: EcoFactor, Inc., Millbrae, CA (US)

(72) Inventor: John Douglas Steinberg, Millbrae, CA (US)

(73) Assignee: EcoFactor, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/263,762

(22) Filed: Apr. 28, 2014

(65) Prior Publication Data

US 2014/0229018 A1   Aug. 14, 2014

Related U.S. Application Data

(63) Continuation of application No. 13/725,447, filed on Dec. 21, 2012, now Pat. No. 8,712,590, which is a continuation of application No. 13/329,117, filed on Dec. 16, 2011, now Pat. No. 8,340,826, which is a continuation of application No. 12/860,821, filed on Aug. 20, 2010, now Pat. No. 8,090,477.

(51) Int. Cl.
*G05D 23/19* (2006.01)
*F24F 11/00* (2006.01)

(52) U.S. Cl.
CPC ............... *G05D 23/19* (2013.01); *F24F 11/00* (2013.01); *G05D 23/1923* (2013.01); *F24F 2011/0046* (2013.01)

(58) Field of Classification Search
CPC ..... G05D 23/19; G05D 23/1923; F24F 11/00; F24F 2011/0046

USPC ................. 700/276, 277, 278, 295, 299, 300; 236/91 D, 91 E, 91 F; 340/12.32

See application file for complete search history.

(56) References Cited

U.S. PATENT DOCUMENTS

| 4,136,732 A | 1/1979 | Demaray et al. |
| 4,341,345 A | 7/1982 | Hammer et al. |

(Continued)

FOREIGN PATENT DOCUMENTS

| EP | 0415747 A2 | 3/1991 |
| JP | 05-189659 | 7/1993 |

(Continued)

OTHER PUBLICATIONS

U.S. Appl. No. 13/470,074, Aug. 30, 2012, Steinberg.

(Continued)

*Primary Examiner* — Charles Kasenge
(74) *Attorney, Agent, or Firm* — Knobbe, Martens, Olson & Bear, LLP

(57) ABSTRACT

Thermostatic HVAC and other energy management controls that are connected to a computer network. For instance, remotely managed load switches incorporating thermostatic controllers inform an energy management system, to provide enhanced efficiency, and to verify demand response with plug-in air conditioners and heaters. At least one load control device at a first location comprises a temperature sensor and a microprocessor. The load control device is configured to connect or disconnect electrical power to the an attached air conditioner or heater, and the microprocessor is configured to communicate over a network. In addition, the load control device is physically separate from an air conditioner or heater but located inside the space conditioned by the air conditioner or heater.

20 Claims, 47 Drawing Sheets

(56) References Cited

U.S. PATENT DOCUMENTS

| | | |
|---|---|---|
| 4,403,644 A | 9/1983 | Hebert |
| 4,475,685 A | 10/1984 | Grimado et al. |
| 4,655,279 A | 4/1987 | Harmon |
| 4,674,027 A | 6/1987 | Beckey |
| 5,124,502 A | 6/1992 | Nelson et al. |
| 5,244,146 A | 9/1993 | Jefferson et al. |
| 5,270,952 A | 12/1993 | Adams et al. |
| 5,314,004 A | 5/1994 | Strand et al. |
| 5,348,078 A | 9/1994 | Dushane et al. |
| 5,462,225 A | 10/1995 | Massara et al. |
| 5,544,036 A | 8/1996 | Brown et al. |
| 5,555,927 A | 9/1996 | Shah |
| 5,572,438 A | 11/1996 | Ehlers et al. |
| 5,682,949 A | 11/1997 | Ratcliffe et al. |
| 5,706,190 A * | 1/1998 | Russ et al. ............... 700/9 |
| 5,717,609 A | 2/1998 | Packa et al. |
| 5,725,148 A | 3/1998 | Hartman |
| 5,729,474 A | 3/1998 | Hildebrand et al. |
| 5,818,347 A | 10/1998 | Dolan et al. |
| 5,839,654 A * | 11/1998 | Weber ............... 236/47 |
| 5,977,964 A | 11/1999 | Williams et al. |
| 6,079,626 A | 6/2000 | Hartman |
| 6,115,713 A | 9/2000 | Pascucci et al. |
| 6,145,751 A | 11/2000 | Ahmed |
| 6,178,362 B1 | 1/2001 | Woolard et al. |
| 6,241,156 B1 | 6/2001 | Kline et al. |
| 6,260,765 B1 | 7/2001 | Natale et al. |
| 6,351,693 B1 | 2/2002 | Monie et al. |
| 6,400,956 B1 | 6/2002 | Richton |
| 6,400,996 B1 | 6/2002 | Hoffberg et al. |
| 6,437,692 B1 | 8/2002 | Petite et al. |
| 6,478,233 B1 | 11/2002 | Shah |
| 6,480,803 B1 | 11/2002 | Pierret et al. |
| 6,483,906 B1 | 11/2002 | Iggulden et al. |
| 6,536,675 B1 | 3/2003 | Pesko et al. |
| 6,542,076 B1 | 4/2003 | Joao |
| 6,549,130 B1 | 4/2003 | Joao |
| 6,574,537 B2 | 6/2003 | Kipersztok et al. |
| 6,580,950 B1 | 6/2003 | Johnson et al. |
| 6,594,825 B1 | 7/2003 | Goldschmidt Iki et al. |
| 6,595,430 B1 | 7/2003 | Shah |
| 6,598,056 B1 | 7/2003 | Hull et al. |
| 6,619,555 B2 | 9/2003 | Rosen |
| 6,622,097 B2 | 9/2003 | Hunter |
| 6,622,115 B1 | 9/2003 | Brown et al. |
| 6,622,925 B2 | 9/2003 | Carner et al. |
| 6,622,926 B1 | 9/2003 | Sartain et al. |
| 6,628,997 B1 | 9/2003 | Fox et al. |
| 6,633,823 B2 | 10/2003 | Bartone et al. |
| 6,643,567 B2 | 11/2003 | Kolk et al. |
| 6,644,098 B2 | 11/2003 | Cardinale et al. |
| 6,671,586 B2 | 12/2003 | Davis et al. |
| 6,695,218 B2 | 2/2004 | Fleckenstein |
| 6,700,224 B2 | 3/2004 | Biskup, Sr. |
| 6,726,113 B2 | 4/2004 | Guo |
| 6,731,992 B1 | 5/2004 | Ziegler |
| 6,734,806 B1 | 5/2004 | Cratsley |
| 6,772,052 B1 | 8/2004 | Amundsen |
| 6,785,592 B1 | 8/2004 | Smith |
| 6,785,630 B2 | 8/2004 | Kolk |
| 6,786,421 B2 | 9/2004 | Rosen |
| 6,789,739 B2 | 9/2004 | Rosen |
| 6,845,918 B2 * | 1/2005 | Rotondo ............... 236/46 R |
| 6,853,959 B2 | 2/2005 | Ikeda et al. |
| 6,868,293 B1 | 3/2005 | Schurr |
| 6,868,319 B2 | 3/2005 | Kipersztok et al. |
| 6,882,712 B1 | 4/2005 | Iggulden et al. |
| 6,889,908 B2 | 5/2005 | Crippen et al. |
| 6,891,838 B1 | 5/2005 | Petite et al. |
| 6,912,429 B1 | 6/2005 | Bilger |
| 6,991,029 B2 | 1/2006 | Orfield et al. |
| 7,009,493 B2 | 3/2006 | Howard |
| 7,031,880 B1 | 4/2006 | Seem et al. |
| 7,039,532 B2 | 5/2006 | Hunter |
| 7,061,393 B2 | 6/2006 | Buckingham et al. |
| 7,089,088 B2 | 8/2006 | Terry et al. |
| 7,130,719 B2 | 10/2006 | Ehlers et al. |
| 7,130,832 B2 | 10/2006 | Bannai et al. |
| H2176 H | 12/2006 | Meyer et al. |
| 7,167,079 B2 | 1/2007 | Smyth et al. |
| 7,187,986 B2 | 3/2007 | Johnson et al. |
| 7,205,892 B2 | 4/2007 | Luebke et al. |
| 7,206,670 B2 | 4/2007 | Pimputkar et al. |
| 7,215,746 B2 | 5/2007 | Iggulden et al. |
| 7,216,015 B2 | 5/2007 | Poth |
| 7,231,424 B2 | 6/2007 | Bodin et al. |
| 7,232,075 B1 | 6/2007 | Rosen |
| 7,242,988 B1 | 7/2007 | Hoffberg et al. |
| 7,260,823 B2 | 8/2007 | Schlack et al. |
| 7,356,384 B2 | 4/2008 | Gull et al. |
| 7,476,020 B2 | 1/2009 | Zufferey et al. |
| 7,483,964 B1 | 1/2009 | Jackson et al. |
| 7,644,869 B2 | 1/2010 | Hoglund et al. |
| 7,702,424 B2 | 4/2010 | Cannon et al. |
| 7,758,729 B1 | 7/2010 | DeWhitt |
| 7,784,704 B2 | 8/2010 | Harter |
| 7,848,900 B2 | 12/2010 | Steinberg et al. |
| 7,869,904 B2 | 1/2011 | Cannon et al. |
| 7,894,943 B2 | 2/2011 | Sloup et al. |
| 7,908,116 B2 | 3/2011 | Steinberg et al. |
| 7,908,117 B2 | 3/2011 | Steinberg et al. |
| 8,010,237 B2 | 8/2011 | Cheung et al. |
| 8,019,567 B2 | 9/2011 | Steinberg et al. |
| D646,990 S | 10/2011 | Rhodes |
| 8,090,477 B1 | 1/2012 | Steinberg |
| 8,131,497 B2 | 3/2012 | Steinberg et al. |
| 8,131,506 B2 | 3/2012 | Steinberg et al. |
| D659,560 S | 5/2012 | Rhodes |
| 8,180,492 B2 | 5/2012 | Steinberg |
| 8,340,826 B2 | 12/2012 | Steinberg |
| D673,467 S | 1/2013 | Lee et al. |
| 8,412,488 B2 | 4/2013 | Steinberg et al. |
| 8,423,322 B2 | 4/2013 | Steinberg et al. |
| 8,457,797 B2 | 6/2013 | Imes et al. |
| 8,498,753 B2 | 7/2013 | Steinberg et al. |
| 8,556,188 B2 | 10/2013 | Steinberg |
| 8,596,550 B2 | 12/2013 | Steinberg et al. |
| 8,712,590 B2 | 4/2014 | Steinberg |
| 8,738,327 B2 | 5/2014 | Steinberg et al. |
| 8,740,100 B2 | 6/2014 | Steinberg |
| 8,751,186 B2 | 6/2014 | Steinberg et al. |
| 8,840,033 B2 | 9/2014 | Steinberg |
| 8,850,348 B2 | 9/2014 | Fadell et al. |
| 8,886,488 B2 | 11/2014 | Steinberg et al. |
| 2003/0040934 A1 | 2/2003 | Skidmore et al. |
| 2004/0176880 A1 | 9/2004 | Obradovich et al. |
| 2005/0222889 A1 | 10/2005 | Lai et al. |
| 2005/0288822 A1 | 12/2005 | Rayburn |
| 2006/0045105 A1 | 3/2006 | Dobosz et al. |
| 2006/0214014 A1 | 9/2006 | Bash et al. |
| 2007/0043477 A1 | 2/2007 | Ehlers et al. |
| 2007/0045431 A1 | 3/2007 | Chapman et al. |
| 2007/0146126 A1 | 6/2007 | Wang |
| 2008/0083234 A1 | 4/2008 | Krebs et al. |
| 2008/0083834 A1 * | 4/2008 | Krebs et al. ............... 237/2 A |
| 2008/0198549 A1 | 8/2008 | Rasmussen et al. |
| 2008/0221737 A1 * | 9/2008 | Josephson et al. ............. 700/276 |
| 2008/0281472 A1 | 11/2008 | Podgorny et al. |
| 2009/0052859 A1 | 2/2009 | Greenberger et al. |
| 2009/0099699 A1 | 4/2009 | Steinberg et al. |
| 2009/0125151 A1 | 5/2009 | Steinberg et al. |
| 2009/0240381 A1 | 9/2009 | Lane |
| 2009/0281667 A1 | 11/2009 | Masui et al. |
| 2010/0019052 A1 | 1/2010 | Yip |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0156608 A1 | 6/2010 | Bae et al. |
| 2010/0162285 A1 | 6/2010 | Cohen et al. |
| 2010/0211224 A1 | 8/2010 | Keeling et al. |
| 2010/0235004 A1 | 9/2010 | Thind |
| 2010/0282857 A1 | 11/2010 | Steinberg |
| 2010/0289643 A1 | 11/2010 | Trundle et al. |
| 2010/0318227 A1 | 12/2010 | Steinberg et al. |

(56) References Cited

U.S. PATENT DOCUMENTS

| | | |
|---|---|---|
| 2011/0031323 A1 | 2/2011 | Nold et al. |
| 2011/0046792 A1 | 2/2011 | Imes et al. |
| 2011/0046798 A1 | 2/2011 | Imes et al. |
| 2011/0046799 A1 | 2/2011 | Imes et al. |
| 2011/0046800 A1 | 2/2011 | Imes et al. |
| 2011/0046801 A1 | 2/2011 | Imes et al. |
| 2011/0051823 A1 | 3/2011 | Imes et al. |
| 2011/0054699 A1 | 3/2011 | Imes et al. |
| 2011/0054710 A1 | 3/2011 | Imes et al. |
| 2011/0173542 A1 | 7/2011 | Imes et al. |
| 2011/0202185 A1 | 8/2011 | Imes et al. |
| 2011/0214060 A1 | 9/2011 | Imes et al. |
| 2011/0224838 A1 | 9/2011 | Imes et al. |
| 2011/0246898 A1 | 10/2011 | Imes et al. |
| 2011/0253796 A1 | 10/2011 | Posa et al. |
| 2011/0290893 A1 | 12/2011 | Steinberg |
| 2011/0307101 A1 | 12/2011 | Imes et al. |
| 2011/0307103 A1 | 12/2011 | Cheung et al. |
| 2012/0023225 A1 | 1/2012 | Imes et al. |
| 2012/0046859 A1 | 2/2012 | Imes et al. |
| 2012/0064923 A1 | 3/2012 | Imes et al. |
| 2012/0065935 A1 | 3/2012 | Steinberg et al. |
| 2012/0072033 A1 | 3/2012 | Imes et al. |
| 2012/0086562 A1 | 4/2012 | Steinberg |
| 2012/0093141 A1 | 4/2012 | Imes et al. |
| 2012/0101637 A1 | 4/2012 | Imes et al. |
| 2012/0135759 A1 | 5/2012 | Imes et al. |
| 2012/0158350 A1 | 6/2012 | Steinberg et al. |
| 2012/0215725 A1 | 8/2012 | Imes et al. |
| 2012/0221151 A1 | 8/2012 | Steinberg |
| 2012/0221718 A1 | 8/2012 | Imes et al. |
| 2012/0252430 A1 | 10/2012 | Imes et al. |
| 2012/0324119 A1 | 12/2012 | Imes et al. |
| 2013/0310989 A1 | 1/2013 | Kuroiwa |
| 2013/0053054 A1 | 2/2013 | Lovitt et al. |
| 2013/0054758 A1 | 2/2013 | Imes et al. |
| 2013/0054863 A1 | 2/2013 | Imes et al. |
| 2013/0060387 A1 | 3/2013 | Imes et al. |
| 2013/0144453 A1 | 6/2013 | Subbloie |
| 2013/0167035 A1 | 6/2013 | Imes et al. |
| 2013/0173064 A1 | 7/2013 | Fadell et al. |
| 2013/0226502 A1 | 8/2013 | Steinberg et al. |
| 2013/0231785 A1 | 9/2013 | Steinberg et al. |
| 2013/0238143 A1 | 9/2013 | Steinberg et al. |
| 2013/0338837 A1 | 12/2013 | Hublou et al. |
| 2014/0039690 A1 | 2/2014 | Steinberg |
| 2014/0188290 A1 | 7/2014 | Steinberg et al. |
| 2014/0316581 A1 | 10/2014 | Fadell et al. |
| 2015/0021405 A1 | 1/2015 | Steinberg |
| 2015/0025691 A1 | 1/2015 | Fadell et al. |
| 2015/0043615 A1 | 2/2015 | Steinberg et al. |
| 2015/0120235 A1 | 4/2015 | Steinberg et al. |

FOREIGN PATENT DOCUMENTS

| | | |
|---|---|---|
| JP | 2010-038377 | 2/2010 |
| JP | 2010-286218 | 12/2010 |
| KR | 10-1994-0011902 | 6/1994 |
| KR | 10-1999-0070368 | 9/1999 |
| KR | 10-2000-0059532 | 10/2000 |
| WO | WO 2011/149600 | 12/2011 |
| WO | WO 2012/024534 | 2/2012 |
| WO | WO 2013/187996 | 12/2013 |

OTHER PUBLICATIONS

U.S. Appl. No. 13/523,697, Jun. 14, 2012, Hublou et al.
U.S. Appl. No. 13/725,447, Jun. 6, 2013, Steinberg.
U.S. Appl. No. 13/852,577, Mar. 28, 2013, Steinberg et al.
U.S. Appl. No. 13/858,710, Sep. 5, 2013, Steinberg et al.
U.S. Appl. No. 13/861,189, Apr. 11, 2013, Steinberg et al.
U.S. Appl. No. 14/082,675, Nov. 18, 2003, Steinberg et al.
Arens, et al., "How Ambient Intelligence Will Improve Habitability and Energy Efficiency in Buildings", 2005, research paper, Center for the Built Environment, Controls and Information Technology.
Bourhan, et al., "Cynamic model of an HVAC system for control analysis", Elsevier 2004.
Brush, et al., Preheat—Controlling Home Heating with Occupancy Prediction, 2013.
Comverge SuperStat Flyer, prior to Jun. 28, 2007.
Control4 Wireless Thermostat Brochure, 2006.
Cooper Power Systems Web Page, 2000-2009.
Emerson Climate Technologies, "Network Thermostat for E2 Building Controller Installation and Operation Manual", 2007.
Enernoc Web Page, 2004-2009.
Enerwise Website, 1999-2009.
Gupta, Adding GPS-Control to Traditional Thermostats: An Exploration of Potential Energy Savings and Design Challenges, MIT, 2009.
Gupta, et al., A Persuasive GPS-Controlled Thermostat System, MIT, 2008.
Honeywell Programmable Thermostat Owner's Guide, www.honeywell.com/yourhome, 2004.
Honeywell, W7600/W7620 Controller Reference Manual, HW0021207, Oct. 1992.
Johnson Controls, "T600HCx-3 Single-Stage Thermostats", 2006.
Johnson Controls, Touch4 building automation system brochure, 2007.
Kilicotte, et al., "Dynamic Controls for Energy Efficiency and Demand Response: Framework Concepts and a New Construction Study Case in New York", Proceedings of the 2006 ACEEE Summer Study of Energy Efficiency in Buildings, Pacific Grove. CA, Aug. 13-18, 2006.
Krumm, et al., Learning Time-Based Presence Probabilities, Jun. 2011.
Lin, et al., "Multi-Sensor Single-Actuator Control of HVAC Systems", 2002.
Pier, Southern California Edison, Demand Responsive Control of Air Conditioning via Programmable Communicating Thermostats Draft Report, Feb. 14, 2006.
Proliphix Thermostat Brochure, prior to Jun. 2007.
Raji, "Smart Networks for Control", IEEE Spectrum, Jun. 1994.
Scott, et al., Home Heating Using GPS-Based Arrival Prediction, 2010.
Wang, et al., "Opportunities to Save Energy and Improve Comfort by Using Wireless Sensor Networks in Buildings," (2003), Center for Environmental Design Research.
Wetter, et al., A comparison of deterministic and probabilistic optimization algorithms for non-smooth simulation-based optimization, Building and Environment 39, 2004, pp. 989-999.
International Search Report and Written Opinion for PCT/US2013/035726, dated Aug. 6, 2013.
Written Opinion and Search Report for PCT/US2011/032537, dated Dec. 12, 2011 (our reference).
U.S. Appl. No. 12/805,705, Jun. 10, 2010, Crabtree.
U.S. Appl. No. 13/729,401, Dec. 28, 2012, Sloop.
U.S. Appl. No. 14/263,762, Apr. 28, 2014, Steinberg.
U.S. Appl. No. 14/285,384, May 22, 2014, Steinberg, et al.
U.S. Appl. No. 14/292,377, May 30, 2014, Steinberg.
U.S. Appl. No. 14/491,554, Sep. 19, 2014, Steinberg.
U.S. Appl. No. 14/527,433, Oct. 29, 2014, Steinberg, et al.
International Preliminary Report on Patentability in PCT/US2013/035726 dated Dec. 16, 2014.

* cited by examiner

FIG. 13

| Time | Temperature | | Outside Conditions | | | | Inside Conditions | | | | | | |
|---|---|---|---|---|---|---|---|---|---|---|---|---|---|
| (hh24:mm) | Inside Temp. | Outside Temp. | Conditions | Humidity | Pressure | Wind Speed | Wind Direction | Cool Setting | Heat Setting | Hold Mode | Schd Setting | Schd Cool | Schd Heat | Hvac State | Hvac Mode |
| 2009/04/10 11:00 | 69.70 | 54.00 | Mostly Cloudy | 74% | 29.89in/ 1012.1hPa Steady | 1.0mph 1.6kph | SE | 80.00 | 71.00 | Off | Out/Day | 80.00 | 65.00 | Heat | Heat |
| 2009/04/10 11:01 | 69.69 | 54.10 | Overcast | 74% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:02 | 69.60 | 54.10 | Overcast | 74% | 29.89in/ 1012.1hPa Steady | 2.0mph 3.2kph | SE | 80.00 | 71.00 | Off | Out/Day | 80.00 | 65.00 | Heat | Heat |
| 2009/04/10 11:03 | 69.70 | 54.10 | Overcast | 74% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:04 | 69.70 | 54.10 | Overcast | 74% | 29.89in/ 1012.1hPa Steady | 2.0mph 3.2kph | SE | 80.00 | 71.00 | Off | Out/Day | 80.00 | 65.00 | Heat | Heat |
| 2009/04/10 11:05 | 69.70 | 54.70 | Overcast | 74% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:06 | 69.80 | 54.70 | Overcast | 72% | 29.89in/ 1012.1hPa Steady | 2.0mph 3.2kph | SE | 80.00 | 71.00 | Off | Out/Day | 80.00 | 65.00 | Heat | Heat |
| 2009/04/10 11:07 | 69.80 | 54.70 | Overcast | 72% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:08 | 70.00 | 54.70 | Overcast | 72% | 29.89in/ 1012.1hPa Steady | 2.0mph 3.2kph | SE | 80.00 | 71.00 | Off | Out/Day | 80.00 | 65.00 | Heat | Heat |
| 2009/04/10 11:09 | 70.00 | 54.70 | Overcast | 72% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:10 | 70.00 | 54.70 | Overcast | 72% | 29.89in/ 1012.1hPa Steady | 2.0mph 3.2kph | SE | 80.00 | 71.00 | Off | Out/Day | 80.00 | 65.00 | Heat | Heat |

FIG. 16

| FIG. 16-1 |
|---|
| FIG. 16-2 |

FIG. 16-1

| Outside/Inside Difference, Degrees F | Predicted Inside Temp Change, Degrees F/hour | Outside/Inside Difference, Degrees F | Predicted Inside Temp Change, Degrees F/hour | Outside/Inside Difference, Degrees F | Predicted Inside Temp Change, Degrees F/hour |
|---|---|---|---|---|---|
| -99 | -1.20945425 | -49 | 0.61355475 | 1 | 2.43666376 |
| -98 | -1.17299407 | -48 | 0.65001493 | 2 | 2.47302394 |
| -97 | -1.13653389 | -47 | 0.68647511 | 3 | 2.50948412 |
| -96 | -1.10007371 | -46 | 0.72293529 | 4 | 2.5459443 |
| -95 | -1.06361353 | -45 | 0.75939547 | 5 | 2.58240448 |
| -94 | -1.02715335 | -44 | 0.79585565 | 6 | 2.61886466 |
| -93 | -0.99069317 | -43 | 0.83231583 | 7 | 2.65532484 |
| -92 | -0.95423299 | -42 | 0.86877602 | 8 | 2.69178502 |
| -91 | -0.91777281 | -41 | 0.9052362 | 9 | 2.7282452 |
| -90 | -0.88131263 | -40 | 0.94169638 | 10 | 2.76470538 |
| -89 | -0.84485245 | -39 | 0.97815656 | 11 | 2.80116556 |
| -88 | -0.80839227 | -38 | 1.01461674 | 12 | 2.83762574 |
| -87 | -0.77193209 | -37 | 1.05107692 | 13 | 2.87408592 |
| -86 | -0.73547191 | -36 | 1.0854271 | 14 | 2.9105461 |
| -85 | -0.69901173 | -35 | 1.12399728 | 15 | 2.94700628 |
| -84 | -0.66255155 | -34 | 1.16045746 | 16 | 2.98346646 |
| -83 | -0.62609137 | -33 | 1.19691764 | 17 | 3.01992664 |
| -82 | -0.58963119 | -32 | 1.23337782 | 18 | 3.05638682 |
| -81 | -0.55317101 | -31 | 1.269838 | 19 | 3.092847 |
| -80 | -0.51671083 | -30 | 1.30629818 | 20 | 3.12930718 |
| -79 | -0.48025065 | -29 | 1.34275836 | 21 | 3.16576736 |
| -78 | -0.44379047 | -28 | 1.37921854 | 22 | 3.20222754 |

| Outside/Inside Difference, Degrees F | Predicted Inside Temp Change, Degrees F/hour |
|---|---|
| 51 | 4.25957277 |
| 52 | 4.29603295 |
| 53 | 4.33249313 |
| 54 | 4.36895331 |
| 55 | 4.40541349 |
| 56 | 4.44187367 |
| 57 | 4.47833385 |
| 58 | 4.51479403 |
| 59 | 4.55125421 |
| 60 | 4.58771439 |
| 61 | 4.62417457 |
| 62 | 4.66063475 |
| 63 | 4.69709493 |
| 64 | 4.73355511 |
| 65 | 4.77001529 |
| 66 | 4.80647547 |
| 67 | 4.84293565 |
| 68 | 4.87939583 |
| 69 | 4.91585601 |
| 70 | 4.95231619 |
| 71 | 4.98877637 |
| 72 | 5.02523655 |

| | | | | | | |
|---|---|---|---|---|---|---|
| -77 | -0.40733029 | -27 | 1.41567872 | 23 | 3.23868772 | 73 | 5.06169673 |
| -76 | -0.37087011 | -26 | 1.4521389 | 24 | 3.27514791 | 74 | 5.09815691 |
| -75 | -0.33440993 | -25 | 1.48859908 | 25 | 3.31160809 | 75 | 5.13461709 |
| -74 | -0.29794975 | -24 | 1.52505926 | 26 | 3.34806827 | 76 | 5.17107727 |
| -73 | -0.26148957 | -23 | 1.56151944 | 27 | 3.38452845 | 77 | 5.20753745 |
| -72 | -0.22502939 | -22 | 1.59797962 | 28 | 3.42098863 | 78 | 5.24399763 |
| -71 | -0.18856921 | -21 | 1.6344398 | 29 | 3.45744881 | 79 | 5.28045781 |
| -70 | -0.15210903 | -20 | 1.67089998 | 30 | 3.49390899 | 80 | 5.31691799 |
| -69 | -0.11564885 | -19 | 1.70736016 | 31 | 3.53036917 | 81 | 5.35337817 |
| -68 | -0.07918867 | -18 | 1.74382034 | 32 | 3.56682935 | 82 | 5.38983835 |
| -67 | -0.04272849 | -17 | 1.78028052 | 33 | 3.60328953 | 83 | 5.42629853 |
| -66 | -0.00626831 | -16 | 1.8167407 | 34 | 3.63974971 | 84 | 5.46275871 |
| -65 | 0.03019187 | -15 | 1.85320088 | 35 | 3.67620989 | 85 | 5.49921889 |
| -64 | 0.06665205 | -14 | 1.88966106 | 36 | 3.71267007 | 86 | 5.53567907 |
| -63 | 0.10311223 | -13 | 1.92612124 | 37 | 3.74913025 | 87 | 5.57213925 |
| -62 | 0.13957241 | -12 | 1.96258142 | 38 | 3.78559043 | 88 | 5.60859943 |
| -61 | 0.17603259 | -11 | 1.9990416 | 39 | 3.82205061 | 89 | 5.64505961 |
| -60 | 0.21249277 | -10 | 2.03550178 | 40 | 3.85851079 | 90 | 5.6815198 |
| -59 | 0.24895295 | -9 | 2.07196196 | 41 | 3.89497097 | 91 | 5.71797998 |
| -58 | 0.28541313 | -8 | 2.10842214 | 42 | 3.93143115 | 92 | 5.75444016 |
| -57 | 0.32187331 | -7 | 2.14488232 | 43 | 3.96789133 | 93 | 5.79090034 |
| -56 | 0.35833349 | -6 | 2.1813425 | 44 | 4.00435151 | 94 | 5.82736052 |
| -55 | 0.39479367 | -5 | 2.21780268 | 45 | 4.04081169 | 95 | 5.8638207 |
| -54 | 0.43125385 | -4 | 2.25426286 | 46 | 4.07727187 | 96 | 5.90028088 |
| -53 | 0.46771403 | -3 | 2.29072304 | 47 | 4.11373205 | 97 | 5.93674106 |
| -52 | 0.50417421 | -2 | 2.32718322 | 48 | 4.15019223 | 98 | 5.97320124 |
| -51 | 0.54063439 | -1 | 2.3636434 | 49 | 4.18665241 | 99 | 6.00966142 |
| -50 | 0.57709457 | 0 | 2.40010358 | 50 | 4.22311259 | | |

FIG. 16-2

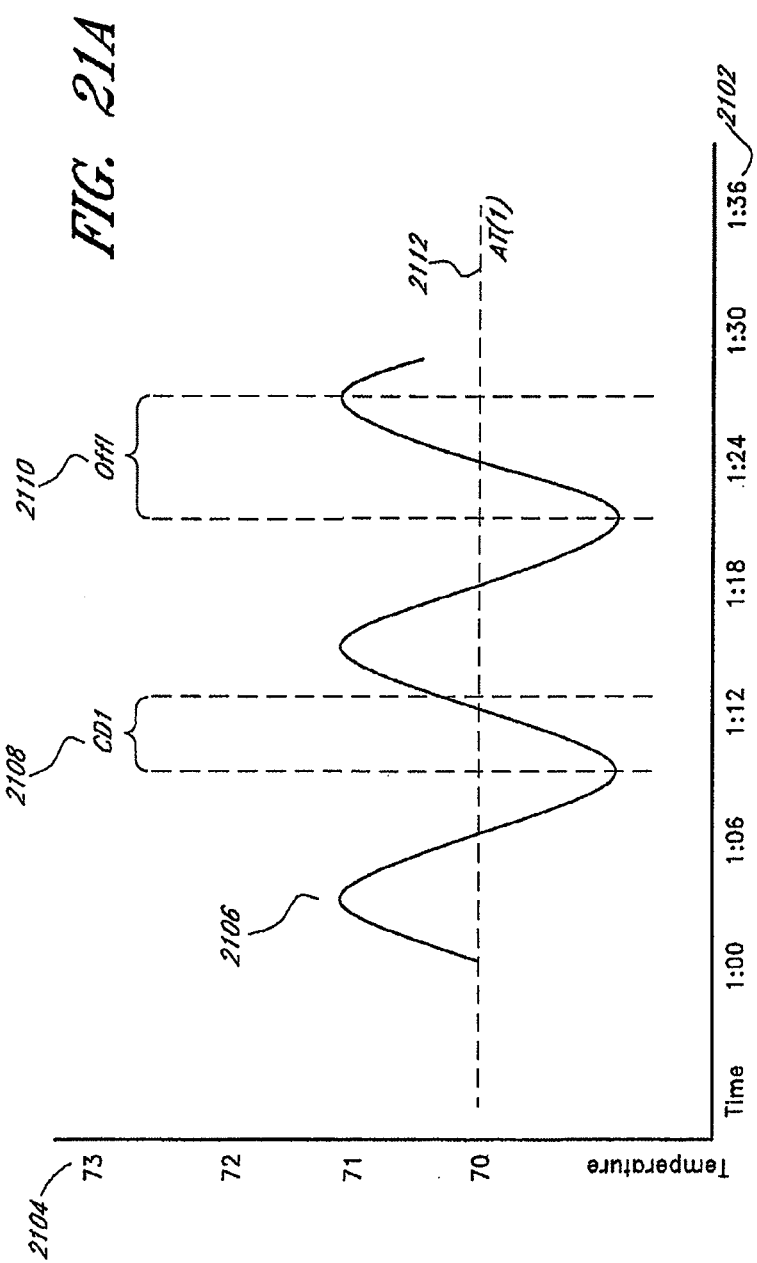

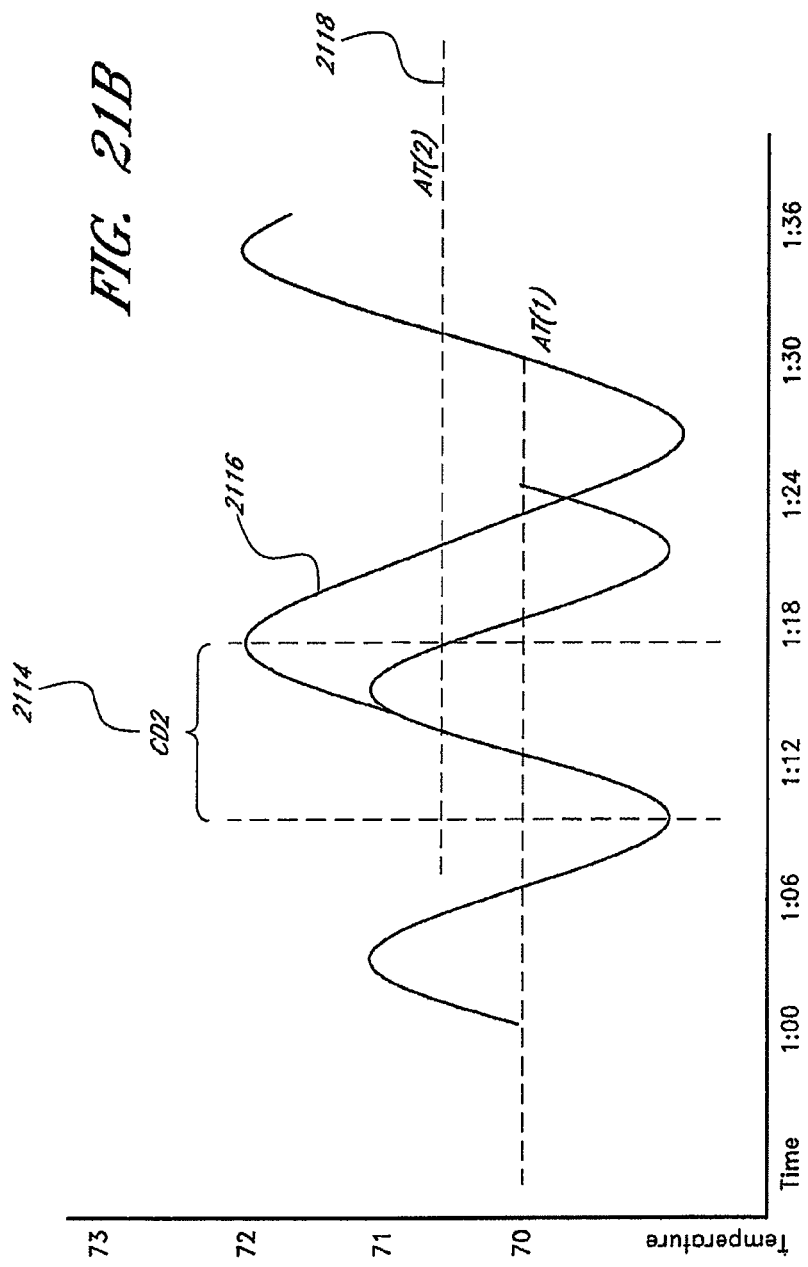

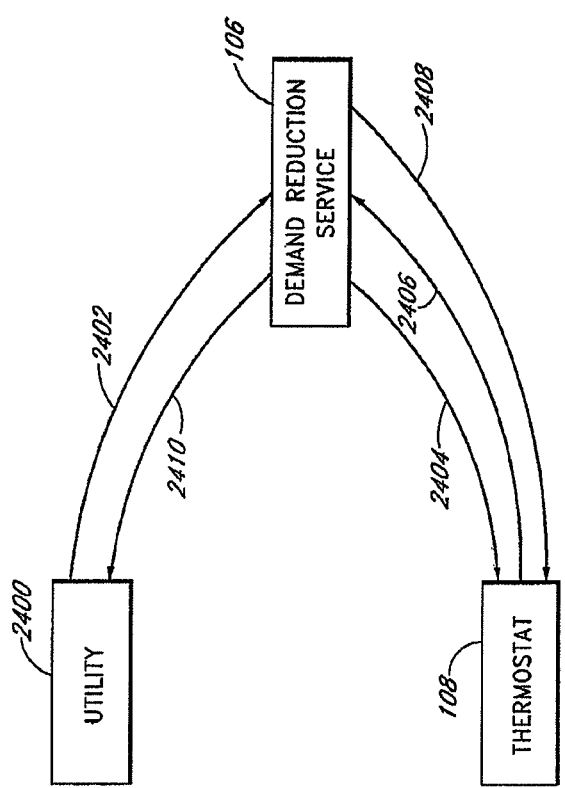

SYSTEM AND METHOD FOR OPTIMIZING USE OF PLUG-IN AIR CONDITIONERS AND PORTABLE HEATERS

CROSS-REFERENCE TO RELATED APPLICATIONS

Any and all applications for which a foreign or domestic priority claim is identified in the Application Data Sheet, or any correction thereto, are hereby incorporated by reference under 37 CFR 1.57.

BACKGROUND

1. Field

The present disclosure relates to the use of thermostatic HVAC and other energy management controls that are connected to a computer network. More specifically, the disclosure relates to the use of remotely managed load switches incorporating thermostatic controllers to inform an energy management system, to provide enhanced efficiency, and to verify demand response with plug-in air conditioners and heaters.

2. Description of the Related Art

Refrigerant-based air conditioning has been on the market for nearly 100 years. Air conditioning systems may be thought of as belonging to one of three broad types: centralized systems, which locate the compressor and condenser outside the conditioned space, and use ductwork to move heat out of the conditioned space; window mount air conditioners, which are completely self-contained in a single enclosure, plug into an outlet, do not use ductwork, and are generally sized to cool a single room; and split systems, which are roughly halfway between the other two in design in that they are usually two-box systems, with the compressor outside the conditioned space, but mount the heat exchanger directly in an outside wall and thus also do not use ductwork.

Centralized systems tend to be most efficient in terms of cooling per unit of energy consumed, while window units tend to have the lowest mechanical efficiency, although there may be circumstances in which the effective cost of running a window unit to cool a single occupied room is lower than using a high-efficiency central air conditioner to cool the entire house when only the one room is occupied.

As energy prices rise, more attention is being paid to ways of reducing energy consumption. Because with most systems energy consumption is directly proportional to setpoint—that is, the further a given setpoint diverges from the balance point (the inside temperature assuming no HVAC activity) in a given house under given conditions, the higher energy consumption will be to maintain temperature at that setpoint), energy will be saved by virtually any strategy that over a given time frame lowers the average heating setpoint or raises the average cooling setpoint.

One of the most important ways to increase the operational efficiency of any heater or air conditioner is to make sure it is only used when and to the extent it is actually needed. Programmable thermostats have been available for decades for central heating and cooling systems. In theory, programmable thermostats can significantly reduce energy use with these systems. In practice, savings often prove harder to achieve, for a variety of reasons. Those shortcomings are overcome by innovations disclosed in patent application Ser. Nos. 12/183,990; 12/183,949; 12/211,733; and 12/211,690, the entirety of which are hereby incorporated herein by reference.

This system allows users to save significant energy with little or no loss of comfort. However, portable heaters and window air conditioners are not generally compatible with thermostats designed for central systems. Although some newer portable heaters and window air conditioners now include built-in thermostats, and future window air conditioners may have networking capabilities, there are millions of window air conditioners in the world that do not have such controls or communications capabilities.

Specialized load control thermostats designed to control window air conditioners and portable heaters are commercially available. They are designed to be plugged into a wall outlet, and to have the portable heater or window mount air conditioner plugged into them in turn using a switched outlet. These devices include a means for sensing temperature (such as a thermistor), means for choosing a desired thermal setpoint, and means for turning on and off the switched outlet. In the cooling context, for example, when the temperature as sensed by the internal sensor rises above the setpoint, the load controller powers the switched outlet, turning on the connected air conditioner. When the temperature as sensed by the internal sensor has fallen sufficiently, the load controller turns off power to the switched outlet, thereby switching off the air conditioner.

Also commercially available are non-networked load control switches that can be controlled via wireless communications. They are also designed to be plugged into an outlet, and to have an electrical device plugged into them in turn using a switched outlet. Such devices include means to communicate wirelessly with other components and for turning on and off the switched outlet.

Neither of these devices is likely to enable fully optimized energy management for a connected portable heater or window air conditioner. The challenge in using a conventional remote-controlled switch to manage the use of a window-mount air conditioner or space heater is that a critical data input required to optimize comfort and energy use is the temperature of the space being conditioned by the attached air conditioner or heater. This issue is at least partially addressed by adding a means for sensing temperature to the load control device, and thus in a sense converting the load control switch into a line-voltage thermostat. However, making the load control device into a self-contained thermostat requires significant additional complexity (and thus expense), such as a complete user interface, and is also likely to yield unsatisfactory results for several reasons. First, the location of the load control device is dictated by the location of the outlet into which the window-mount air conditioner must be connected. Whereas thermostats are normally situated in hallways or interior walls at roughly chest or shoulder level for an average adult, and well away from vents (which could cause the thermostat to shut off the HVAC system prematurely), the location of the electrical outlet nearest the air conditioner is likely to be very high or very low on an exterior wall. This location will both make programming difficult and distort the temperature readings obtained by the device, since the temperature in a given room is likely to vary by several degrees from floor to ceiling, and be unduly influenced by sunlight, nearby windows, etc., as well as by the attached heater or air conditioner itself.

These drawbacks are largely avoided by combining the thermostatic control capabilities of existing thermostatic load controllers with the communications capabilities of wireless communicating load controllers, and connecting the load control device via a network such as the Internet to a remote server that can manage the settings for the load control device and provide the ability to program settings from a variety of locations and using a variety of devices. This approach can also make it possible to omit most or all of the aspects of a user interface from the load control device itself, thereby reducing cost and complexity. This approach can also compensate for issues related to poor location of the load control device.

Although progress in residential HVAC control has been slow, tremendous technological change has come to the tools used for personal communication. When programmable thermostats were first offered, telephones were virtually all tethered by wires to a wall jack. But now a large percentage of the population carries at least one mobile device capable of sending and receiving voice or data or even video (or a combination thereof) from almost anywhere by means of a wireless network. These devices create the possibility that a consumer can, with an appropriate mobile device and a network-enabled heater or air conditioner, control his or her heater or air conditioner even when away from home. But systems that rely on active management decisions by consumers are likely to yield sub-optimal energy management outcomes—in part because consumers are unlikely to devote the attention and effort required to fully optimize energy use on a daily basis; in part because optimization requires information and insights that are well beyond all but the most sophisticated users.

Many new mobile devices now incorporate another significant new technology—the ability to geolocate the device (and thus, presumably, the user of the device). One method of locating such devices uses the Global Positioning System (GPS). The GPS system uses a constellation of orbiting satellites with very precise clocks to triangulate the position of a device anywhere on earth based upon arrival times of signals received from those satellites by the device. Another approach to geolocation triangulates using signals from multiple cell phone towers. Such systems can enable a variety of so-called "location based services" to users of enabled devices. These services are generally thought of as aids to commerce like pointing users to restaurants or gas stations, etc.

If the wall or window-mount air conditioner is plugged into a basic communicating load control device, it can be used to remotely turn off the air conditioner. This approach can be effective as a load management strategy from the perspective of a utility or other actor concerned with the health of the overall electric grid. Thus on hot summer afternoons, when air conditioning loads are highest, if the grid is threatened by a situation in which demand may exceed supply, a utility (or other party tasked with managing loads) may send a signal to switch off a large number of connected load controls, thereby reducing demand. Air conditioners represent a large percentage of such peak loads. The ability to address wall and window-mount air conditioners during such peak events could help to shed significant loads at critical times.

However, with existing solutions, this approach has serious drawbacks. Because there is no feedback loop between the load and the controller of the load, there is no way to take into account the conditions in the room or the preferences of the occupants or even to validate that the air conditioner has been shut off. Thus there is little incentive for the occupants of a given room to suffer significant personal discomfort in order to solve a grid-level problem. Indeed, the system arguably encourages consumers to find ways to defeat the external control. Such self-help could be as simple as removing the load controller from the circuit, or plugging the load (the air conditioner) into a different outlet. With a simple communicating load controller without a sophisticated feedback mechanism, there is no way for the remote manger to know whether such measures have been taken.

It would be advantageous for the load controller strategies for window and wall-mounted air conditioners (and in certain circumstances, space heaters) to take in to account the temperature conditions inside the space being cooled by the air conditioner attached to the load control device. It would also be advantageous for the load control strategies to take into account whether or not the room that is cooled by the air conditioner is occupied.

It would also be advantageous for load controller switches for window and wall-mounted air conditioners and plug-in heaters to include means for directly sensing occupancy of the conditioned space, and to communicate the occupancy status of the conditioned space to the remote server managing the operation of the attached window and wall-mounted air conditioners and plug-in heaters.

It would also be advantageous for load controller switches for window and wall-mounted air conditioners and plug-in heaters to include means for sensing and measuring current drawn by those attached devices, and to communicate the current drawn by said devices to the remote server managing the operation of the attached window and wall-mounted air conditioners and plug-in heaters.

SUMMARY

In one embodiment, the invention comprises a portable heater or a self-contained air conditioner, such as a unit installed through a window, a networked load-control switch, a local network connecting the load-control switch to a larger network such as the Internet, and a server in bi-directional communication with such networked load-control switch and device.

In another embodiment, the invention comprises a portable heater or a self-contained air conditioner, such as a unit installed through a window, a networked load-control switch, a local network connecting the load-control switch to a larger network such as the Internet, and one or more geolocation-enabled mobile devices attached to the network, and a server in bi-directional communication with such networked load-control switch and device. The server pairs each networked load-control switch with one or more geolocation-enabled mobile devices which are determined to be associated with the occupants of the conditioned space in which the networked load-control switch is located. The server logs the ambient temperature sensed by each networked load-control switch vs. time and the switching of power to the attached space conditioning equipment by the networked load-control switch. The server also monitors and logs the geolocation data related to the geolocation-enabled mobile devices associated with each networked load-control switch. Based on the locations and movement evidenced by geolocation data, the server instructs the networked load-control switch to change temperature settings between those optimized for occupied and unoccupied states at the appropriate times based on the evolving geolocation data.

In another embodiment, the invention comprises a portable heater or a self-contained air conditioner, such as a unit installed through a window, a networked load-control switch, a local network connecting the load-control switch to a larger network such as the Internet, and a server in bi-directional communication with such networked load-control switch and device, and an occupancy sensor that detects the presence or absence of occupants of the conditioned space.

In another embodiment, the invention comprises a portable heater or a self-contained air conditioner, such as a unit installed through a window, a networked load-control switch, a local network connecting the load-control switch to a larger network such as the Internet, and a server in bi-directional communication with such networked load-control switch and device, and a current sensor that measures the current passing through the device attached to the load control switch.

In one embodiment, a system for controlling plug-in air conditioners and heaters comprises at least one load control device at a first location comprising a temperature sensor and a microprocessor. The load control device is configured to connect or disconnect electrical power to the attached air conditioner or heater, and the microprocessor is configured to communicate over a network.

One or more processors that receive measurements of outside temperatures from at least one source other than the load control device and compare the temperature measurements from the first location with the measurements of outside temperatures. In addition, one or more databases that store at least the temperature measurements obtained from the first location.

The load control device is also physically separate from the air conditioner or heater but located inside the space conditioned by the air conditioner or heater.

In an additional embodiment, the one or more databases are stored in a computer located in the same structure as the load control device. Furthermore, the one or more databases are stored in a computer that is not located in the same structure as the load control device. Still further, the plug-in air conditioner is mounted through a window. In one embodiment, the plug-in heater is a space heater.

In one embodiment, the load control device measures at least the temperature inside the conditioned space. In another embodiment, the load control device measures the electrical current and/or voltage passing through the load control device. In yet another embodiment, the database obtains at least a measure of outside weather conditions via a network. In still another embodiment, the load control device is configured to sense occupancy of the conditioned space.

In a further embodiment, an apparatus for controlling a self-contained air conditioner or heater comprises a load control device comprising a temperature sensor and a microprocessor. The load control device is configured to connect or disconnect electrical power to the attached air conditioner or heater, and the microprocessor can communicate over a network.

A server is capable of receiving messages from and sending messages to the load control device. Moreover, the load control device is located inside the space conditioned by the air conditioner or heater.

In yet another embodiment, the server is a computer located in the same structure as the load control device. Still further, the server is not located in the same structure as the load control device. In a different embodiment, the self-contained air conditioner is mounted through a window and the self-contained heater is a space heater.

The load control device in one embodiment measures at least the temperature inside the conditioned space. Also, the load control device measures the electrical current and/or voltage passing through the load control device. Still further, the server obtains at least a measure of outside weather conditions via a network. In addition, the load control device is further configured to sense occupancy of the conditioned space.

In one embodiment, an apparatus for optimizing the cooling of a habitable space comprises an air conditioner and a load control device comprising a temperature sensor and a microprocessor. The load control device is configured to connect or disconnect electrical power to the attached air conditioner, and the load control device further configured to communicate over a network.

A computer is capable of receiving messages from and sending messages to the load control device and the load control device is located inside the space conditioned by the air conditioner.

Moreover, the computer, in another embodiment is located in the same structure as the load control device. Also, in a different embodiment, the computer is not located in the same structure as the load control device. In an additional embodiment, the air conditioner is mounted through a window. In a further embodiment, the load control device measures at least the temperature inside the conditioned space. In a still further embodiment, the control device measures the electrical current and/or voltage passing through the load control device. In yet a further embodiment, the computer obtains at least a measure of outside weather conditions via a network. In a different embodiment, the load control device is further configured to sense occupancy of the conditioned space.

In one embodiment, an apparatus for optimizing the heating of a habitable space comprises a plug-in heater and a load control device comprising a temperature sensor and a microprocessor. The load control device is configured to connect or disconnect electrical power to the attached plug-in heater, and the load control device is further configured to communicate over a network.

A computer is capable of receiving messages from and sending messages to the load control device and the load control device is located inside the space conditioned by the plug-in heater.

In another embodiment, the computer is located in the same structure as the load control device. In yet another embodiment, the computer is not located in the same structure as the load control device. In still another embodiment, the load control device measures at least the temperature inside the conditioned space. In a different embodiment, the load control device measures the electrical current and/or voltage passing through the control device. In a further embodiment, the server obtains at least a measure of outside weather conditions via a network. In yet further embodiment, the load control device is further configured to sense occupancy of the conditioned space.

BRIEF DESCRIPTION OF THE DRAWINGS

FIG. 13 shows a table of some of the data used by an embodiment of the subject invention to predict temperatures.

FIGS. 16-1 and 16-2 show a table of predicted rates of change in temperature inside a given conditioned space for a range of temperature differentials between inside and outside.

FIG. 21(a) through 21(c) illustrate how changes in compressor delay settings affect HVAC cycling behavior by plotting time against temperature.

FIG. 24 is a representation of the movement of messages and information between the components of an embodiment of the subject invention.

DETAILED DESCRIPTION OF THE PREFERRED EMBODIMENTS

Figure 1:
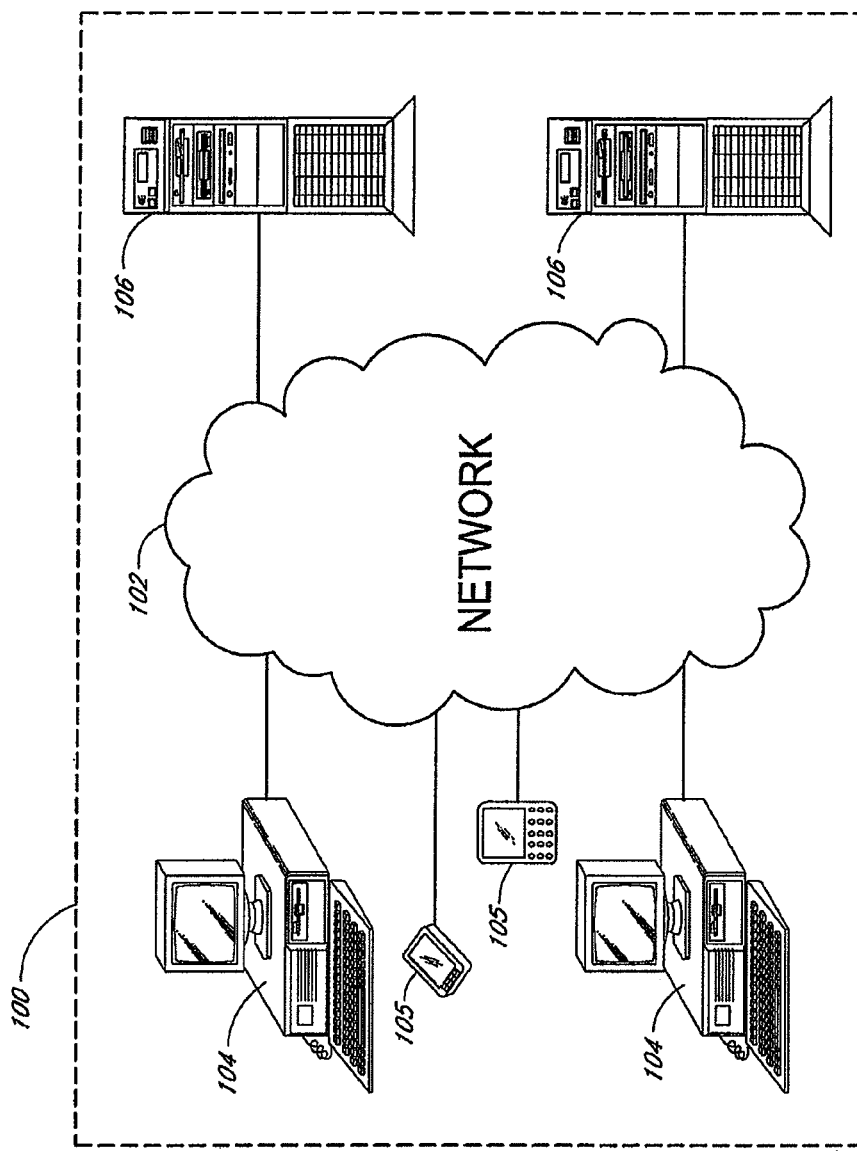
FIG. 1 shows an example of an overall environment in which an embodiment of the invention may be used.

FIG. 1 shows an example of an overall environment 100 in which an embodiment of the invention may be used. The environment 100 includes an interactive communication network 102 with computers 104 connected thereto. Also connected to network 102 are mobile devices 105, and one or more server computers 106, which store information and make the information available to computers 104 and mobile devices 105. The network 102 allows communication between and among the computers 104, mobile devices 105 and servers 106.

Presently preferred network 102 comprises a collection of interconnected public and/or private networks that are linked to together by a set of standard protocols to form a distributed network. While network 102 is intended to refer to what is now commonly referred to as the Internet, it is also intended to encompass variations which may be made in the future, including changes additions to existing standard protocols. It also includes various networks used to connect mobile and wireless devices, such as cellular networks.

When a user of an embodiment of the subject invention wishes to access information on network 102 using computer 104 or mobile device 105, the user initiates connection from his computer 104 or mobile device 105. For example, the user invokes a browser, which executes on computer 104 or mobile device 105. The browser, in turn, establishes a communication link with network 102. Once connected to network 102, the user can direct the browser to access information on server 106.

One popular part of the Internet is the World Wide Web. The World Wide Web contains a large number of computers 104 and servers 106, which store HyperText Markup Language (HTML) documents capable of displaying graphical and textual information. HTML is a standard coding convention and set of codes for attaching presentation and linking attributes to informational content within documents.

The servers 106 that provide offerings on the World Wide Web are typically called websites. A website is often defined by an Internet address that has an associated electronic page.

Generally, an electronic page is a document that organizes the presentation of text graphical images, audio and video.

In addition to delivering content in the form of web pages, network 102 may also be used to deliver computer applications that have traditionally been executed locally on computers 104. This approach is sometimes known as delivering hosted applications, or SaaS (software as a Service). Where a network connection is generally present, SaaS offers a number of advantages over the traditional software model: only a single instance of the application has to be maintained, patched and updated; users may be able to access the application from a variety of locations, etc. Hosted applications may offer users most or all of the functionality of a local application without having to install the program, simply by logging into the application through a browser.

In addition to the Internet, the network 102 can comprise a wide variety of interactive communication media. For example, network 102 can include local area networks, interactive television networks, telephone networks, wireless data systems, two-way cable systems, and the like.

In one embodiment, computers 104 and servers 106 are conventional computers that are equipped with communications hardware such as modem or a network interface card. The computers include processors such as those sold by Intel and AMD. Other processors may also be used, including general-purpose processors, multi-chip processors, embedded processors and the like.

Computers 104 can also be microprocessor-controlled home entertainment equipment including advanced televisions, televisions paired with home entertainment/media centers, and wireless remote controls.

Computers 104 and mobile devices 105 may utilize a browser or other application configured to interact with the World Wide Web or other remotely served applications. Such browsers may include Microsoft Explorer, Mozilla, Firefox, Opera or Safari. They may also include browsers or similar software used on handheld, home entertainment and wireless devices.

The storage medium may comprise any method of storing information. It may comprise random access memory (RAM), electronically erasable programmable read only memory (EEPROM), read only memory (ROM), hard disk, floppy disk, CD-ROM, optical memory, or other method of storing data.

Computers 104 and 106 and mobile devices 105 may use an operating system such as Microsoft Windows, Apple Mac OS, Linux, Unix or the like.

Computers 106 may include a range of devices that provide information, sound, graphics and text, and may use a variety of operating systems and software optimized for distribution of content via networks.

Figure 2:
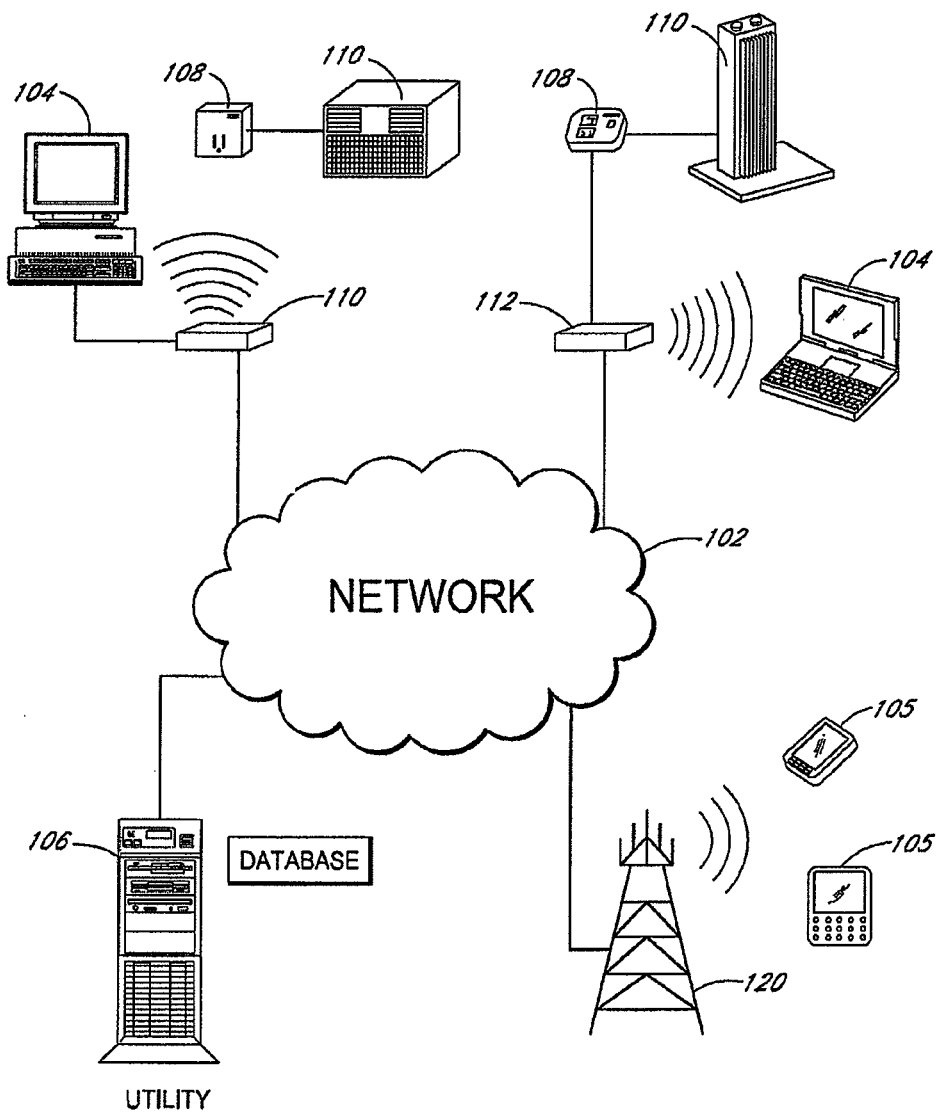
FIG. 2 shows a high-level illustration of the architecture of a network showing the relationship between the major elements of one embodiment of the subject invention.

Mobile devices 105 can also be handheld and wireless devices such as personal digital assistants (PDAs), cellular telephones and other devices capable of accessing the network. Mobile devices 105 can use a variety of means for establishing the location of each device at a given time. Such methods may include the Global Positioning System (GPS), location relative to cellular towers, connection to specific wireless access points, or other means FIG. 2 illustrates in further detail the architecture of the specific components connected to network 102 showing the relationship between the major elements of one embodiment of the subject invention. Attached to the network are load control devices 108 and computers 104 of various users. Connected to load control devices 108 are heaters and air conditioners and portable heaters 110. The heaters and air conditioners may be conventional window-mount air conditioners, electric resistance heaters, or other devices for generating or transferring heat into or out of a building. Each user is connected to the server 106 via wired or wireless connection such as Ethernet or a wireless protocol such as IEEE 802.11, a gateway 110 that connects the computer and load control device to the Internet via a broadband connection such as a digital subscriber line (DSL), cellular radio or other form of broadband connection to the World Wide Web. The load control devices 108 may be connected locally via a wired connection such as Ethernet or Homeplug or other wired network, or wirelessly via IEEE802.11, 802.15.4, or other wireless network. Server 106 contains the content to be served as web pages and viewed by computers 104, software to manage load control devices 108, as well as databases containing information used by the servers.

Also attached to the Network may be cellular radio towers 120, or other means to transmit and receive wireless signals in communication with mobile devices 105. Such communication may use GPRS, GSM, CDMA, EvDO, EDGE or other protocols and technologies for connecting mobile devices to a network.

Figure 3A:
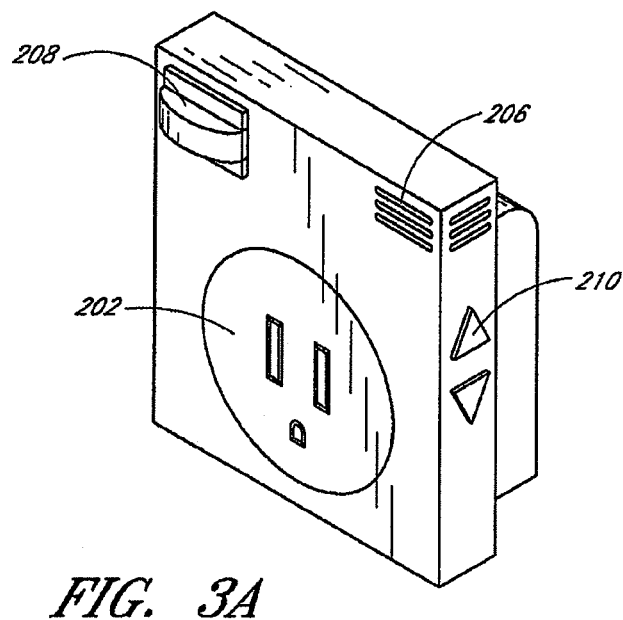
FIGS. 3a and 3b show a representative load control device.
Figure 3B:
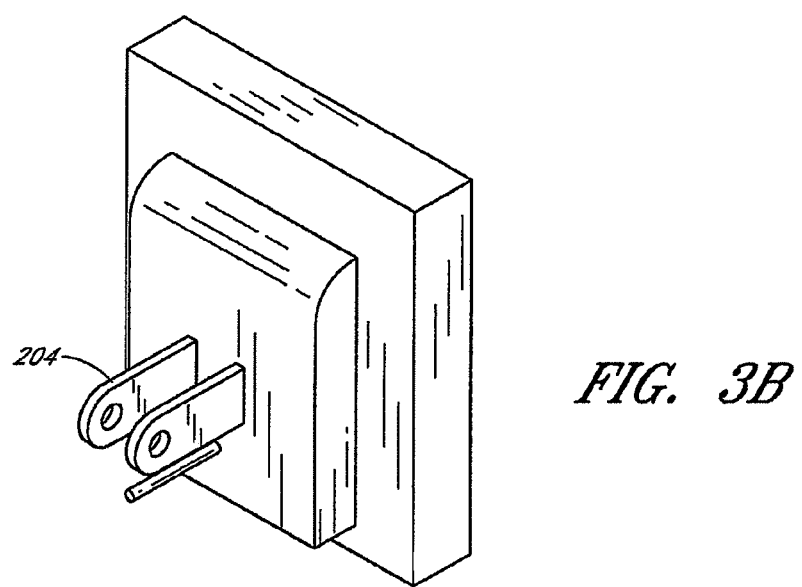

FIGS. 3a and 3b show two views of one embodiment of the load control device 108. Load control device 108 includes a receptacle 202 the window mount air conditioner or portable heater 110 is to be plugged into. It also includes a corresponding plug 204 to be inserted into the wall outlet. Load control device 108 may also include means for sensing temperature in the conditioned space, such as a thermistor, which is not directly visible from the outside, but may be located behind slots or holes 206 in the outer casing of the device in order to permit air to circulate freely around. Load control device 108 may also include means for sensing motion 208 as a tool for detecting occupancy of the room where the wall mount air conditioner is located. Load control device 108 may also include buttons 210 or similar means to allow a user to directly indicate temperature preferences. The load control device may also include a visual display, which could be a simple as a single LED to indicate when the receptacle 202 is powered, or as sophisticated as a full-color display indicating temperatures, etc.

Figure 4:
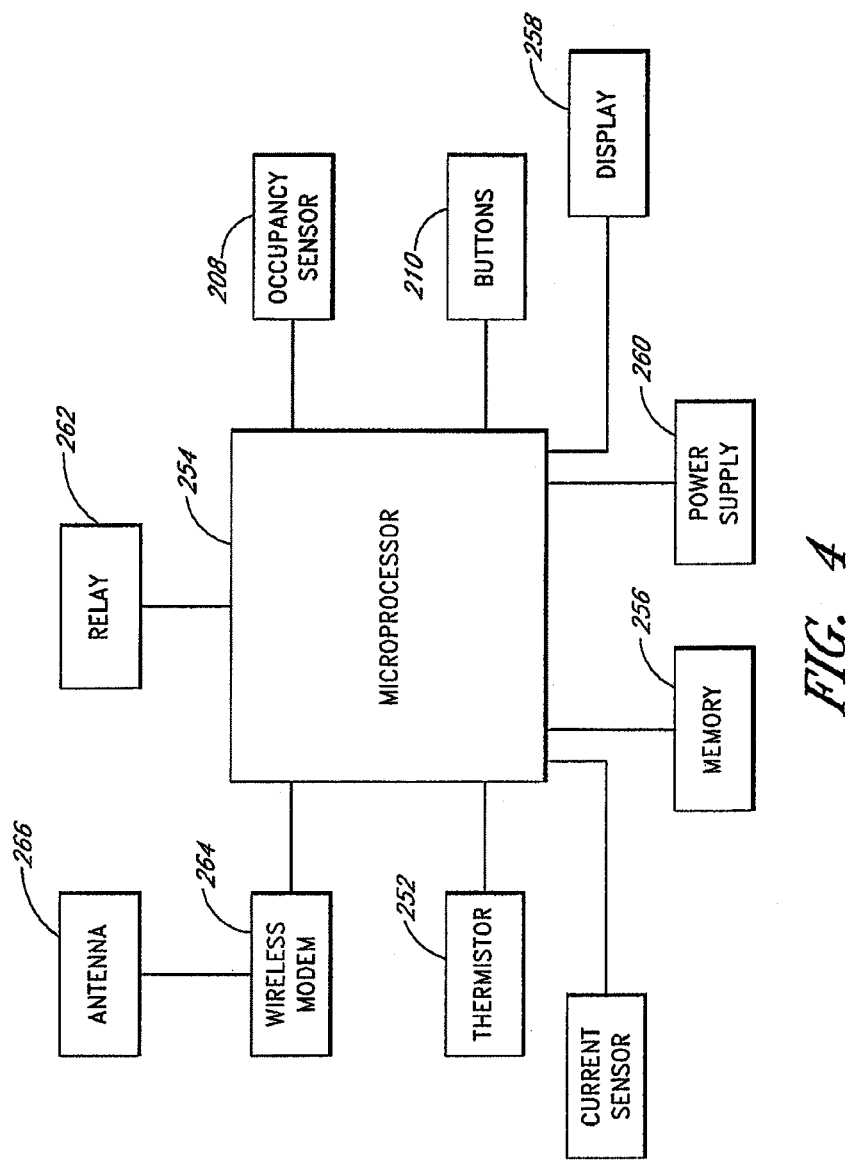
FIG. 4 shows a high-level schematic of the load control device used as part of an embodiment of the subject invention.

FIG. 4 shows a high-level block diagram of load control device 108 used as part of the subject invention. Load control device 108 includes temperature sensing means 252, which may be a thermistor, thermal diode or other means commonly used in the design of electronic thermostats. Load control device 108 includes a microprocessor 254, memory 256, and may or may not include a display 258. Load control device 108 will include at least one relay or other switching means 262, which turns outlet 202 and thus air conditioner or heater 110 on an and off in response to a signal from the microprocessor. To allow the load control device to communicate bi-directionally with other local devices and/or computer network, the load control device 108 also includes means 264 and (in some cases) antenna 266 to connect the load control device 108 to a local computer or to a wireless network. Such means could be in the form of Ethernet, wireless protocols such as IEEE 802.11, IEEE 802.15.4, Bluetooth, cellular systems such as CDMA, GSM and GPRS, or other wireless protocols. The load control device 108 may also include controls such as buttons 210 that allow users to change settings directly at the load control device 108, but such controls are not necessary to allow the load control device to function.

In the simplest case, load control device 108 can act as a conventional thermostat for a connected air conditioner or electric heater. Once a user has specified a given setpoint, temperature sensing means 252 is used to determine the air temperature in the conditioned space. In the air conditioning context, when the sensed temperature rises above the selected comfort range, microprocessor 254 will cause relay 262 to close, thereby supplying power to the attached air conditioner or heater 110. However, considerably greater utility will be enabled if the load control device 108 is connected to a network. Load control device 108 can also act as a router, hub, switch or gateway for the purpose of wirelessly connecting other devices to the same network as load control device 108 and to network 102, server 106, remote server 106 and/or mobile devices 105.

Figure 5:
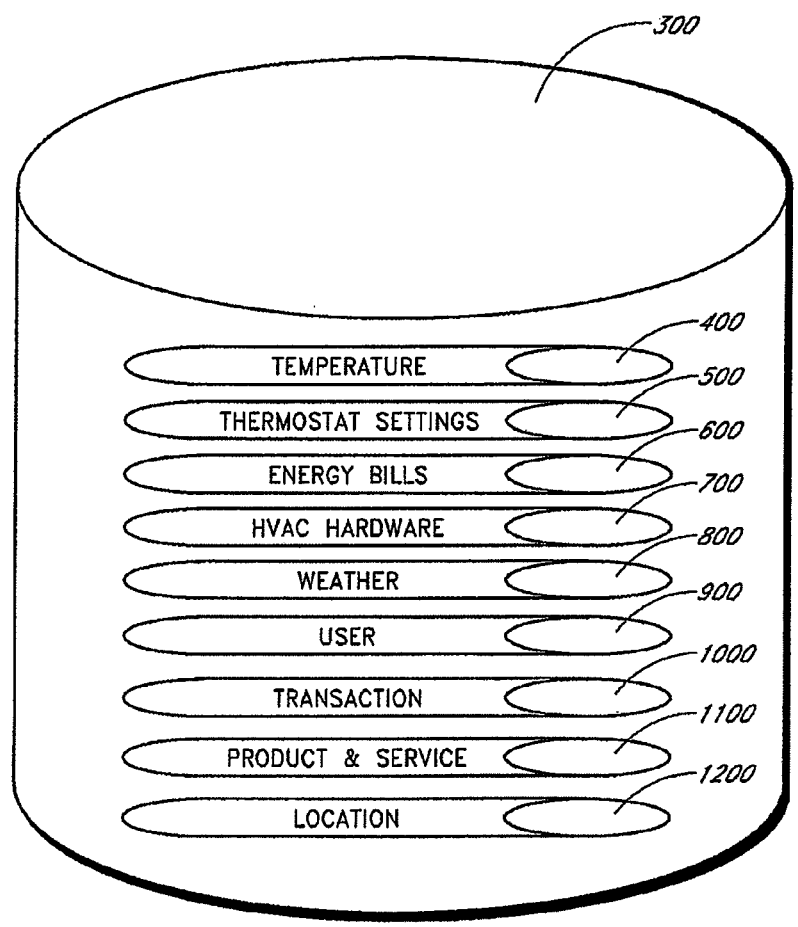
FIG. 5 shows one embodiment of the database structure used as part of an embodiment of the subject invention.

When load control device 108 is connected to a network, users will be able to manage the operation of the load control device through either software run locally on computer 104 or remotely on a server connected to the load control device via a network such as the Internet. When the software runs on a remote server, the data used to optimize the operation of the air conditioner is stored on one or more servers 106 within one or more databases. As shown in FIG. 5, the overall database structure 300 may include temperature database 400, thermostat settings database 500, energy bill database 600, HVAC hardware database 700, weather database 800, user database 900, transaction database 1000, product and service database 1100, user location database 1200 and such other databases as may be needed to support these and additional features.

Users of load control devices may create personal accounts. Each user's account will store information in database 900, which tracks various attributes relative to users of the site. Such attributes may include the make and model of the specific HVAC equipment used in association with the load control device; the age and square footage of the conditioned space, the solar orientation of the conditioned space, the location of the lad control device in the conditioned space, the user's preferred temperature settings, whether the user is a participant in a demand response program, etc.

User personal accounts may also associate one or more mobile devices with such personal accounts. For mobile devices with the capability for geopositioning awareness, these personal accounts will have the ability log such positioning data over time in database 1200.

In one embodiment, a background application installed on mobile device 105 shares geopositioning data for the mobile device with the application running on server 106 that logs such data. Based upon this data, server 106 runs software that interprets the data (as described in more detail below). Server 106 may then, depending on context, (a) transmit a signal to load control device 108 changing the setpoint the load control device is seeking to maintain because occupancy has been detected at a time when the system did not expect occupancy (or alternately, because occupancy was expected but has not been detected); or (b) transmit a message to mobile device 105 that asks the user if the server should change the current setpoint, alter the overall programming of the system based upon a new occupancy pattern, etc. Such signalling activity may be conducted via email, text message, pop-up alerts, voice messaging, or other means.

Figure 6A:
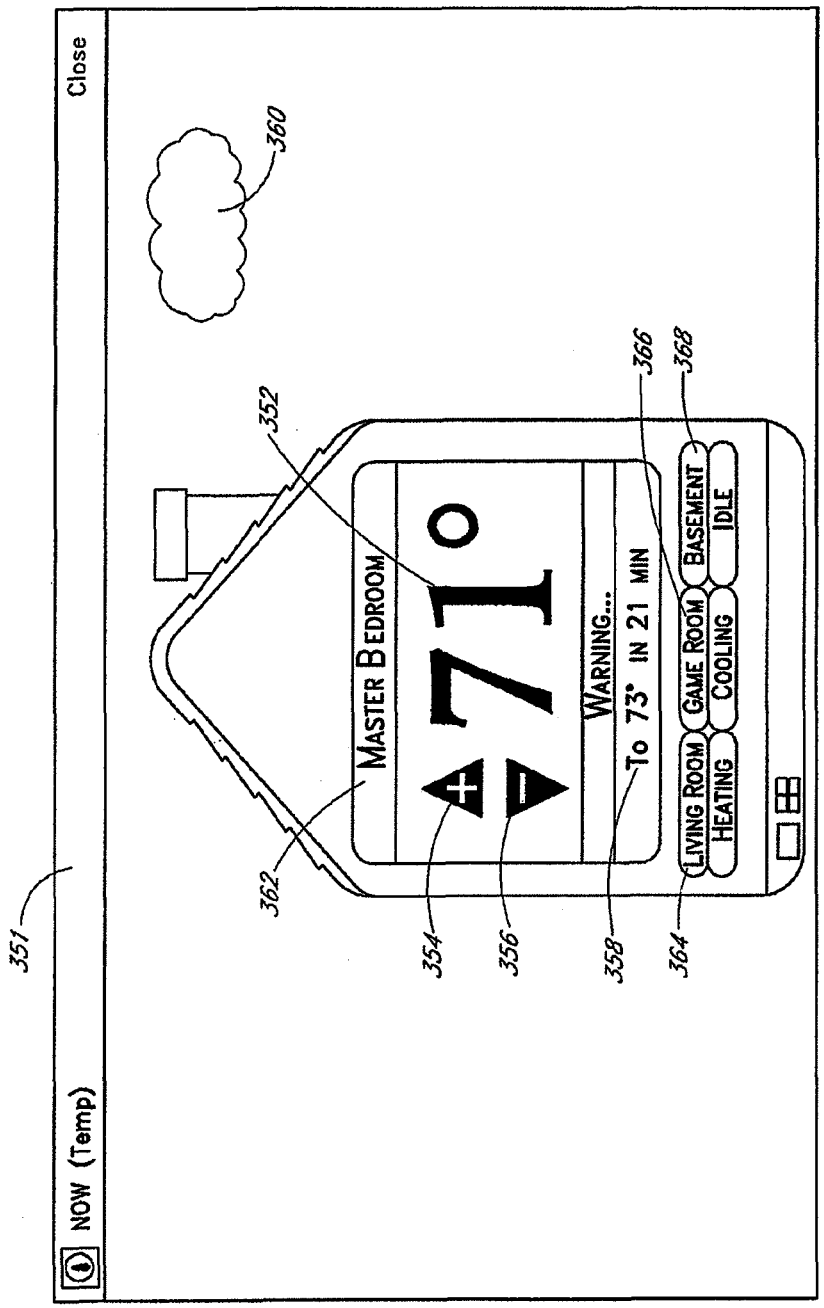
FIGS. 6a and 6b illustrate pages of a website that may be used with an embodiment of the subject invention.
Figure 6B:
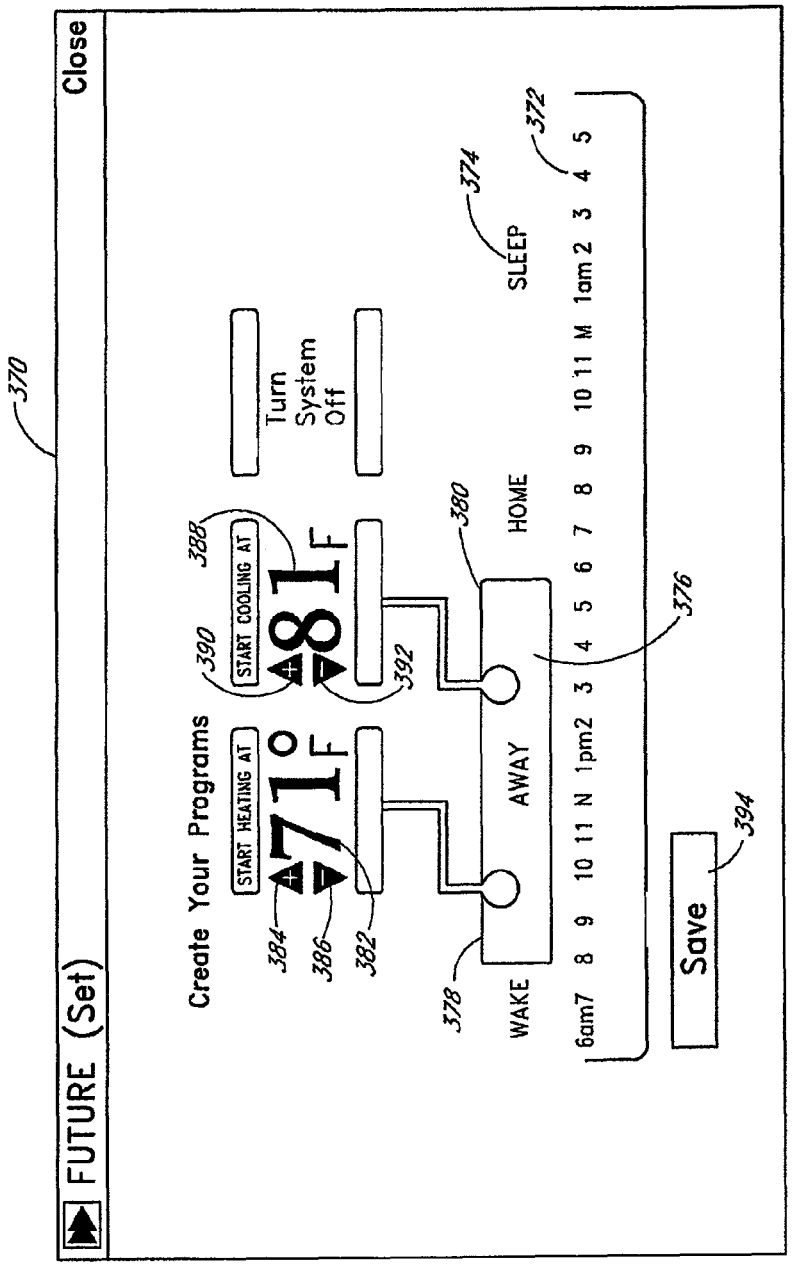

FIGS. 6*a* and 6*b* illustrate a website that may be provided to assist users to interact with the subject invention. The website will permit users to perform through the web browser substantially all of the programming functions traditionally performed directly at conventional physical thermostat, such as temperature set points, the time at which the load control device should be at each set point, etc. Preferably the website will also allow users to accomplish more advanced tasks such as allow users to program in vacation settings for times when the air conditioner or heater may be turned off or run at more economical settings, and to set macros that will allow changing the settings of the temperature for all periods with a single gesture such as a mouse click. As shown in FIG. 6*a*, screen 351 of website 350 displays current temperature 352 as sensed by load control device 108. Clicking on "up" arrow 354 raises the setpoint 358; clicking the "down" arrow 206 lowers setpoint 208. Screen 351 may also convey information about the outside weather conditions, such as a graphic representation 360 of the sun, clouds, etc. In conditioned spaces with multiple load control devices, screen 351 may allow users to select different devices to adjust or monitor. Users will be able to use screen 351 by selecting, for example, master bedroom load control device 362, living room load control device 364, game room load control device 366, or basement load control device 368.

As shown in FIG. 6*b*, screen 370 allows users to establish programming schedules. Row 372 shows a 24-hour period. Programming row 374 displays various programming periods and when they are scheduled, such as "away" setting 376, which begins at approximately 8 AM and runs until approximately 5:30 PM. When the away setting 376 is highlighted, the user can adjust the starting time and ending time for the setting by dragging the beginning time 378 to the left to choose an earlier start time, and dragging it to the right to make it later. Similarly, the user can drag ending time 380 to the left to make it earlier, and to the right to make it later. While away setting 376 is highlighted, the user can also change heating setpoint 382 by clicking on up arrow 384 or down arrow 386, and cooling setpoint 388 by clicking on up arrow 390 or down arrow 392. The user can save the program by clicking on save button 394.

If load control device 108 includes a motion sensor or other means of detecting occupancy, this information can be used to change the state of the load control device and associated heating or cooling systems directly, and that information can also be transmitted to remote server 106. This approach can effectively react to occupancy changes in a given space. However, a more involved process can actually anticipate some occupancy changes, and does not require a direct occupancy sensor.

Figure 7:
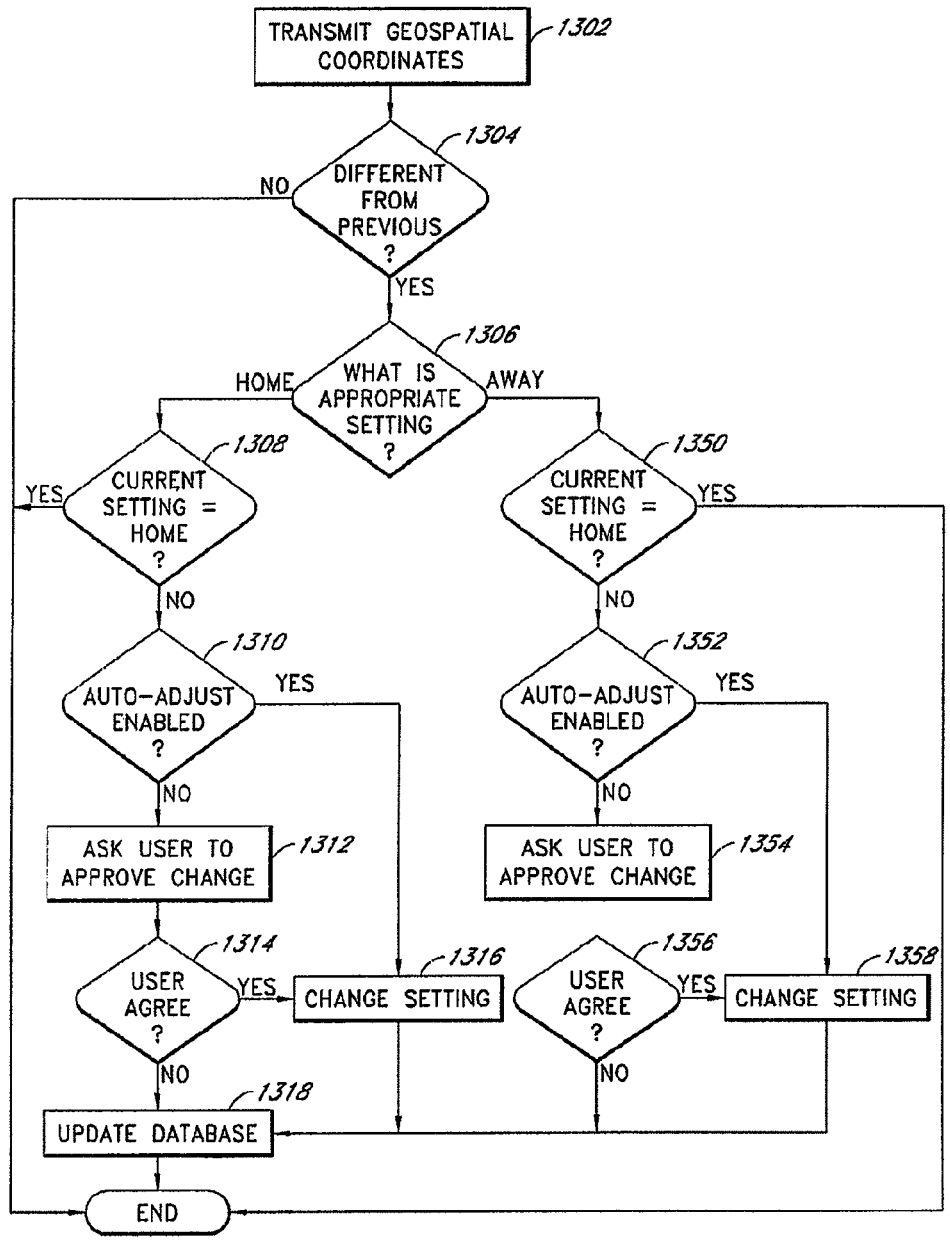
FIG. 7 is a flowchart showing the steps involved in the operation of one embodiment of the subject invention.

FIG. 7 is a high-level flowchart showing the steps involved in the operation of one embodiment of the subject invention for the purpose of adjusting the setting of the load control device 108 for occupancy. In step 1302, mobile device 105 transmits geopositioning information to server 106 via the Internet. In step 1304 the server compares the latest geopositioning data point to previous data points in order to determine whether a change in location or vector of movement has occurred. In step 1306 the server evaluates the geopositioning data in order to determine whether the temperature settings for the load control device 108 associated with the mobile device 105 should be optimized for an unoccupied state, or for an occupied state in light of the movement (or lack thereof) in the geopositioning data. If the server 106 determines that the load control device 108 should be in occupied or "home" mode, then in step 1308 the server queries database 300 to determine whether load control device 108 is already set for home or away mode. If load control device 108 is already in home mode, then the application terminates for a specified interval. If the HVAC settings then in effect are intended to apply when the conditioned space is unoccupied, then in step 1310 the application will retrieve from database 300 the user's specific preferences for how to handle this situation. If the user has previously specified (at the time that the program was initially set up or subsequently modified) that the user prefers that the system automatically change settings under such circumstances, the application then proceeds to step 1316, in which it changes the programmed setpoint for the load control device to the setting intended for occupancy. If the user has previously specified that the application should not make such changes without further user input, then in step 1312 the application transmits a command to the location specified by the user (generally mobile device 105) directing the device display a message informing the user that the current setting assumes an unoccupied house, apartment or room and asking the user to choose whether to either keep the current settings or revert to the pre-selected setting for an occupied state. If the user selects to retain the current setting, then in step 1318 the application will write to database 300 the fact that the user has so elected and terminate. If the user elects to change the setting, then in step 1316 the application transmits the revised setpoint to the load control device. In step 1318 the application writes the updated setting information to database 300.

If the server 106 determines in step 1306 that the conditioned space should be in unoccupied or away mode, then in step 1350 the server queries database 300 to determine whether load control device 108 is set for set for home or away mode. If load control device 108 is already in home mode, then the application terminates for a specified interval. If the settings then in effect are intended to apply when the conditioned space is occupied, then in step 1352 the application will retrieve from database 300 the user's specific preferences for how to handle this situation. If the user has previously specified (at the time that the program was initially set up or subsequently modified) that the user prefers that the system automatically change settings under such circumstances, the application then proceeds to step 1358, in which it changes the programmed setpoint for the load control device to the setting intended for the conditioned space when unoccupied. If the user has previously specified that the application should not make such changes without further user input, then in step 1354 the application transmits a command to the location specified by the user (generally mobile device 105) directing the device display a message informing the user that the current setting assumes an unoccupied state and asking the user to choose whether to either keep the current settings or revert to the pre-selected setting for an occupied conditioned space. If the user selects to retain the current setting, then in step 1318 the application will write to database 300 the fact that the user has so elected and terminate. If the user elects to change the setting, then in step 1316 the application transmits the revised setpoint to the load control device. In step 1318 the application writes the updated setting information to database 300. If load control device 108 is already in away mode, the program ends. If it was in home mode, then in step 1314 server 108 initiates a state change to put load control device 108 in away mode. In either case, the server then in step 1316 writes the state change to database 300. In each case the server can also send a message to the person who owns the mobile device requesting, confirming or announcing the state change.

Figure 8:
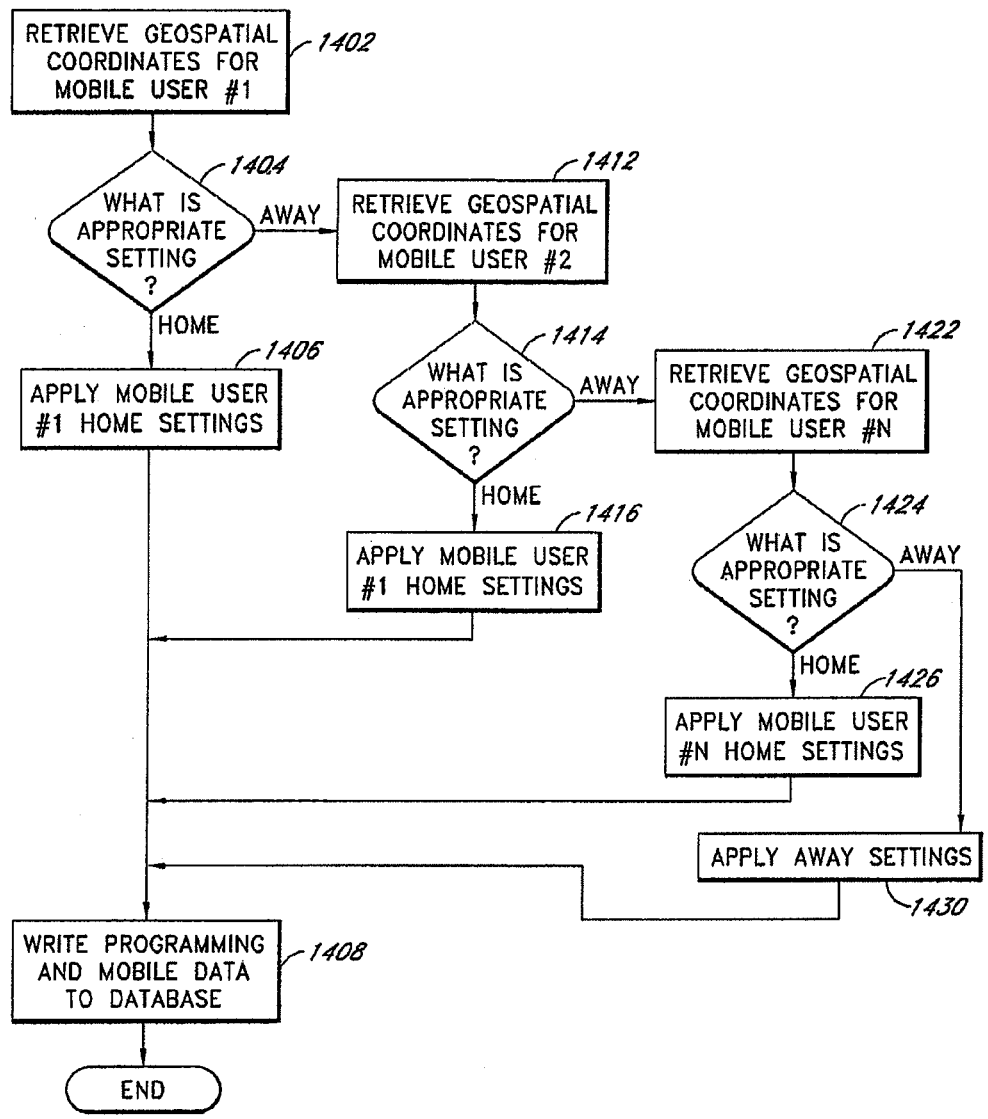
FIG. 8 is a flowchart that shows how the invention can be used to select different HVAC settings based upon its ability to identify which of multiple potential occupants is using the mobile device connected to the system.

FIG. 8 is a flowchart that shows one process by which the invention can be used to select different temperature settings based upon its ability to identify which of multiple potential occupants is using the mobile device attached to the system. The process shown assumes (a) a static hierarchy of temperature preferences as between multiple occupants: that is, that for a given conditioned space/structure, mobile user #1's preferences will always control the outcome if mobile user #1 is present, that mobile user #2's preferences yield to #1's, but always prevail over user #3, etc; and (b) that there are no occupants to consider who are not associated with a mobile device. Other heuristics may be applied in order to account for more dynamic interactions of preferences.

In step 1402 server 106 retrieves the most recent geospatial coordinates from the mobile device 105 associated with mobile user #1. In step 1404 server 106 uses current and recent coordinates to determine whether mobile user #1's "home" settings should be applied. If server 106 determines that User #1's home settings should be applied, then in step 1406 server 106 applies the correct setting and transmits it to the load control device(s). In step 1408, server 106 writes to database 300 the geospatial information used to adjust the programming. If after performing step 1404, the server concludes that mobile user #1's "home" settings should not be applied, then in step 1412 server 106 retrieves the most recent geospatial coordinates from the mobile device 105 associated with mobile user #2. In step 1414 server 106 uses current and recent coordinates to determine whether mobile user #2's "home" settings should be applied. If server 106 determines that User #2's home settings should be applied, then in step 1416 server 106 applies the correct setting and transmits it to the load control device(s). In step 1408, server 106 writes to database 300 the geospatial and other relevant information used to adjust the programming. If after performing step 1414, the server concludes that mobile user #2's "home" settings should not be applied, then in step 1422 server 106 retrieves the most recent geospatial coordinates from the mobile device 105 associated with mobile user #N. In step 1424 server 106 uses current and recent coordinates to determine whether mobile user #N's "home" settings should be applied. If server 106 determines that User #N's home settings should be applied, then in step 1426 server 106 applies the correct setting and transmits it to the load control device(s). In step 1408, server 106 writes to database 300 the geospatial information used to adjust the programming.

If none of the mobile devices associated with a given home or other structure report geospatial coordinates consistent with occupancy, then in step 1430 the server instructs the load control device(s) to switch to or maintain the "away" setting.

The instant invention is capable of delivering additional benefits in terms of increased comfort and efficiency. In addition to using the system to allow better control of an attached heater or air conditioner, which relies primarily on communication running from the server to the load control device, bi-directional communication will also allow the load control device 108 to regularly measure and send to the server information about the temperature in the space conditioned by the heater or air conditioner controlled by the load control device. By comparing outside temperature, inside temperature, temperature settings, cycling behavior of the attached heater or air conditioner, and other variables, the system will be capable of numerous diagnostic and controlling functions beyond those of a standard thermostat.

Figure 9A:
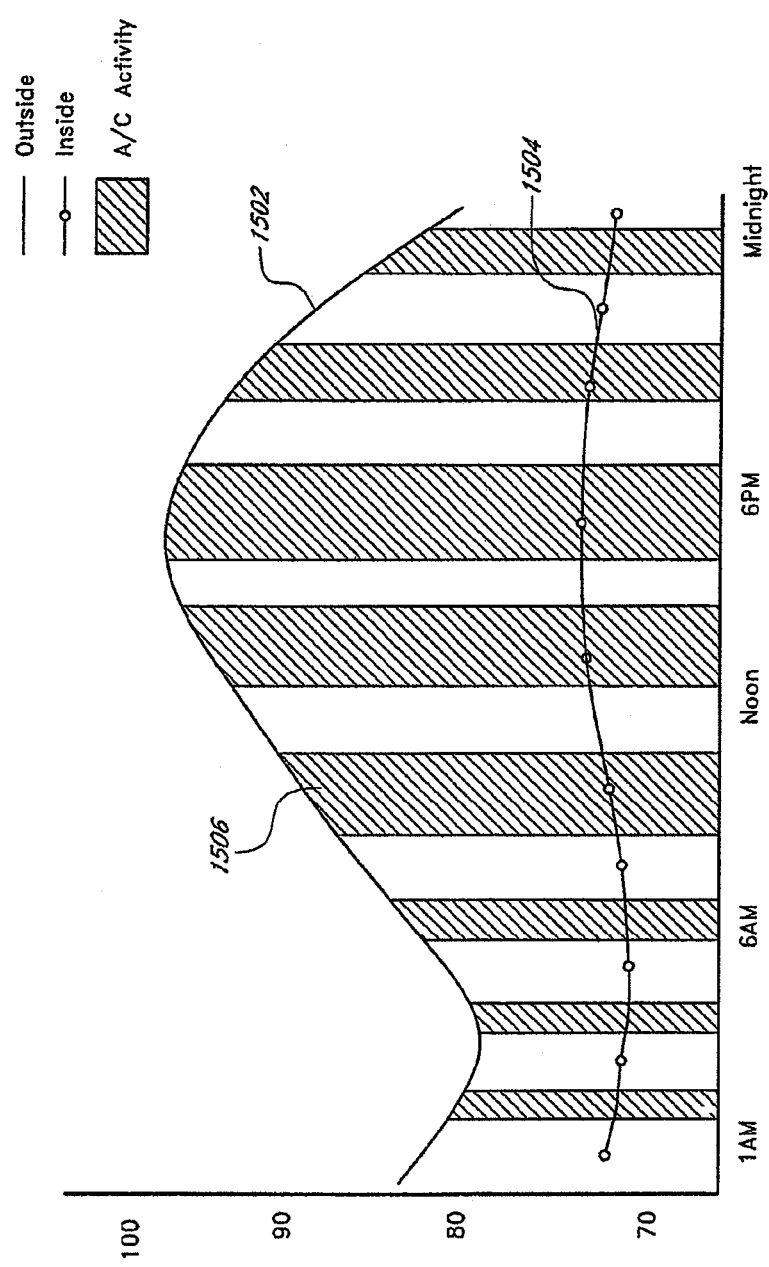
FIGS. 9a and 9b show how comparing inside temperature against outside temperature and other variables permits calculation of dynamic signatures.

For example, FIG. 9a shows a graph of inside temperature, outside temperature and air conditioner activity for a 24-hour period. When outside temperature 1502 increases, inside temperature 1504 follows, but with some delay because of the thermal mass of the conditioned space, unless the air conditioning 1506 operates to counteract this effect. When the air conditioning turns on, the inside temperature stays constant (or rises at a much lower rate or even falls) despite the rising outside temperature. In this example, frequent and heavy use of the air conditioning results in only a very slight temperature increase inside the house of 4 degrees, from 72 to 76 degrees, despite the increase in outside temperature from 80 to 100 degrees.

Figure 9B:
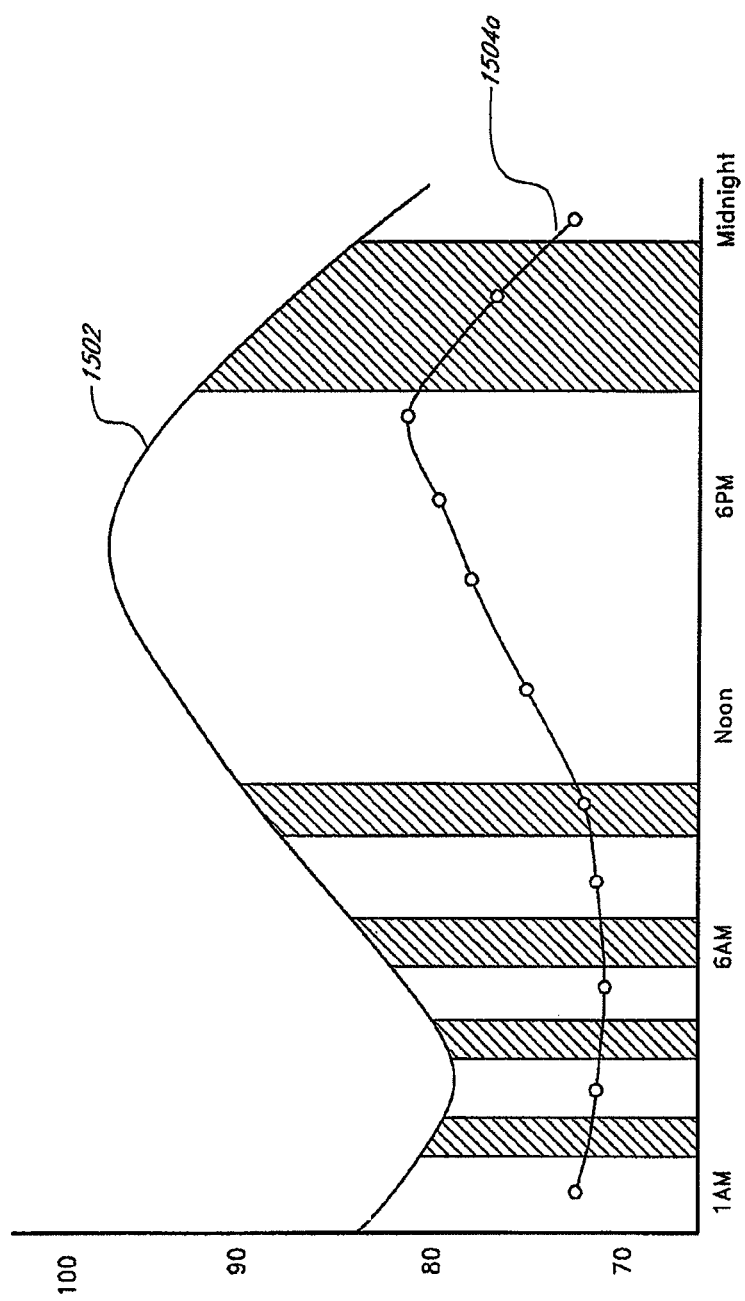

FIG. 9b shows a graph of the same conditioned space on the same day, but assumes that the air conditioning is turned off from noon to 7 PM. As expected, the inside temperature 1504a rises with increasing outside temperatures 1502 for most of that period, reaching 88 degrees at 7 PM. Because server 106 logs the temperature readings from inside each house (whether once per minute or over some other interval), as well as the timing and duration of air conditioning cycles, database 300 will contain a history of the thermal performance of the conditioned space. That performance data will allow the server 106 to calculate an effective thermal mass for each conditioned space—that is, the speed with which the temperature inside a given conditioned space will change in response to changes in outside temperature. Because the server will also log these inputs against other inputs including time of day, humidity, etc. the server will be able to predict, at any given time on any given day, the rate at which inside temperature should change for given inside and outside temperatures.

The ability to predict the rate of change in inside temperature in a given conditioned space under varying conditions may be applied by in effect holding the desired future inside temperature as a constraint and using the ability to predict the rate of change to determine when the heater or air conditioner system must be turned on in order to reach the desired temperature at the desired time. The ability of a load control device to vary the turn-on time of an attached air conditioner or heater in order to achieve a setpoint with minimum energy use may be thought of as Just In Time (JIT) optimization.

Figure 10:
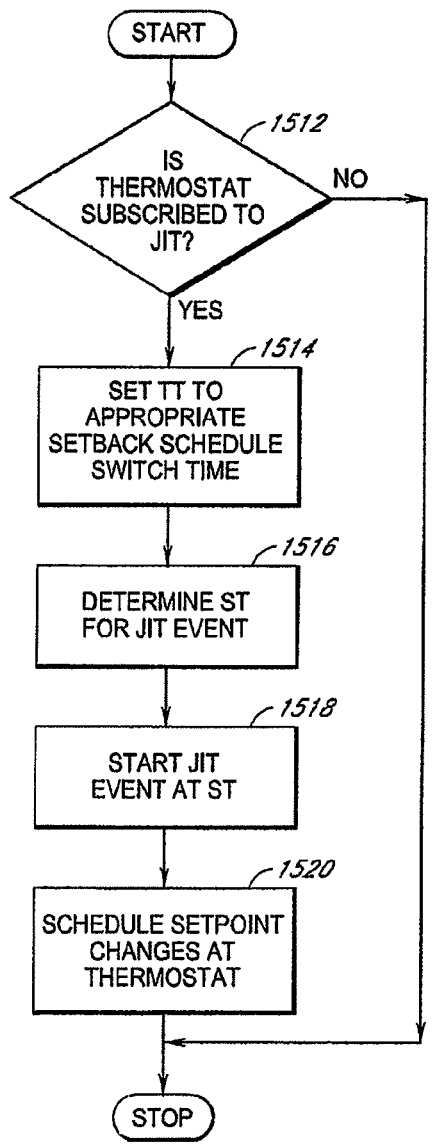
FIG. 10 shows a flow chart for a high level version of the process of calculating the appropriate turn-on time in a given conditioned space.

FIG. 10 shows a flowchart illustrating the high-level process for controlling a just-in-time (JIT) event. In step 1512, the server determines whether a specific load control device 108 is scheduled to run the preconditioning program. If not, the program terminates. If it so scheduled, then in step 1514 the server retrieves the predetermined target time when the preconditioning is intended to have been completed (TT). Using TT as an input, in step 1516 the server then determines the time at which the computational steps required to program the preconditioning event will be performed (ST). In step 1518, performed at start time ST, the server begins the process of actually calculating the required parameters, as discussed in greater detail below. Then in 1520 specific setpoint changes are transmitted to the load control device so that the temperature inside the conditioned space may be appropriately changed as intended.

Figure 11:
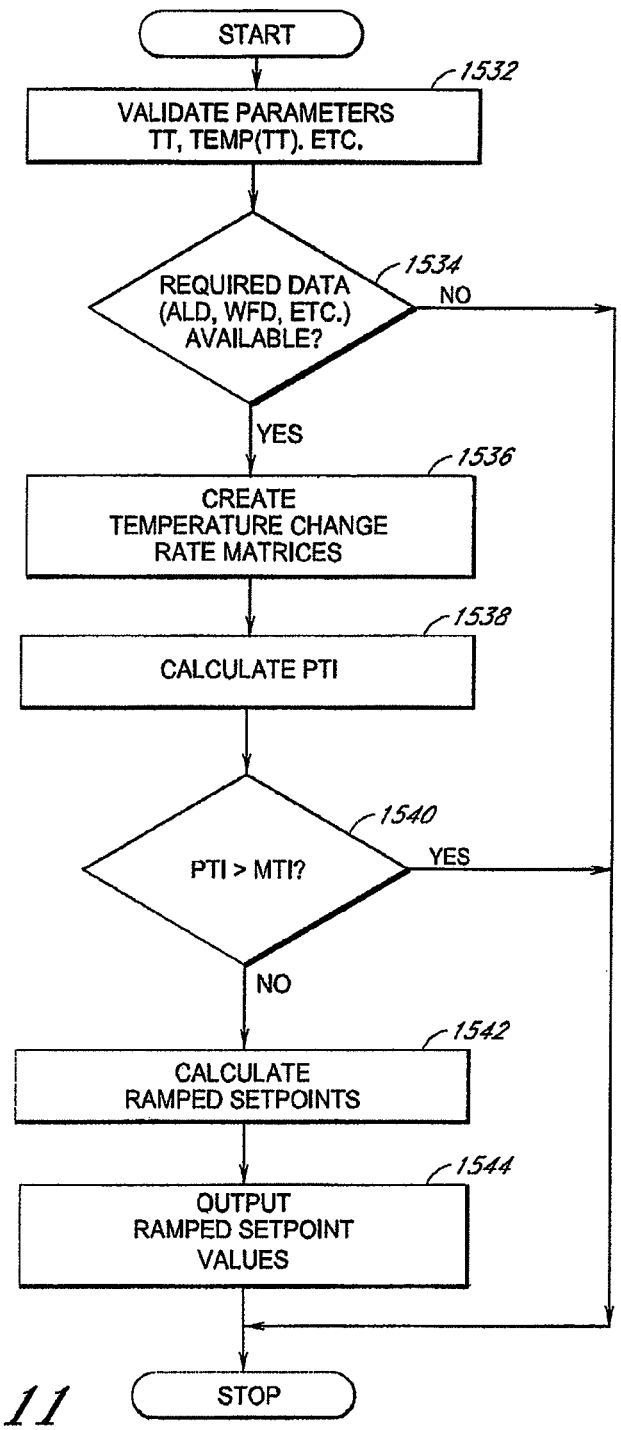
FIG. 11 shows a more detailed flowchart listing the steps in the process of calculating the appropriate turn-on time in a given conditioned space for a just-in-time event.
Figure 12A:
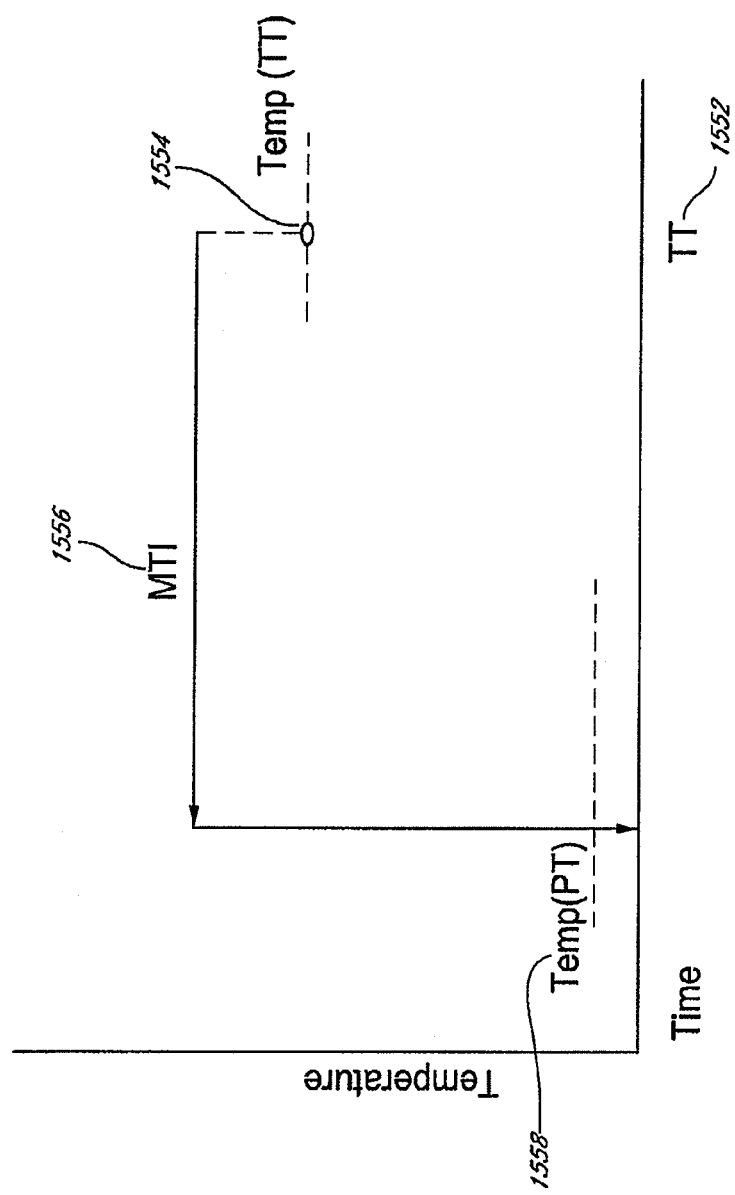
FIGS. 12a, 12b, 12c and 12d show the steps shown in the flowchart in FIG. 11 in the form of a graph of temperature and time.
Figure 12B:
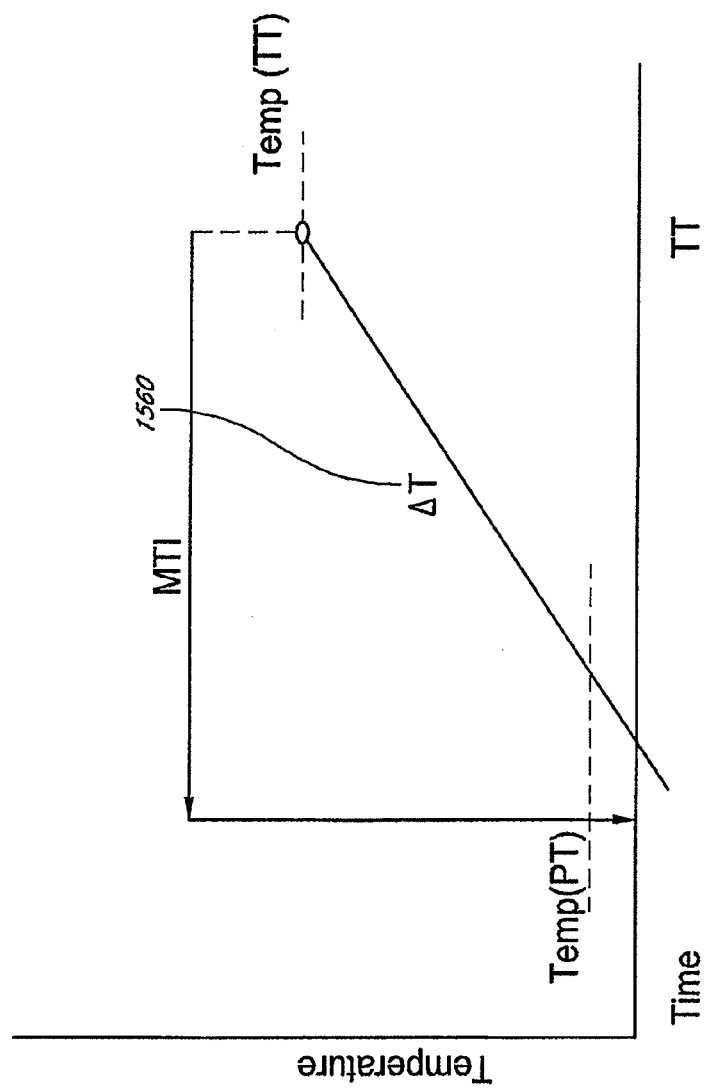
Figure 12C:
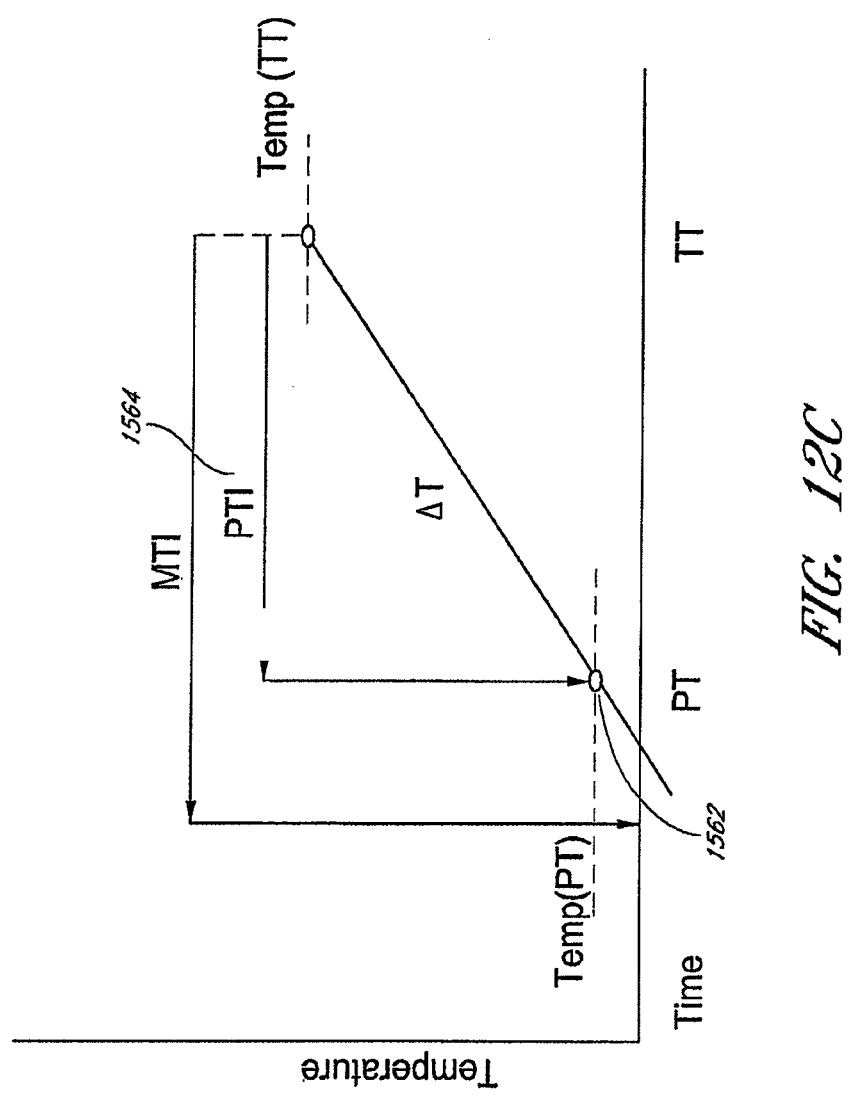
Figure 12D:
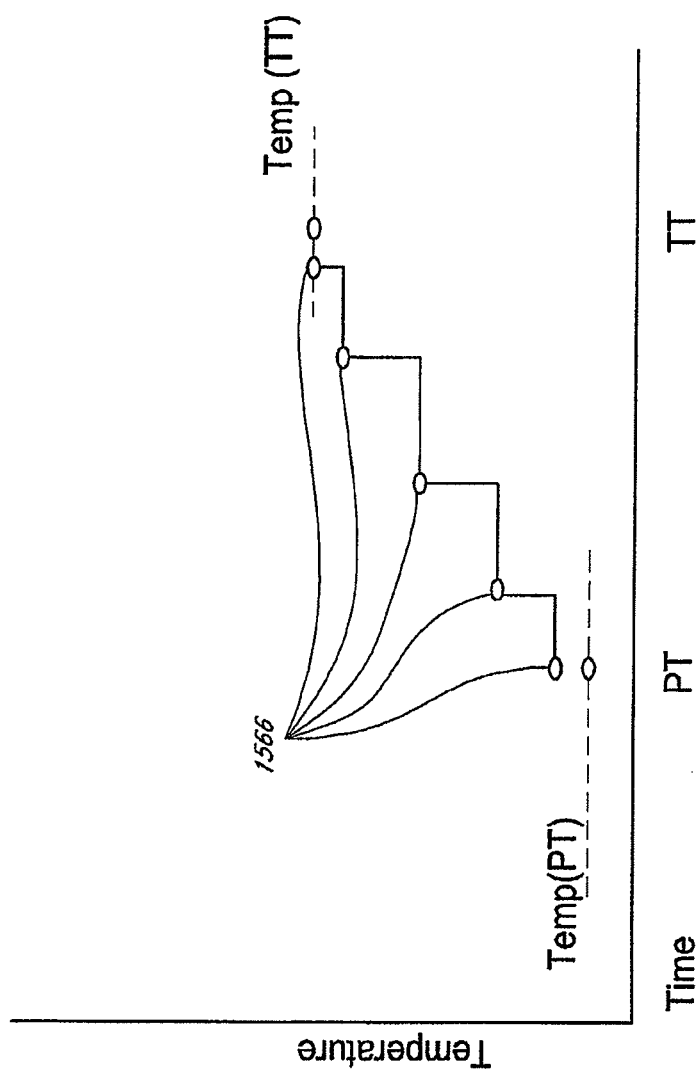

FIG. 11 shows a more detailed flowchart of the process. In step 1532, the server retrieves input parameters used to create a JIT event. These parameters include the maximum time allowed for a JIT event for load control device 108 (MTI); the target time the system is intended to hit the desired temperature (TT); and the desired inside temperature at TT (TempTT). It is useful to set a value for MTI because, for example, it will be reasonable to prevent the HVAC system from running a preconditioning event if it would be expected to take 8 hours, which might be prohibitively expensive.

In step 1534, the server retrieves data used to calculate the appropriate start time with the given input parameters. This data includes a set of algorithmic learning data (ALD), composed of historic readings from the load control device, together with associated weather data, such as outside temperature, solar radiation, humidity, wind speed and direction, etc; together with weather forecast data for the subject location for the period when the algorithm is scheduled to run (the weather forecast data, or WFD). The forecasting data can be as simple as a listing of expected temperatures for a period of hours subsequent to the time at which the calculations are performed, to more detailed tables including humidity, solar radiation, wind, etc. Alternatively, it can include additional information such as some or all of the kinds of data collected in the ALD.

In step 1536, the server uses the ALD and the WFD to create prediction tables that determine the expected rate of change or slope of inside temperature for each minute of air conditioner or heater cycle time ($\Delta T$) for the relevant range of possible pre-existing inside temperatures and outside climatic conditions. An example of a simple prediction table is illustrated in FIG. 13.

In step 1538, the server uses the prediction tables created in step 1106, combined with input parameters TT and Temp (TT) to determine the time at which slope $\Delta T$ intersects with predicted initial temperature PT. The time between PT and TT is the key calculated parameter: the preconditioning time interval, or PTI.

In step 1540, the server checks to confirm that the time required to execute the pre-conditioning event PTI does not exceed the maximum parameter MTI. If PTI exceeds MTI, the scheduling routine concludes and no ramping setpoints are transmitted to the load control device.

If the system is perfect in its predictive abilities and its assumptions about the temperature inside the conditioned space are completely accurate, then in theory the load control device can simply be reprogrammed once per JIT event—at time PT, the load control device can simply be reprogrammed to Temp (TT). However, there are drawbacks to this approach. First, if the server has been overly conservative in its predictions as to the possible rate of change in temperature caused by the heating or air conditioning system, the inside temperature will reach TT too soon, thus wasting energy and at least partially defeating the purpose of running the preconditioning routine in the first place. If the server is too optimistic in its projections, there will be no way to catch up, and the conditioned space will not reach Temp(TT) until after TT. Thus it would be desirable to build into the system a means for self-correcting for slightly conservative start times without excessive energy use. Second, the use of setpoints as a proxy for actual inside temperatures in the calculations is efficient, but can be inaccurate under certain circumstances. In the winter (heating) context, for example, if the actual inside temperature is a few degrees above the setpoint (which can happen when outside temperatures are warm enough that the conditioned space's natural "set point" is above the temperature setting), then setting the load control device to Temp(TT) at time PT will almost certainly lead to reaching TT too soon as well.

The currently preferred solution to both of these possible inaccuracies is to calculate and program a series of intermediate settings between Temp(PT) and Temp(TT) that are roughly related to $\Delta T$.

Thus if MTI is greater than PTI, then in step 1542 the server calculates the schedule of intermediate setpoints and time intervals to be transmitted to the load control device. Because thermostatic controllers cannot generally be programmed with steps of less than 1 degree F., $\Delta T$ is quantized into discrete interval data of at least 1 degree F. each. For example, if Temp(PT) is 65 degrees F., Temp(TT) is 72 degrees F., and PT is 90 minutes, the load control device might be programmed to be set at 66 for 10 minutes, 67 for 12 minutes, 68 for 15 minutes, etc. The server may optionally limit the process by assigning a minimum programming interval (e.g., at least ten minutes between setpoint changes) to avoid frequent switching of the HVAC system, which can reduce accuracy because air conditioners often include a compressor delay circuit, which may prevent quick corrections. The duration of each individual step may be a simple arithmetic function of the time PTI divided by the number of whole-degree steps to be taken; alternatively, the duration of each step may take into account second-order thermodynamic effects relating to the increasing difficulty of "pushing" the temperature inside a conditioned space further from its natural setpoint given outside weather conditions, etc. (that is, the fact that on a cold winter day it may take more energy to move the temperature inside the conditioned space from 70 degrees F. to 71 than it does to move it from 60 degrees to 61).

In step 1544, the server schedules setpoint changes calculated in step 1112 for execution by the load control device.

With this system, if actual inside temperature at PT is significantly higher than Temp(PT), then the first changes to setpoints will have no effect (that is, the load control device will not turn on the heater or air conditioner), and the heater, or air conditioner system will not begin using energy, until the appropriate time, as shown in FIG. 12. Similarly, if the server has used conservative predictions to generate ΔT, and the heater or air conditioner system runs ahead of the predicted rate of change, the incremental changes in setpoint will delay further increases until the appropriate time in order to again minimize unnecessary energy use.

FIG. 12(*a*) through 12(*d*) shows the steps in the preconditioning process as a graph of temperature and time. FIG. 12(*a*) shows step 1532, in which inputs target time TT 1552, target temperature Temp(TT) 1554, maximum conditioning interval MTI 1556 and the predicted inside temperature during the period of time the preconditioning event is likely to begin Temp(PT) 1558 are retrieved.

FIG. 12(*b*) shows the initial calculations performed in step 1538, in which expected rate of change in temperature ΔT 1560 inside the conditioned space is generated from the ALD and WFD using Temp(TT) 1554 at time TT 1552 as the endpoint.

FIG. 12(*c*) shows how in step 1538 ΔT 1560 is used to determine start time PT 1562 and preconditioning time interval PTI 1564. It also shows how in step 1540 the server can compare PTI with MTI to determine whether or not to instantiate the pre-conditioning program for the load control device.

FIG. 12(*d*) shows step 1542, in which specific ramped setpoints 1566 are generated. Because of the assumed thermal mass of the system, actual inside temperature at any given time will not correspond to setpoints until some interval after each setpoint change. Thus initial ramped setpoint 1216 may be higher than Temp(PT) 1558, for example.

FIG. 13 shows an example of the types of data that may be used by the server in order to calculate ΔT 1560. Such data may include inside temperature 1572, outside temperature 1574, cloud cover 1576, humidity 1578, barometric pressure 1580, wind speed 1582, and wind direction 1584.

Each of these data points should be captured at frequent intervals. In the preferred embodiment, as shown in FIG. 13, the interval is once every 60 seconds.

Figure 14:
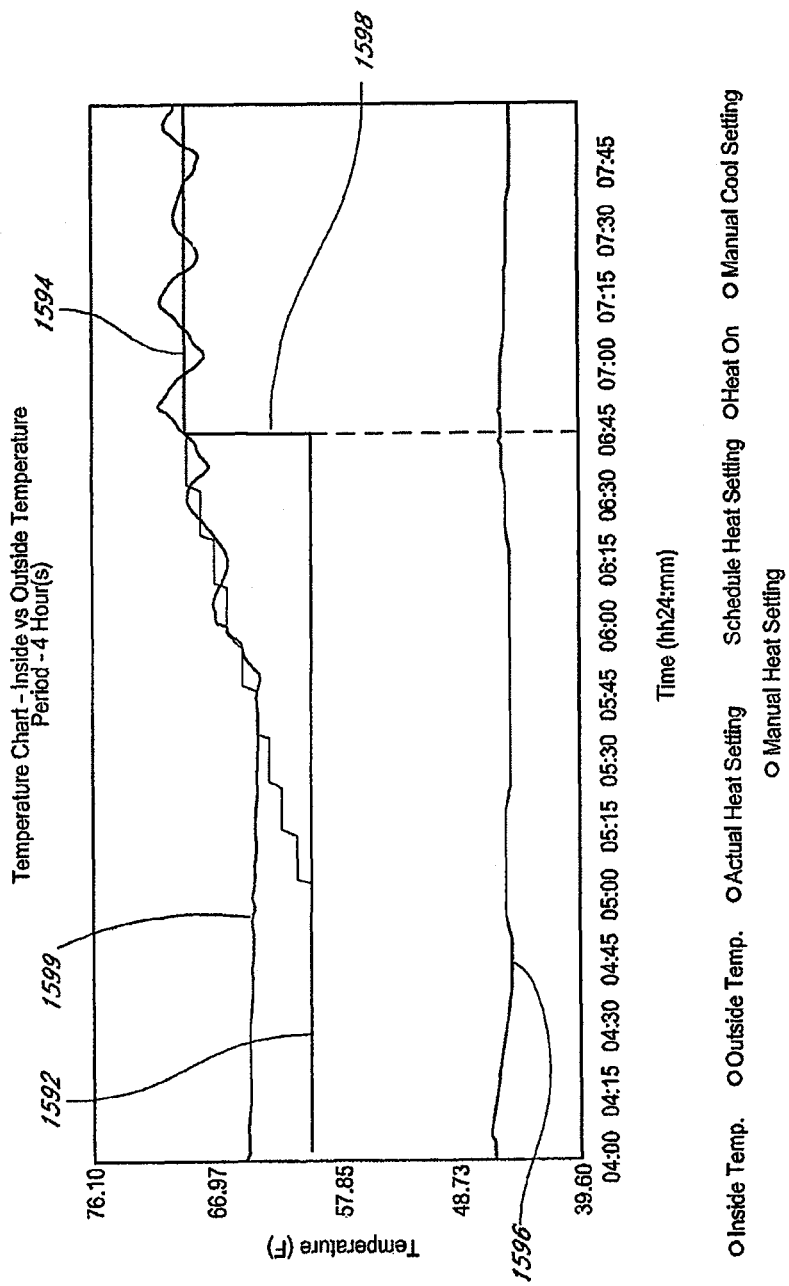
FIG. 14 shows an embodiment of the subject invention as applied in a specific conditioned space on a specific day.

FIG. 14 shows an actual application of JIT conditioning in the heating context. Temperature and setpoints are plotted for the 4-hour period from 4 AM to 8 AM with temperature on the vertical axis and time on the horizontal axis. The winter nighttime setpoint 1592 is 60 degrees F.; the morning setpoint temperature 1594 is 69 degrees F. The outside temperature 1596 is approximately 45 degrees F. The target time TT 1598 for the setpoint change to morning setting is 6:45 AM. In the absence of the subject invention, the user could program the load control device to change to the new setpoint at 6:45, but there is an inherent delay between a setpoint change and the response of the temperature inside the conditioned space. (In this conditioned space on this day, the delay is approximately fifty minutes.) Thus if the occupants truly desired to achieve the target temperature at the target time, some anticipation would be necessary. The amount of anticipation required depends upon numerous variables, as discussed above.

After calculating the appropriate slope ΔT 1560 by which to ramp inside temperature in order to reach the target as explained above, the server transmits a series of setpoints 1566 to the load control device 108 because the load control device is presumed to only accept discrete integers as program settings. (If a load control device is capable of accepting finer settings, as in the case of some thermostats designed to operate in regions in which temperature is generally denoted in Centigrade rather than Fahrenheit, which accept settings in half-degree increments, tighter control may be possible.) In any event, in the currently preferred embodiment of the subject invention, programming changes are quantized such that the frequency of setpoint changes is balanced between the goal of minimizing network traffic and the frequency of changes made on the one hand and the desire for accuracy on the other. Balancing these considerations may result in some cases in either more frequent changes or in larger steps between settings. As shown in FIG. 14, the setpoint "stairsteps" from 60 degrees F. to 69 degrees F. in nine separate setpoint changes over a period of 90 minutes.

Because the inside temperature 1599 when the setpoint management routine was instantiated at 5:04 AM was above the "slope" and thus above the setpoint, the heater was not triggered and no energy was used unnecessarily heating the conditioned space before such energy use was required. Actual energy usage does not begin until 5:49 AM.

Figure 15:
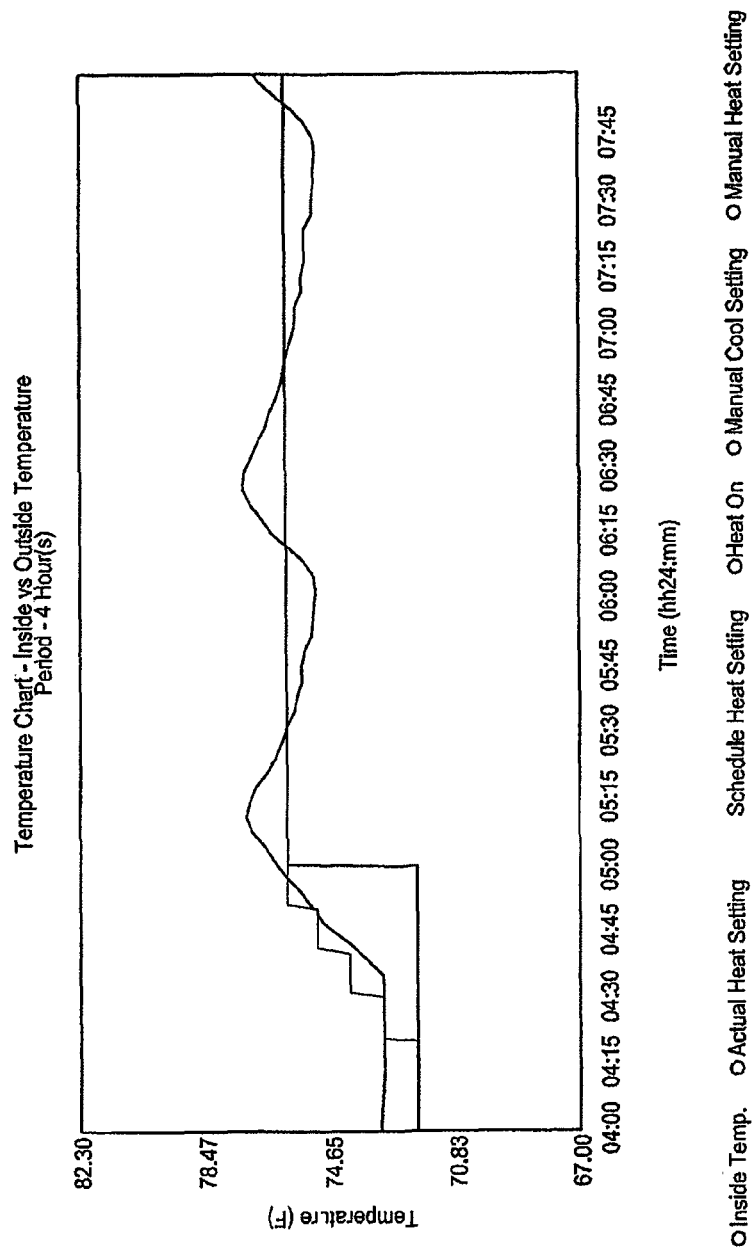
FIG. 15 shows an embodiment of the subject invention as applied in a different specific conditioned space on a specific day.

FIG. 15 shows application of the subject invention in a different structure during a similar four-hour interval. In FIG. 15, the predicted slope ΔT 1560 is less conservative relative to the actual performance of the conditioned space and the heater, so there is no off cycling during the preconditioning event—the HVAC system turns on at approximately 4:35 AM and stays on continuously during the event. The conditioned space reaches the target temperature Temp(TT) roughly two minutes prior to target time TT.

FIGS. 16-1 and 16-2 show a simple prediction table. The first column 1602 lists a series of differentials between outside and inside temperatures. Thus when the outside temperature is 14 degrees and the inside temperature is 68 degrees, the differential is −54 degrees; when the outside temperature is 94 degrees and the inside temperature is 71 degrees, the differential is 13 degrees. The second column 1604 lists the predicted rate of change in inside temperature ΔT 1210, assuming that the heater is running, in terms of degrees Fahrenheit of change per hour. A similar prediction table will be generated for predicted rates of change when the air conditioner is on; additional tables may be generated that predict how temperatures will change when the heater or air conditioner is off.

Alternatively, the programming of the just-in-time setpoints may be based not on a single rate of change for the entire event, but on a more complex multivariate equation that takes into account the possibility that the rate of change may be different for events of different durations.

The method for calculating start times may also optionally take into account not only the predicted temperature at the calculated start time, but may incorporate measured inside temperature data from immediately prior to the scheduled start time in order to update calculations, or may employ more predictive means to extrapolate what inside temperature based upon outside temperatures, etc.

An additional capability offered by the instant invention is the ability to adapt the programming of the load control device based upon the natural behavior of occupants. Because the instant invention is capable of recording the setpoint actually used at a connected load control device over time, it is also capable of inferring manual setpoint changes (as, for example, entered by pushing the "up" or "down" arrow on the control panel of the device) even when such overrides of the pre-set program are not specifically recorded as such by the load control device.

In order to adapt programming to take into account the manual overrides entered into load control device 108 using input devices such as buttons 210, it is first necessary to determine when a manual override has in fact occurred. Most thermostats, including many two-way communicating thermostats, do not record such inputs locally, and neither recognize nor transmit the fact that a manual override has occurred. Furthermore, in a system as described herein, frequent changes in setpoints may be initiated by algorithms running on the server, thereby making it impossible to infer a manual override from the mere fact that the setpoint has changed. It is therefore necessary to deduce the occurrence of such events from the data that the subject invention does have access to.

Figure 17:
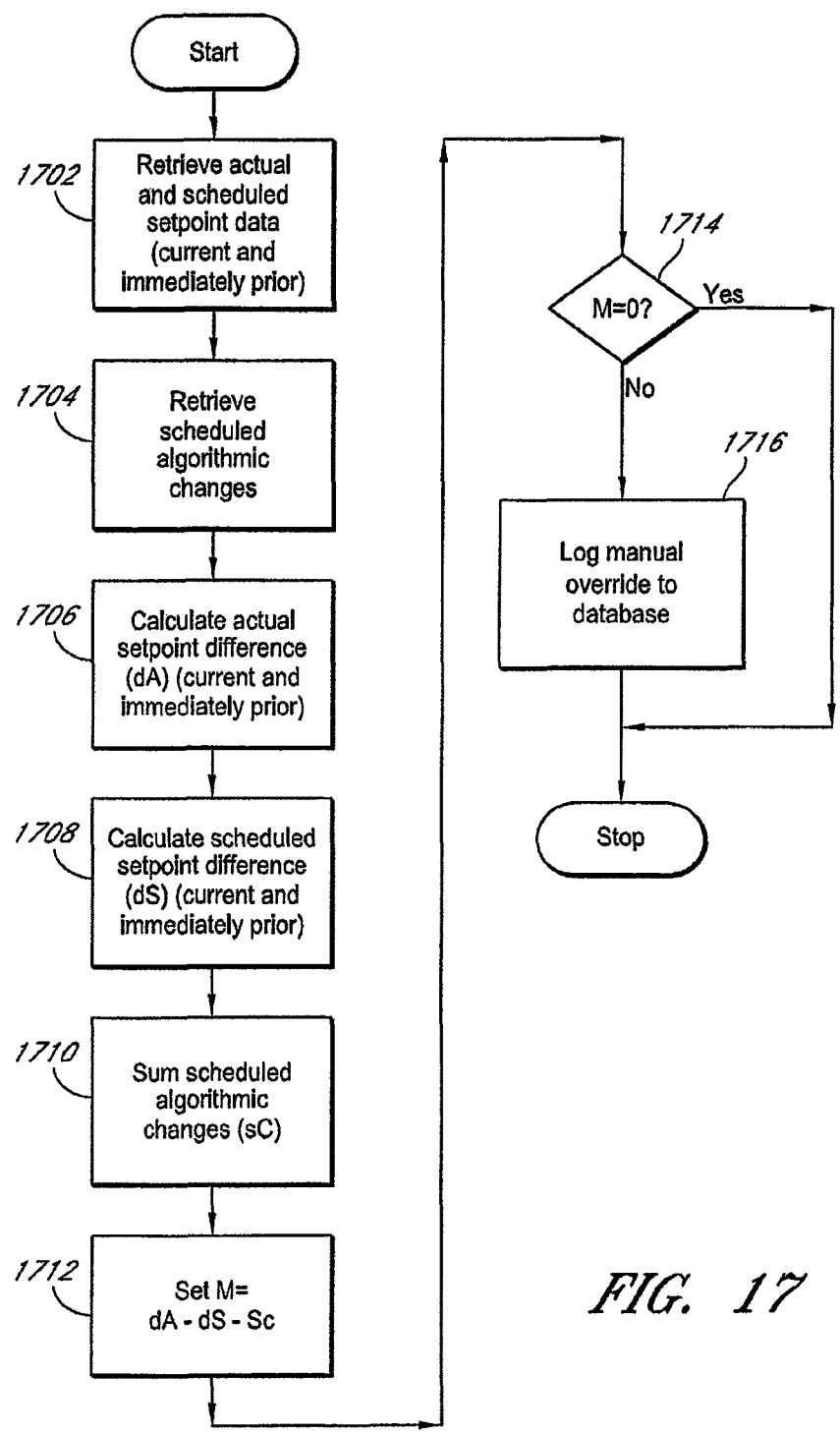
FIG. 17 shows how manual inputs can be recognized and recorded by an embodiment of the subject invention.

FIG. 17 illustrates the currently preferred method for detecting the occurrence of a manual override event. In step 1702, the server retrieves the primary data points used to infer the occurrence of a manual override from one or more databases in overall database structure 300. The data should include each of the following: for the most recent point at which it can obtain such data (time0) the actual setpoint as recorded at the load control device 108 at (A0); for the point immediately prior to time0 (time−1), the actual setpoint recorded at the load control device (A−1); for time0 the setpoint as scheduled by server 106 according to the basic setpoint programming (S0), and for time−1 the setpoint as scheduled by server 106 according to the standard setpoint programming (S−1). In step 1704, the server retrieves any additional automated setpoint changes C that have been scheduled for the load control device by server 106 at time0. Such changes may include algorithmic changes intended to reduce energy consumption, etc. In step 1706 the server calculates the difference (dA) between A0 and A−1; for example, if the actual setpoint is 67 degrees at T−1 and 69 at T0, dA is +2; if the setpoint at T−1 is 70 and the setpoint at T0 is 66, dA is −4. In step 1708, the server performs similar steps in order to calculate dS, the difference between S0 and S−1. This is necessary because, for example, the setpoint may have been changed because the server itself had just executed a change, such as a scheduled change from "away" to "home" mode. In step 1710 the server evaluates and sums all active algorithms and other server-initiated strategies to determine their net effect on setpoint at time0. For example, if one algorithm has increased setpoint at time0 by 2 degrees as a short-term energy savings measure, but another algorithm has decreased the setpoint by one degree to compensate for expected subjective reactions to weather conditions, the net algorithmic effect sC is +1 degree.

In step 1712, the server calculates the value for M, where M is equal to the difference between actual setpoints dA, less the difference between scheduled setpoints dS, less the aggregate of algorithmic change sC. In step 1714 the server evaluates this difference. If the difference equals zero, the server concludes that no manual override has occurred, and the routine terminates. But if the difference is any value other than zero, then the server concludes that a manual override has occurred. Thus in step 1716 the server logs the occurrence and magnitude of the override to one or more databases in overall database structure 300.

Figure 18:
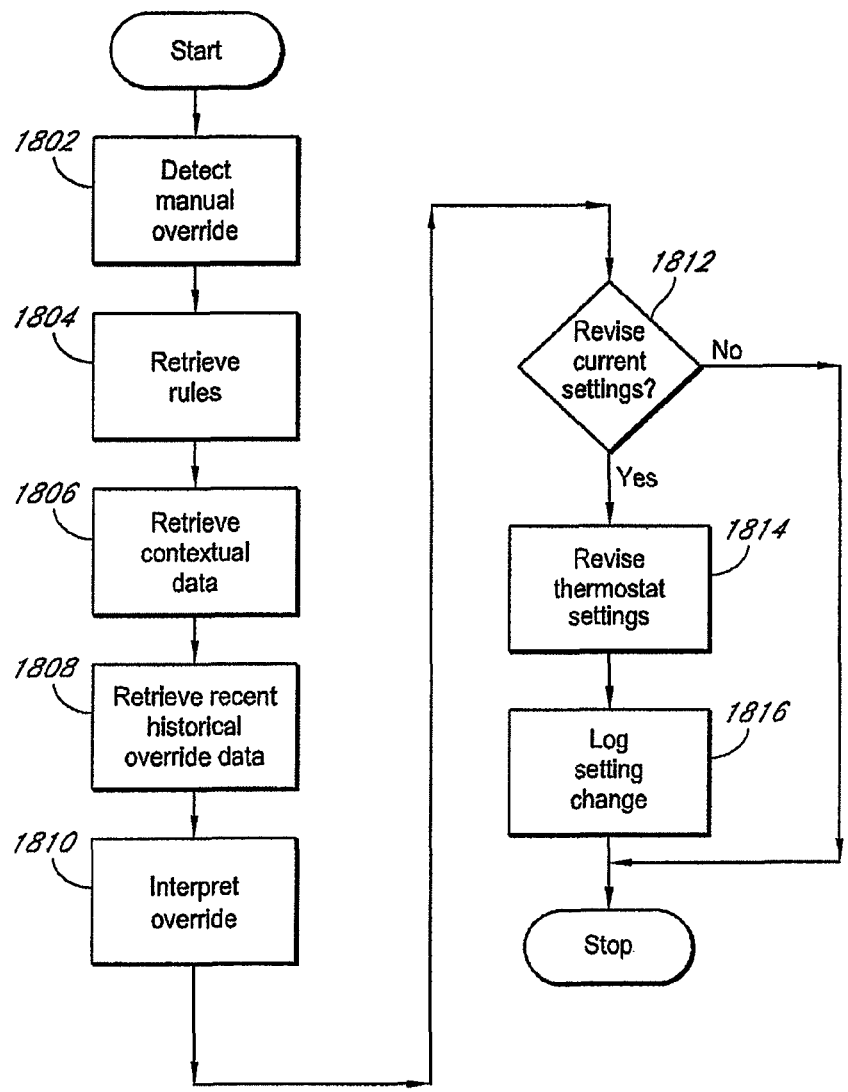
FIG. 18 shows how an embodiment of the subject invention uses manual inputs to interpret manual overrides and make short-term changes in response thereto.

The process of interpreting a manual override is shown in FIG. 18. Step 1802 is the detection of an override, as described in detail in FIG. 17. In step 1804 the server retrieves the stored rules for the subject load control device 108. Such rules may include weather and time-related inferences such as "if outside temperature is greater than 85 degrees and inside temperature is more than 2 degrees above setpoint and manual override lowers setpoint by 3 or more degrees, then revert to original setpoint in 2 hours," or "if heating setpoint change is scheduled from "away" to "home" within 2 hours after detected override, and override increases setpoint by at least 2 degrees, then change to "home" setting," or the like. In step 1806 the server retrieves contextual data required to interpret the manual override. Such data may include current and recent weather conditions, current and recent inside temperatures, etc. This data is helpful because it is likely that manual overrides are at least in part deterministic: that is, that they may often be explained by such contextual data, and that such understanding can permit anticipation of the desire on the part of the occupants to override and to adjust programming accordingly, so as to anticipate and obviate the need for such changes. The amount of data may be for a period of a few hours to as long as several days, or more. Recent data may be more heavily weighted than older data in order to assure rapid adaptation to situations in which manual overrides represent stable changes such as changes in work schedules, etc. In step 1808 the server retrieves any relevant override data from the period preceding the specific override being evaluated that has not yet been evaluated by and incorporated into the long-term programming and rules engines as described below in FIG. 19. In step 1810 the server evaluates the override and determines which rule, if any, should be applied as a result of the override. In step 1812 the server determines whether to alter the current setpoint as a result of applying the rules in step 1810. If no setpoint change is indicated, then the routine ends. If a setpoint change is indicated, then in step 1814 the server transmits the setpoint change to the load control device for execution, and in step 1816 it records that change to one or more databases in overall database structure 300.

Figure 19:
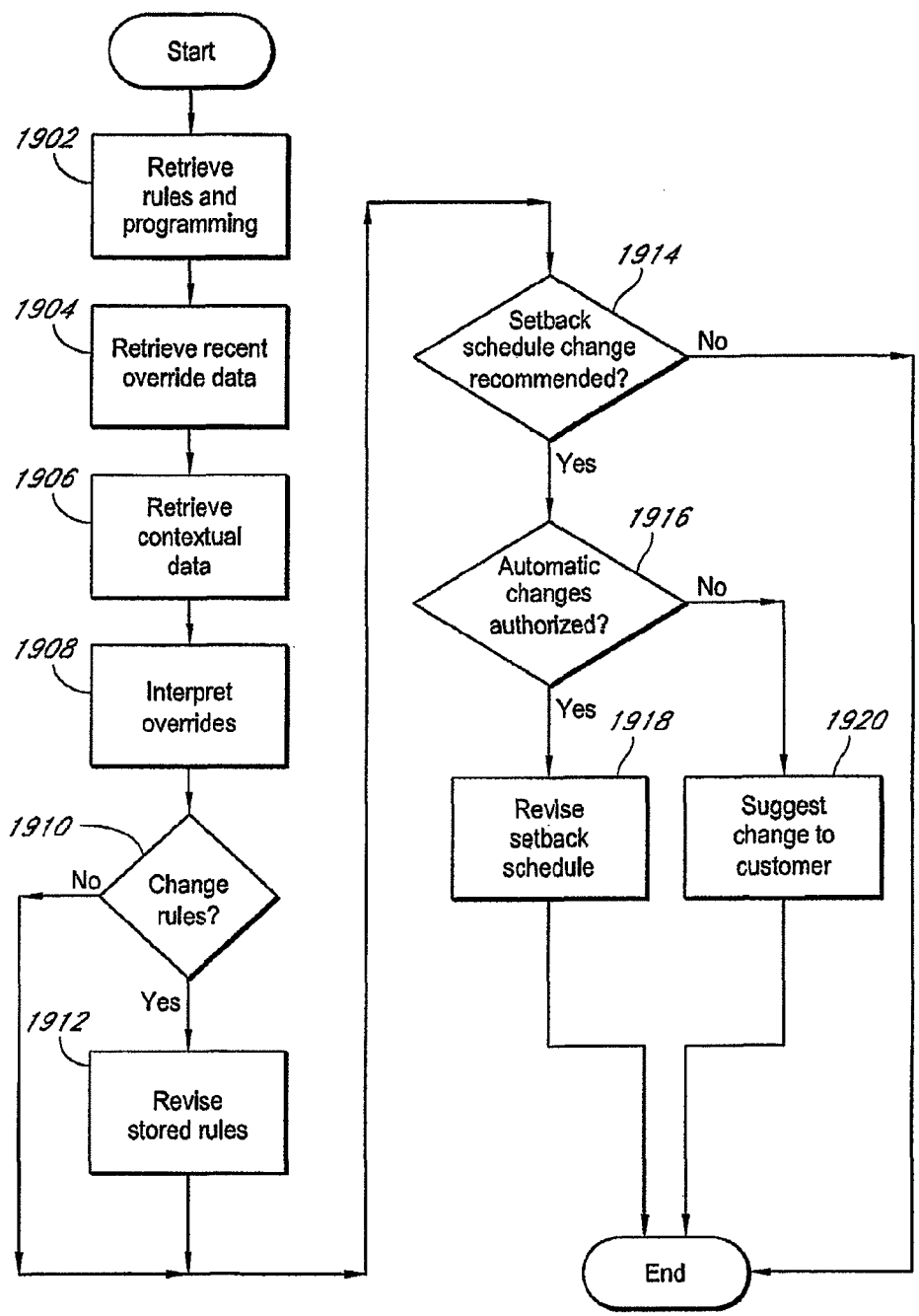
FIG. 19 shows how an embodiment of the subject invention uses manual inputs to make long-term changes to interpretive rules and to setpoint scheduling.

In order to ensure that both the stored rules for interpreting manual overrides and the programming itself continue to most accurately reflect the intentions of the occupants, the server can periodically review both the rules used to interpret overrides and the setpoint scheduling employed. FIG. 19 shows the steps used to incorporate manual overrides into the long-term rules and setpoint schedule. In step 1902 the server retrieves the stored programming for a given load control device 108 as well as the rules for interpreting overrides for that load control device. In step 1904 the server retrieves the recent override data as recorded in FIGS. 17 and 18 to be evaluated for possible revisions to the rules and the programming. In step 1906 the server retrieves the contextual data regarding overrides retrieved in step 1904 (Because the process illustrated in FIG. 19 is not presently expected to be executed as a real-time process, and is expected to be run anywhere from once per day to once per month, the range and volume of contextual data to be evaluated is likely to be greater than in the process illustrated in FIG. 18). In step 1908 the server interprets the overrides in light of the existing programming schedule, rules for overrides, contextual data, etc. In step 1910 the server determines whether, as a result of those overrides as interpreted, the rules for interpreting manual overrides should be revised. If the rules are not to be revised, the server moves to step 1914. If the rules are to be revised, then in step 1912 the server revises the rules and the new rules are stored in one or more databases in overall database structure 300. In step 1914 the server determines whether any changes to the baseline programming for the load control device should be revised. If not, the routine terminates. If revisions are warranted, then in step 1916 the server retrieves from database 900 the permissions the server has to make autonomous changes to settings. If the server has been given permission to make the proposed changes, then in step 1918 the server revises the load control device's programming and writes the changes to one or more databases in overall database structure 300. If the server has not been authorized to make such changes autonomously, then in step 1920 the server transmits the recommendation to change settings to the customer in the manner previously specified by the customer, such as email, changes to the customer's home page as displayed on website 200, etc.

Additional means of implementing the instant invention may be achieved using variations in system architecture. For example, much or even all of the work being accomplished by remote server 106 may also be done by load control device 108 if that device has sufficient processing capabilities, memory, etc. Alternatively, these steps may be undertaken by a local processor such as a local personal computer, or by a dedicated appliance having the requisite capabilities, such as gateway 112.

An additional way in which the instant invention can reduce energy consumption with minimal impact on comfort is to use the load control device to vary the turn-on delay enforced for an attached air conditioner after the air conditioner's compressor is turned off. Compressor delay is usually used to protect compressors from rapid cycling, which can physically damage them. Alteration of compressor delay settings may also be used as an energy saving strategy.

The ability to predict the rate of change in inside temperature in a given house under varying conditions may also be applied to permit calculation of the effect of different compressor delay settings on inside temperatures, air conditioner cycling and energy consumption.

Figure 20:
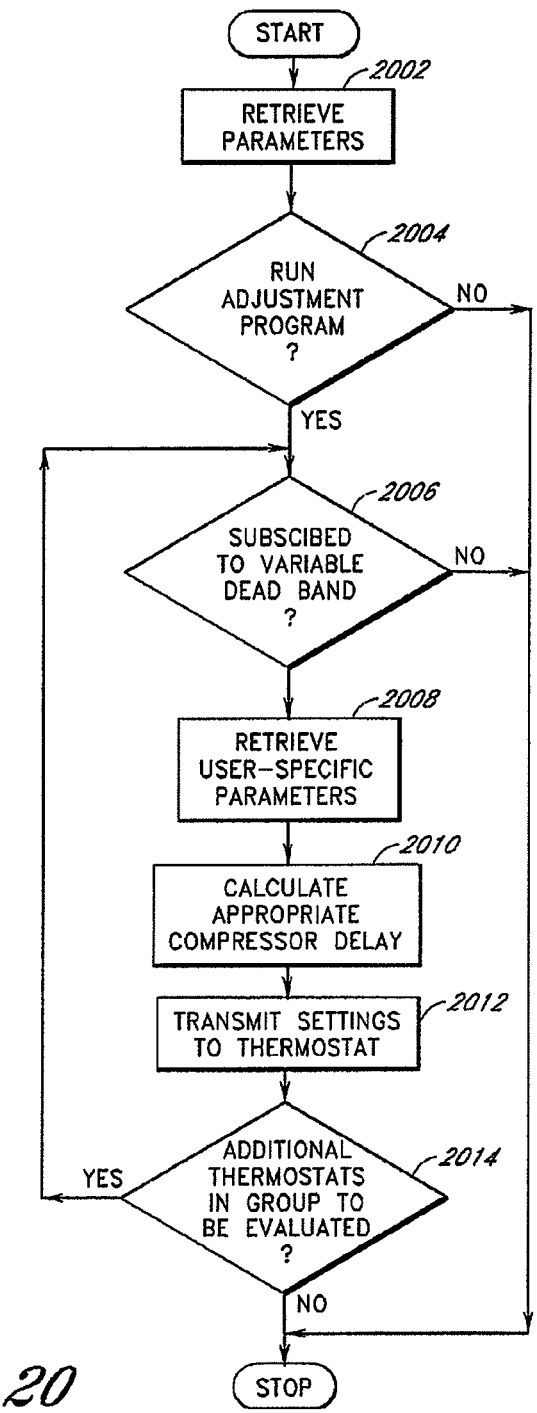
FIG. 20 shows a flowchart illustrating the steps required to initiate a compressor delay adjustment event.

FIG. 20 shows a flowchart illustrating the steps required to initiate a compressor delay adjustment event. In step 2002, server 106 retrieves parameters such as weather conditions, the current price per kilowatt-hour of electricity, and the state of the electric grid in terms of supply versus demand for the geographic area that includes a given conditioned space. In step 2004 server 106 determines whether to instantiate the compressor delay adjustment program for a certain air conditioner in response to those conditions. In step 2006, server 106 determines whether a specific conditioned space is subscribed to participate in compressor delay events. If a given conditioned space is subscribed, then in step 2008 the server retrieves the parameters needed to specify the compressor delay routine for that conditioned space. These may include user preferences, such as the weather, time of day and other conditions under which the user has elected to permit such changes, the maximum length of compressor delay authorized, etc. In step 2010 the appropriate compressor delay settings are determined, and in step 2012 the chosen settings are communicated to the load control device. In step 2014 the server determines if additional thermostats or load control devices in the given group must still be evaluated. If so, the server returns to step 2006 and repeats the subsequent steps with the next thermostat or load control device. If not, the routine ends.

Figure 21C:
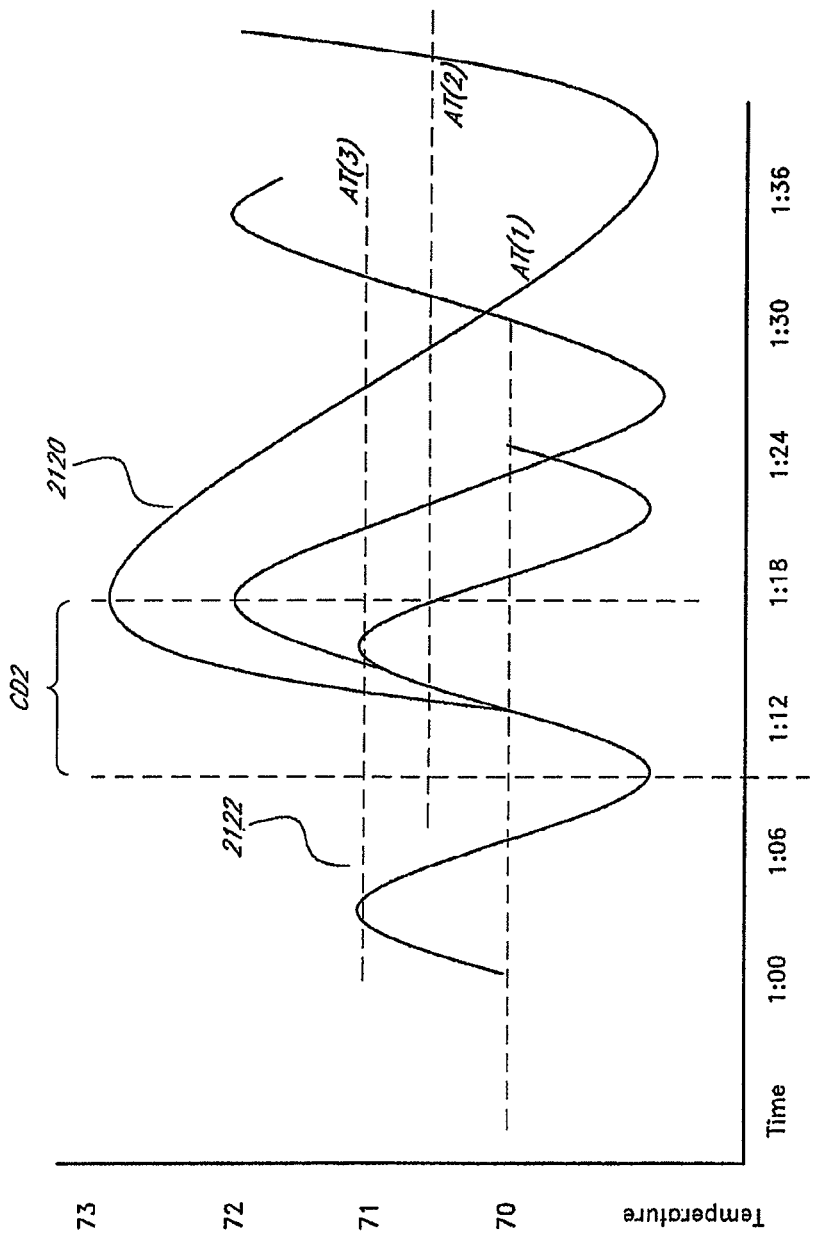

FIGS. 21(*a*) through 21(*c*) illustrate how changes in compressor delay settings affect air conditioner cycling behavior by plotting time against temperature. In FIG. 21(*a*), time is shown on the horizontal axis 2102, and temperature is shown on vertical axis 2104. The setpoint for load control device 108 is 70 degrees F., which results in the cycling behavior shown for inside temperature 2106. Because compressor delay CD1 2108 is, at approximately 3 minutes, shorter than the natural duration of a compressor off cycle Off1 2110 at approximately 6 minutes for this particular system under the illustrated conditions, the compressor delay has no effect on the operation of the air conditioner. Because the hysteresis band operates to so as to maintain the temperature within a range of plus or minus one degree of the setpoint, the air conditioner will switch on when the inside temperature reaches 71 degrees, continue operating until it reaches 69 degrees, then shut off. The system will then remain off until it reaches 71 degrees again, at which time it will again switch on. The percentage of time during which inside temperature is above or below the setpoint will depend on conditions and the dynamic signature of the individual conditioned space. Under the conditions illustrated, the average inside temperature ΔT1 2112 is roughly equal to the setpoint of 70 degrees.

FIG. 21(*b*) shows how with the same environmental conditions as in FIG. 21(*a*), the cycling behavior of the inside temperature changes when the compressor delay is longer than the natural compressor off cycle Off1 2110. Extended compressor delay CD2 2114 allows inside temperature 2116 to climb above the range normally enforced by the hysteresis band. Because CD2 is roughly minutes, under the given conditions the inside temperature climbs to approximately 72 degrees before the compressor delay allows the air conditioner to restart and drive the inside temperature back down. But as before, the load control device shuts off the air conditioner when the inside temperature reaches 69 degrees. Thus the average temperature is increased from AT1 2112 to AT2 2118. This change will save energy and reduce cycling because it takes less energy to maintain a higher inside temperature with an air conditioner. However, the setpoint reported by the display of the load control device (if any) or the user interface accessible from a browser will continue to be the occupant's chosen setpoint of 70 degrees.

FIG. 21(*c*) shows how the same compressor delay can result in different thermal cycling with different weather conditions. The greater the amount by which outside temperature exceeds inside temperature in the air conditioning context, the more rapidly the inside temperature will increase during an off cycle, and the slower the air conditioner will be able to cool during the on cycle. Thus as compared to FIG. 21(*b*), when the inside temperature increased to roughly 72 degrees during the extended compressor delay of 8 minutes, a higher outside temperature will cause the inside temperature to increase faster, which results in a peak temperature of roughly 73 degrees, and in wider temperature cycling 2120. The average inside temperature consequently increases from AT(2) 2118 to AT(3) 2122.

It should be noted that the shape of the actual waveform will most likely not be sinusoidal, but for ease of illustration it is sometimes be presented as such in the figures.

Residential air conditioning is a major component of peak load. The traditional approach to dealing with high demand on hot days is to increase supply—build new powerplants, or buy additional capacity on the spot market. But because reducing loads has come to be considered a superior strategy for matching electricity supply to demand when the grid is stressed, the ability to shed load by turning off air conditioners during peak events has become a useful tool for managing loads. A key component of any such system is the ability to document and verify that a given air conditioner has actually turned off. Data logging hardware can accomplish this, but due to the cost is usually only deployed for statistical sampling, and is rarely applied to window-mount air conditioners. The instant invention provides a means to verify demand response without additional hardware such as a data logger.

Because server 106 logs the temperature readings from inside each house (whether once per minute or over some other interval), as well as the timing and duration of air conditioning cycles, database 300 will contain a history of the thermal performance of the conditioned space associated with each load control device. That performance data will allow the server 106 to calculate an effective thermal mass for each such conditioned space—that is, the speed with the inside temperature will change in response to changes in outside temperature. Because the server will also log these inputs against other inputs including time of day, humidity, etc. the server will be able to predict, at any given time on any given day, the rate at which inside temperature should change for given inside and outside temperatures. This will permit remote verification of load shedding by the air conditioner without directly measuring or recording the electrical load drawn by the air conditioner.

Figure 22:
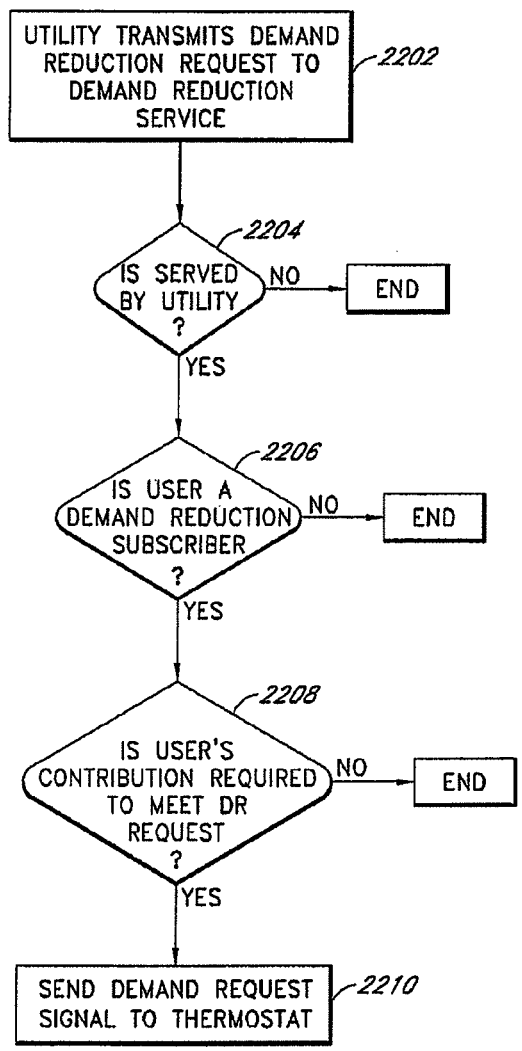
FIG. 22 is a flow chart illustrating the steps involved in generating a demand reduction event for a given subscriber.

FIG. 22 shows the steps followed in order to initiate air conditioner shutoff (or resetting its effective setpoint to a higher temperature). When a summer peak demand situation occurs, a utility or load aggregator will transmit an email 2202 or other signal to server 106 requesting a reduction in load. Server 106 will determine 2204 if a given user is served by the utility seeking reduction; determine 2206 if a given user has agreed to reduce peak demand; and determine 2208 if a reduction of consumption by the user is required or desirable in order to achieve the reduction in demand requested by the utility. The server will transmit 2210 a signal to the user's load control device 108 signaling it to shut off the air conditioner 110.

Figure 23:
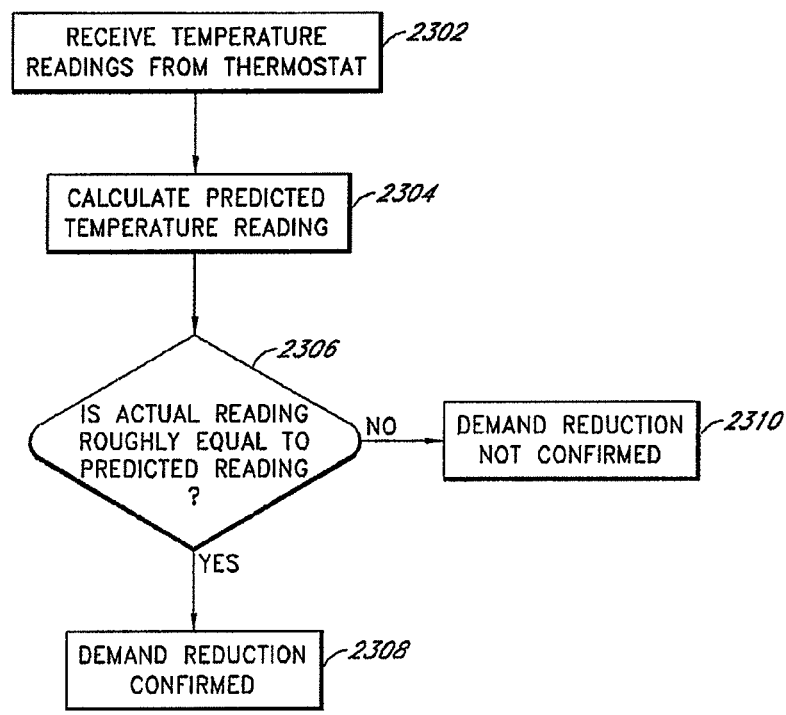
FIG. 23 is a flow chart illustrating the steps involved in confirming that a demand reduction event has taken place.

FIG. 23 shows the steps followed in order to verify that the air conditioner has in fact been shut off. Server 106 will receive and monitor 2302 the temperature readings sent by the user's load control device 108. The server then calculates 2304 the temperature reading to be expected for that load control device given inputs such as current and recent outside temperature, recent inside temperature readings, the calculated thermal mass of the structure, temperature readings in other houses, etc. The server will compare 2306 the predicted reading with the actual reading. If the server determines that the temperature inside the house is rising at the rate predicted if the air conditioning is shut off, then the server confirms 2308 that the air conditioning has been shut off. If the temperature reading from the load control device shows no increase, or significantly less increase than predicted by the model, then the server concludes 2310 that the air conditioning was not switched off, and that no contribution to the demand response request was made.

For example, assume that on at 3 PM on date Y utility X wishes to trigger a demand reduction event. A server at utility X transmits a message to the server at demand reduction service provider Z requesting W megawatts of demand reduction. The demand reduction service provider server determines that it will turn off the air conditioner in the building containing load control device A in order to achieve the required demand reduction. At the time the event is triggered, the inside temperature as reported by the load control device A is 72 degrees F. The outside temperature near the building containing load control device A is 96 degrees Fahrenheit. The inside temperature at in the building containing load control device B, which is not part of the demand reduction program, but is both connected to the demand reduction service server and located geographically proximate to the building containing load control device A, is 74 F. Because the air conditioner controlled by load control device A has been turned off, the temperature inside in the building containing load control device A begins to rise, so that at 4 PM it has increased to 79 F. Because the server is aware of the outside temperature, which remains at 96 F, and of the rate of temperature rise inside the building containing load control device A on previous days on which temperatures have been at or near 96 F, and the temperature in the building containing load control device B, which has risen only to 75 F because the air conditioning in the building containing load control device B continues to operate normally, the server is able to confirm with a high degree of certainty that the air conditioner in the building containing load control device A has indeed been shut off.

In contrast, if the air conditioner in the building containing load control device A has been plugged in so as to bypass the load control device 108, so that a demand reduction signal from the server does not actually result in shutting off the air conditioner in the building containing load control device A, when the server compares the rate of temperature change in the building containing load control device A against the other data points, the server will receive data inconsistent with the rate of increase predicted. As a result, it will conclude that the air conditioner has not been shut off as expected, and may not credit load control device A with the financial credit that would be associated with demand reduction compliance, or may trigger a business process that could result in termination of load control device A's participation in the demand reduction program.

FIG. 24 illustrates the movement of signals and information between the components of one embodiment of the subject invention to trigger and verify a demand reduction response. Where demand response events are undertaken on behalf of a utility by a third party, participants in the communications may include electric utility server 2400, demand reduction service server 106, and load control device 108. In step 2402 the electric utility server 2400 transmits a message to demand reduction service server 106 requesting a demand reduction of a specified duration and size. Demand reduction service server 106 uses database 300 to determine which subscribers should be included in the demand reduction event. For each included subscriber, the server then sends a signal 2404 to the subscriber's load control device 108 instructing it (a) to shut down at the appropriate time or (b) to allow the temperature as measured by the load control device to increase to a certain temperature at the specified time, depending upon the agreement between the user and the demand reduction aggregator. The server then receives 2406 temperature signals from the subscriber's load control device. At the conclusion of the demand reduction event, the server transmits a signal 2408 to the load control device permitting it to signal its attached air conditioner to resume cooling, if the system has been shut off, or to reduce the target temperature to its pre-demand reduction setting, if the target temperature was merely increased. If load control device 108 is capable of storing scheduling information, these instructions may be transmitted prior to the time they are to be executed and stored locally. After determining the total number of subscribers actually participating in the DR event, the server then calculates the total demand reduction achieved and sends a message 2410 to the electric utility confirming such reduction.

Additional steps may be included in the process. For example, if the subscriber has previously requested that notice be provided when a peak demand reduction event occurs, the server will also send an alert, which may be in the form of an email or text message or an update to the personalized web page for that user, or both. If the server determines that a given user has (or has not) complied with the terms of its demand reduction agreement, the server may send a message to the subscriber confirming that fact.

It should also be noted that in some climate zones, peak demand events occur during extreme cold weather rather than (or in addition to) during hot weather. The same process as discussed above could be employed to reduce demand by shutting off electric heaters and monitoring the rate at which temperatures fall.

It should also be noted that the peak demand reduction service can be performed directly by an electric utility, so that the functions of server 106 can be combined with the functions of server 2400.

The system installed in a subscriber's conditioned space may optionally include additional temperature sensors at different locations within the building. These additional sensors may be connected to the rest of the system via a wireless system such as 802.11 or 802.15.4, or may be connected via wires. Additional temperature and/or humidity sensors may allow increased accuracy of the system, which can in turn increase user comfort, energy savings or both.

Bi-directional communication between server 106 and load control device 108 will also allow the load control device to regularly measure and send to server 106 information about the temperature in the conditioned space. By comparing outside temperature, inside temperature, temperature settings, cycling behavior of the heater or air conditioner system, and other variables, the system will be capable of numerous diagnostic and controlling functions beyond those of a standard load control device or thermostat.

Figure 25A:
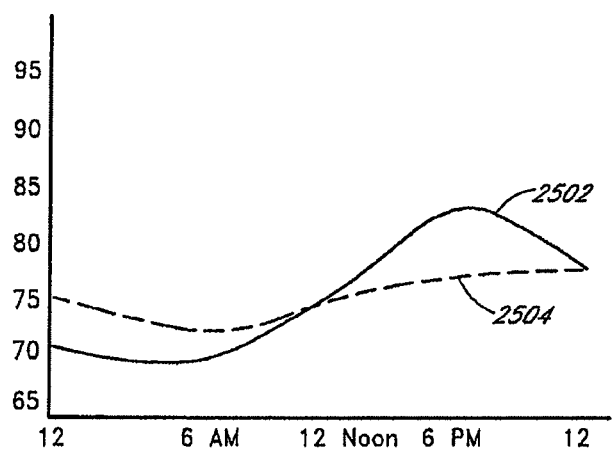
FIGS. 25a and 25b show graphical representations of inside and outside temperatures in two different conditioned spaces, one with high thermal mass and one with low thermal mass.

For example, FIG. 25a shows a graph of inside temperature and outside temperature for a 24-hour period in conditioned space A, assuming no air conditioner activity. Conditioned space A has double-glazed windows and is well insulated. When outside temperature 2502 increases, inside temperature 2504 follows, but with significant delay because of the thermal mass of the building.

Figure 25B:
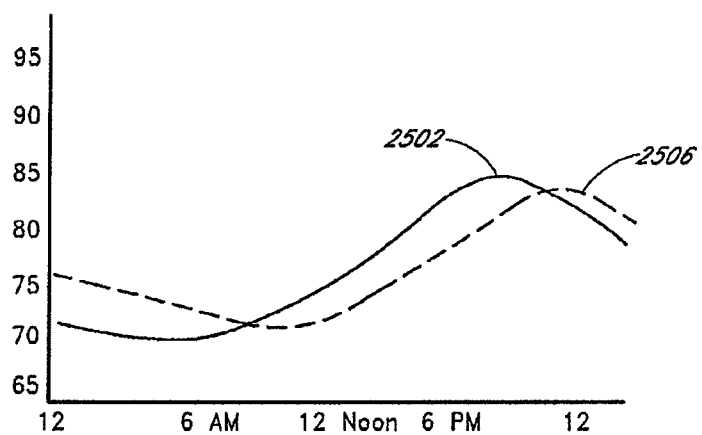

FIG. 25b shows a graph of inside temperature and outside temperature for the same 24-hour period in conditioned space B. Conditioned space B is identical to conditioned space A except that it (i) is located a block away and (ii) has single-glazed windows and is poorly insulated. Because the two buildings are so close to each other, outside temperature 2502 is the same in FIG. 25a and FIG. 25b. But the lower thermal mass of conditioned space B means that the rate at which the inside temperature 2506 changes in response to the changes in outside temperature is much greater.

Figure 26A:
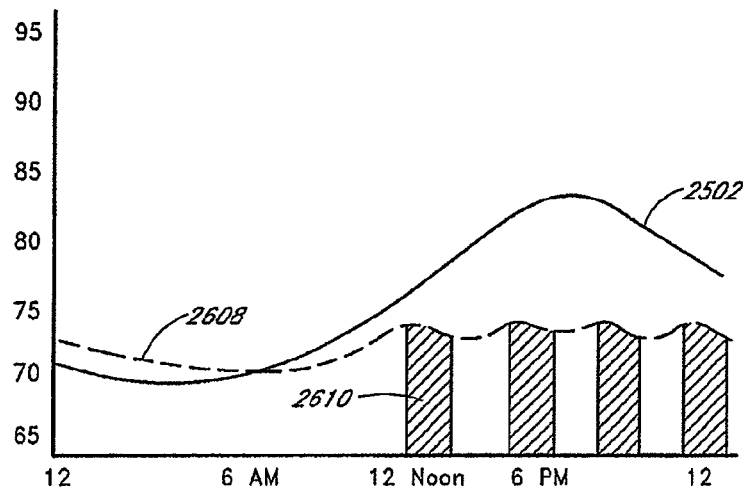
FIGS. 26a and 26b show graphical representations of inside and outside temperatures in the same conditioned spaces as in FIGS. 25a and 25b, showing the cycling of the air conditioning systems in those conditioned spaces.

The differences in thermal mass will affect the cycling behavior of the air conditioners and heaters in the two conditioned spaces as well. FIG. 26a shows a graph of inside temperature and outside temperature in conditioned space A for the same 24-hour period as shown in FIG. 6a, but assuming that the air conditioning is being used to try to maintain an internal temperature of 70 degrees. Outside temperatures 2502 are the same as in FIGS. 25a and 25b. Inside temperature 2608 is maintained within the range determined by load control device 108 by the cycling of the air conditioner. Because of the high thermal mass of the house, the air conditioning does not need to run for very long to maintain the target temperature, as shown by shaded areas 2610.

Figure 26B:
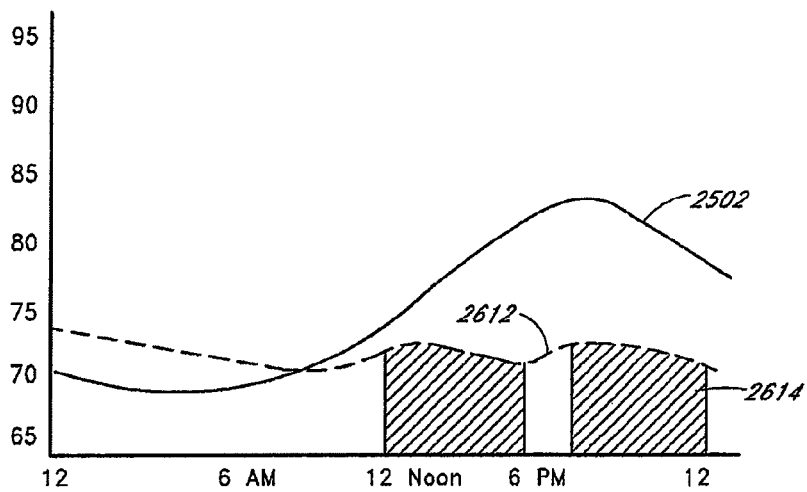

FIG. 26b shows a graph of inside temperature 2612 and outside temperature 2502 for the same 24-hour period in conditioned space B, assuming use of the air conditioning as in FIG. 26a. Because of the lower thermal mass of conditioned space B, the air conditioning system in conditioned space B has to run longer in order to maintain the same target temperature range, as shown by shaded areas 2614.

Because server 106 logs the temperature readings from each load control device (whether once per minute or over some other interval), as well as the timing and duration of air conditioning cycles, database 300 will contain a history of the thermal performance of each conditioned space. That performance data will allow the server 106 to calculate an effective thermal mass for each such space—that is, the speed with the inside temperature will change in response to changes in outside temperature and differences between inside and outside temperatures. Because the server 106 will also log these inputs against other inputs including time of day, humidity, etc. the server will be able to predict, at any given time on any given day, the rate at which inside temperature should change for given inside and outside temperatures.

Figure 27A:
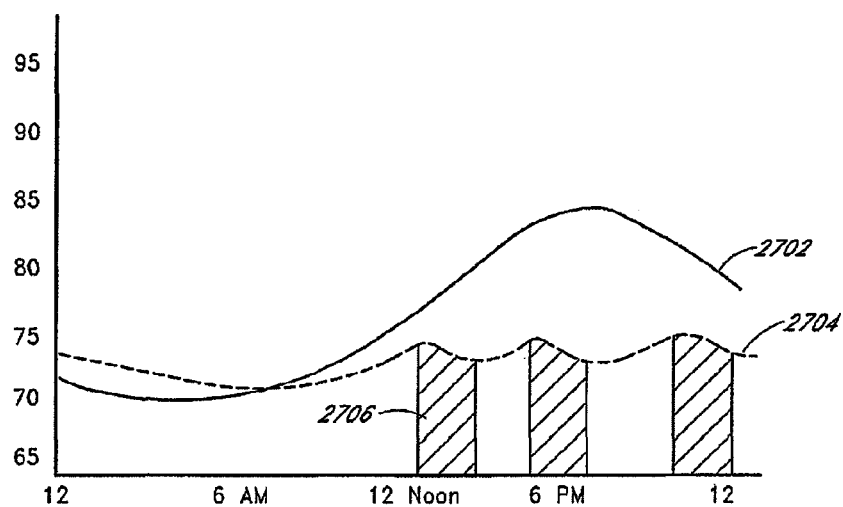
FIGS. 27a and 27b show graphical representations of inside and outside temperatures in the same conditioned space as in FIGS. 25a and 26a, showing the cycling of the air conditioning on two different days in order to demonstrate the effect of a change in operating efficiency on the parameters measured by the thermostat or load control device.
Figure 27B:
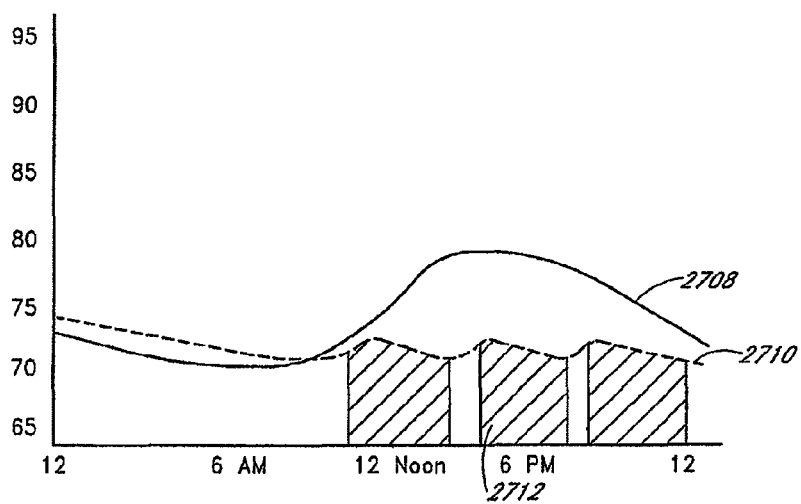

The server will also record the responses of each conditioned space to changes in outside conditions and cycling behavior over time. That will allow the server to diagnose problems as and when they develop. For example, FIG. 27a shows a graph of outside temperature 2702, inside temperature 2704 and air conditioner cycle times 2706 in conditioned space A for a specific 24-hour period on date X. Assume that, based upon comparison of the performance of conditioned space A on date X relative to conditioned space A's historical performance, and in comparison to the performance of conditioned space A relative to other nearby conditioned spaces on date X, the air conditioner in conditioned space A is presumed to be operating at normal efficiency, and that conditioned space A is in the $86^{th}$ percentile as compared to those other conditioned spaces. FIG. 27b shows a graph of outside temperature 2708, inside temperature 2710 and air conditioner cycle times 2712 in conditioned space A for the 24-hour period on date X+1. Conditioned space A's HVAC system now requires significantly longer cycle times in order to try to maintain the same internal temperature. If those longer cycle times were due to higher outside temperatures, those cycle times would not indicate the existence of any problems. But because server 106 is aware of the outside temperature, the system can eliminate that possibility as an explanation for the longer cycle times. Because server 106 is aware of the cycle times in nearby conditioned spaces, it can determine that, for example, on date X+1 the efficiency of the air conditioner in conditioned space A is only in the $23^{rd}$ percentile. The server will be programmed with a series of heuristics, gathered from predictive models and past experience, correlating the drop in efficiency and the time interval over which it has occurred with different possible causes. For example, a 50% drop in efficiency in one day may be correlated with a refrigerant leak, especially if followed by a further drop in efficiency on the following day. A reduction of 10% over three months may be correlated with a clogged filter. Based upon the historical data recorded by the server, the server 106 will be able to alert the user that there is a problem and suggest a possible cause.

Figure 28A:
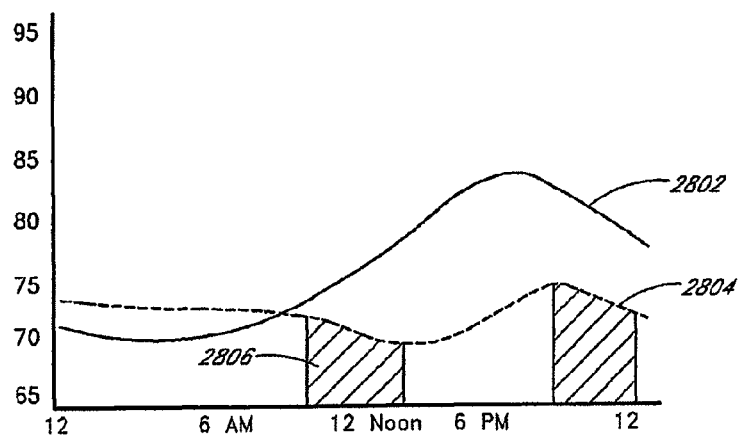
FIGS. 28a and 28b show the effects of employing a pre-cooling strategy in two different conditioned spaces.
Figure 28B:
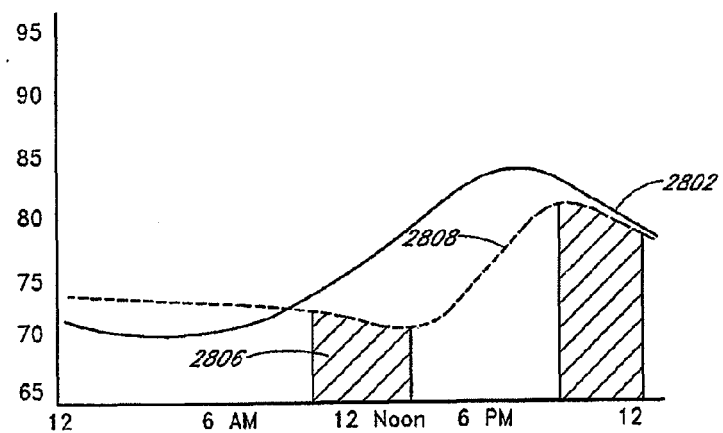

Because the system will be able to calculate effective thermal mass, it will be able to determine the cost effectiveness of strategies such as pre-cooling for specific houses under different conditions. FIG. 28a shows a graph of outside temperature 2802, inside temperature 2804 and air conditioner cycling times 2806 in conditioned space A for a specific 24-hour period on date Y assuming that the system has used a pre-cooling strategy to avoid running the air conditioning during the afternoon, when rates are highest. Because conditioned space A has high thermal mass, it is capable of "banking" cooling, and energy consumed during off-peak hours is in effect stored, allowing the conditioned space to remain cool even when the system is turned off. Temperatures keep rising during the period the air conditioner is off, but because thermal mass is high, the rate of increase is low, and the conditioned space is still comfortable six hours later. Although the pre-cooling cycle time is relatively long, the customer may still benefit if the price per kilowatt during the morning pre-cooling phase is lower than the price during the peak load period. FIG. 28b shows a graph of the same outside temperature 2802 in conditioned space B as for conditioned space A in FIG. 28a for the same 24-hour period and using the same pre-cooling strategy as shown by cycling times 2806. But because conditioned space B has minimal thermal mass, using additional electricity in order to pre-cool the space does not have the desired effect; inside temperature 2808 warms up so fast that the cooling that had been banked is quickly lost. Thus the system will recommend that conditioned space A be pre-cooled in order to save money, but not recommend pre-cooling for conditioned space B.

Figure 29A:
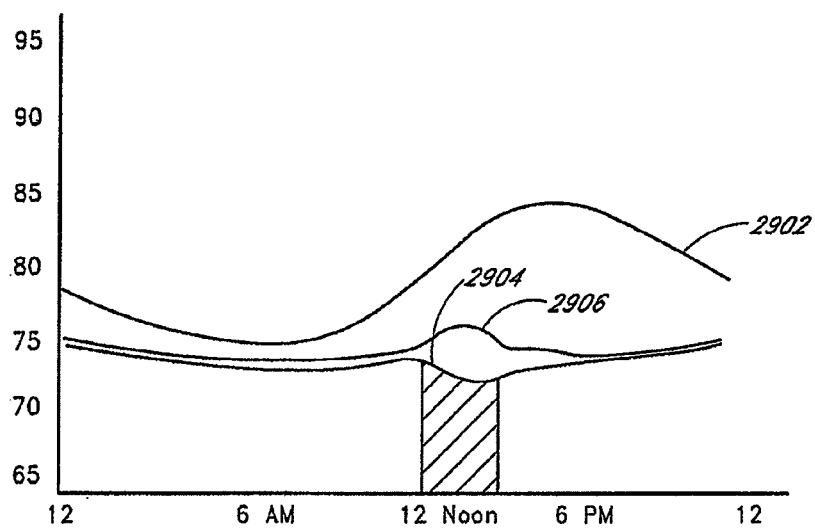
FIGS. 29a and 29b show graphical representations of inside and outside temperatures in two different conditioned spaces in order to demonstrate how the system can correct for erroneous readings in one conditioned space by referencing readings in another.
Figure 29B:
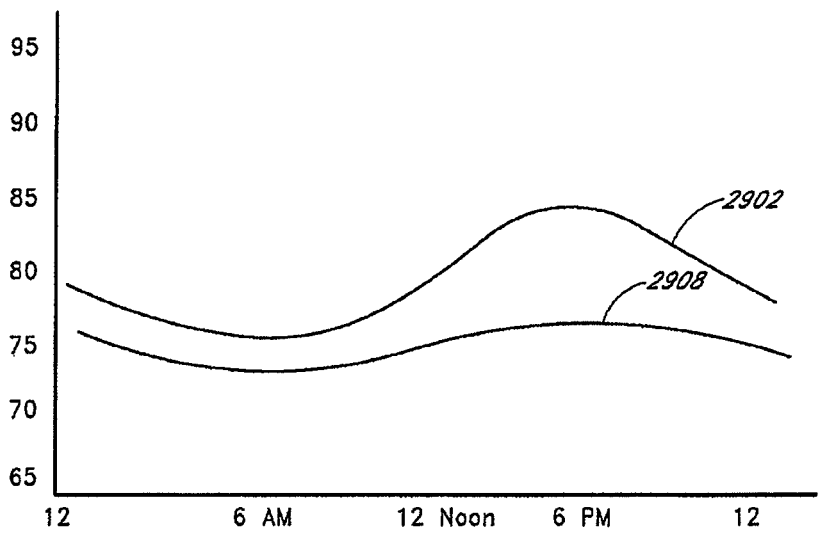

The system can also help compensate for anomalies such as measurement inaccuracies due to factors such as poor load control device location. It is well known that thermostats should be placed in a location that will be likely to experience "average" temperatures for the overall structure, and should be isolated from windows and other influences that could bias the temperatures they "see." But for various reasons, load control devices are likely to be used in locations that do not fit that ideal. The wall outlet most convenient for a given air window-mount conditioner, for example, is likely to be located on an outside wall, and either near the floor or high on the wall. As such, it will be likely to report temperature readings that are higher or lower than the temperature that would be reported by a properly located thermostat. FIG. 29a shows a graph of outside temperature 2902, the inside temperature as it would be reported by a properly located thermostat or load control device 2904, and inside temperature as read by the actual load control device 2906 in House C for a specific 24-hour period on September $15^{th}$, assuming that the load control device is located so that for part of the afternoon on that day the load control device is in direct sunlight. Until the sun hits the load control device, the "correct" inside temperature and temperature as read by the actual load control device track very closely. But when the direct sunlight hits the load control device, the load control device and the surrounding area can heat up, causing the internal temperature as read by the load control device to diverge significantly from the temperature elsewhere in the conditioned space. A conventional thermostat or load control device has no way of distinguishing this circumstance from a genuinely hot day, and will both over-cool the conditioned space and waste considerable energy when it cycles the air conditioner in order to reduce the temperature as sensed by the load control device. If the air conditioning is turned off, this phenomenon will manifest as a spike in temperature as measured by the load control device. If the air conditioner is turned on (and has sufficient capacity to respond to the distorted temperature signal caused by the sunlight), this phenomenon will likely manifest as relatively small changes in the temperature as sensed by the load control device, but significantly increased HVAC usage (as well as excessively lowered temperatures in the conditioned space, but this result may not be directly measured in a single-sensor environment). The subject invention, in contrast, has multiple mechanisms that will allow it to correct for such distortions. First, because the subject system compares the internal readings from conditioned space C with the external temperature, it will be obvious that the rise in temperature at 4:00 PM is not correlated with a corresponding change in outside temperature. Second, because the system is also monitoring the readings from the thermostat or load control device in nearby conditioned space D, which (as shown in FIG. 29b) is exposed to the same outside temperature 602, but has no sudden rise in measured internal afternoon temperature 2908, the system has further validation that the temperature increase is not caused by climatic conditions. And finally, because the system has monitored and recorded the temperature readings from the load control device in conditioned space C for each previous day, and has compared the changing times of the aberration with the progression of the sun, the system can distinguish the patterns likely to indicate solar overheating from other potential causes.

Figure 30:
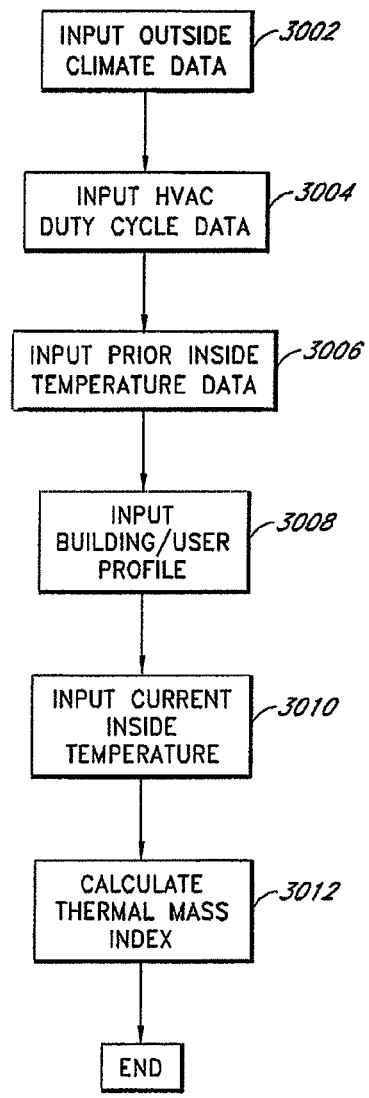
FIG. 30 is a flowchart illustrating the steps involved in calculating the effective thermal mass of a conditioned space using an embodiment of the subject invention.

FIG. 30 illustrates the steps involved in calculating comparative thermal mass, or the thermal mass index. In step 3002, the server retrieves climate data related to conditioned space X. Such data may include current outside temperature, outside temperature during the preceding hours, outside humidity, wind direction and speed, whether the sun is obscured by clouds, and other factors. In step 3004, the server retrieves air conditioner or heater duty cycle data for conditioned space X. Such data may include target settings set by the load control device 108 in current and previous periods, the timing of switch-on and switch-off events and other data. In step 3006, the server retrieves data regarding recent temperature readings as recorded by the load control device 108 in conditioned space X. In step 3008, the server retrieves profile data for conditioned space X. Such data may include square footage, when the structure was built and/or renovated, the extent to which it is insulated, its address, the make, model and age of the controlled heater or air conditioner, and other data. In step 3010, the server retrieves the current inside temperature reading as transmitted by the load control device. In step 3012, the server calculates the thermal mass index for the conditioned space under those conditions; that is, for example, it calculates the likely rate of change for internal temperature in conditioned space X from a starting point of 70 degrees when the outside temperature is 85 degrees at 3:00 PM on August $10^{th}$ when the wind is blowing at 5 mph from the north and the sky is cloudy. The server accomplishes this by applying a basic algorithm that weighs each of these external variables as well as variables for various characteristics of the conditioned space itself (such as size, level of insulation, method of construction, etc.) and data from other structures and environments.

Figure 31:
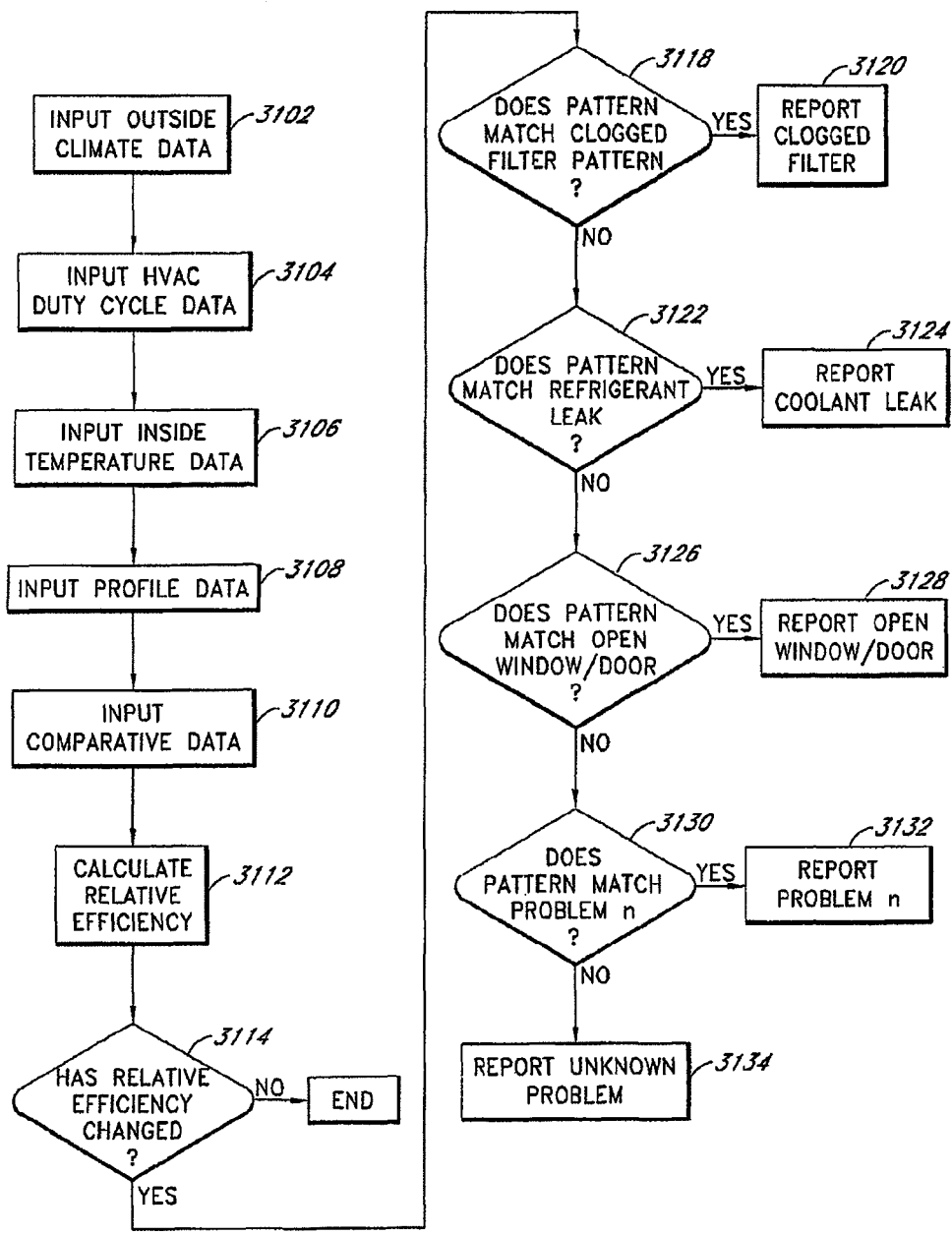
FIG. 31 is a flowchart illustrating the steps involved in determining whether an HVAC system has developed a problem that impairs efficiency using an embodiment of the subject invention.

FIG. 31 illustrates the steps involved in diagnosing defects in the air conditioner or heater for specific conditioned space X. In step 3102, the server retrieves climate data related to conditioned space X. Such data may include current outside temperature, outside temperature during the preceding hours, outside humidity, wind direction and speed, whether the sun is obscured by clouds, and other factors. In step 3104, the server retrieves heating or air conditioner duty cycle data for conditioned space X. Such data may include target settings set by the load control device in current and previous periods, the timing of switch-on and switch-off events and other data. In step 3106, the server retrieves data regarding current and recent temperature readings as recorded by the load control device in conditioned space X. In step 3108, the server retrieves profile data for conditioned space X. Such data may include square footage, when the house was built and/or renovated, the extent to which it is insulated, its address, the make, model and age of the attached heater or air conditioner, and other data. In step 3110, the server retrieves comparative data from other conditioned spaces that have thermostats or load control devices that also report to the server. Such data may include interior temperature readings, outside temperature for those specific locations, duty cycle data for the heaters and air conditioners systems at those locations, profile data for the structures and heating and air conditioners in those conditioned space and the calculated thermal mass index for those other conditioned spaces. In step 3112, the server calculates the current relative efficiency of the heater or air conditioner operating in conditioned space X as compared to the heaters and air conditioners operating in other conditioned spaces. Those comparisons will take into account differences in size, location, age, etc in making those comparisons.

The server will also take into account that comparative efficiency is not absolute, but will vary depending on conditions. For example, a conditioned space that has extensive south-facing windows is likely to experience significant solar gain. On sunny winter days, the heater in that conditioned space will probably appear more efficient than it does on cloudy winter days. The air conditioner in that same conditioned space will appear more efficient at times of day and year when trees or overhangs shade those windows than it will when summer sun reaches those windows. Thus the server will calculate efficiency under varying conditions.

In step 3114 the server compares the heater or air conditioner's efficiency, corrected for the relevant conditions, to its efficiency in the past. If the current efficiency is substantially the same as the historical efficiency, the server concludes 3116 that there is no defect and the diagnostic routine ends. If the efficiency has changed, the server proceeds to compare the historical and current data against patterns of changes known to indicate specific problems. For example, in step 3118, the server compares that pattern of efficiency changes against the known pattern for a clogged air filter, which is likely to show a slow, gradual degradation over a period of weeks or even months. If the pattern of degradation matches the clogged filter paradigm, the server creates and transmits to the user a message 3120 alerting the user to the possible problem. If the problem does not match the clogged filter paradigm, the system compares 3122 the pattern to the known pattern for a refrigerant leak, which is likely to show degradation over a period of a few hours to a few days. If the pattern of degradation matches the refrigerant leak paradigm, the server creates and transmits to the user a message 3124 alerting the user to the possible problem. If the problem does not match the refrigerant leak paradigm, the system compares 3126 the pattern to the known pattern for an open window or door, which is likely to show significant changes for relatively short periods at intervals uncorrelated with climatic patterns. If the pattern of degradation matches the open door/window paradigm, the server creates and transmits to the user a message 3128 alerting the user to the possible problem. If the problem does not match the refrigerant leak paradigm, the system continues to step through remaining know patterns N 3130 until either a pattern is matched 3132 or the list has been exhausted without a match 3134.

Figure 32:
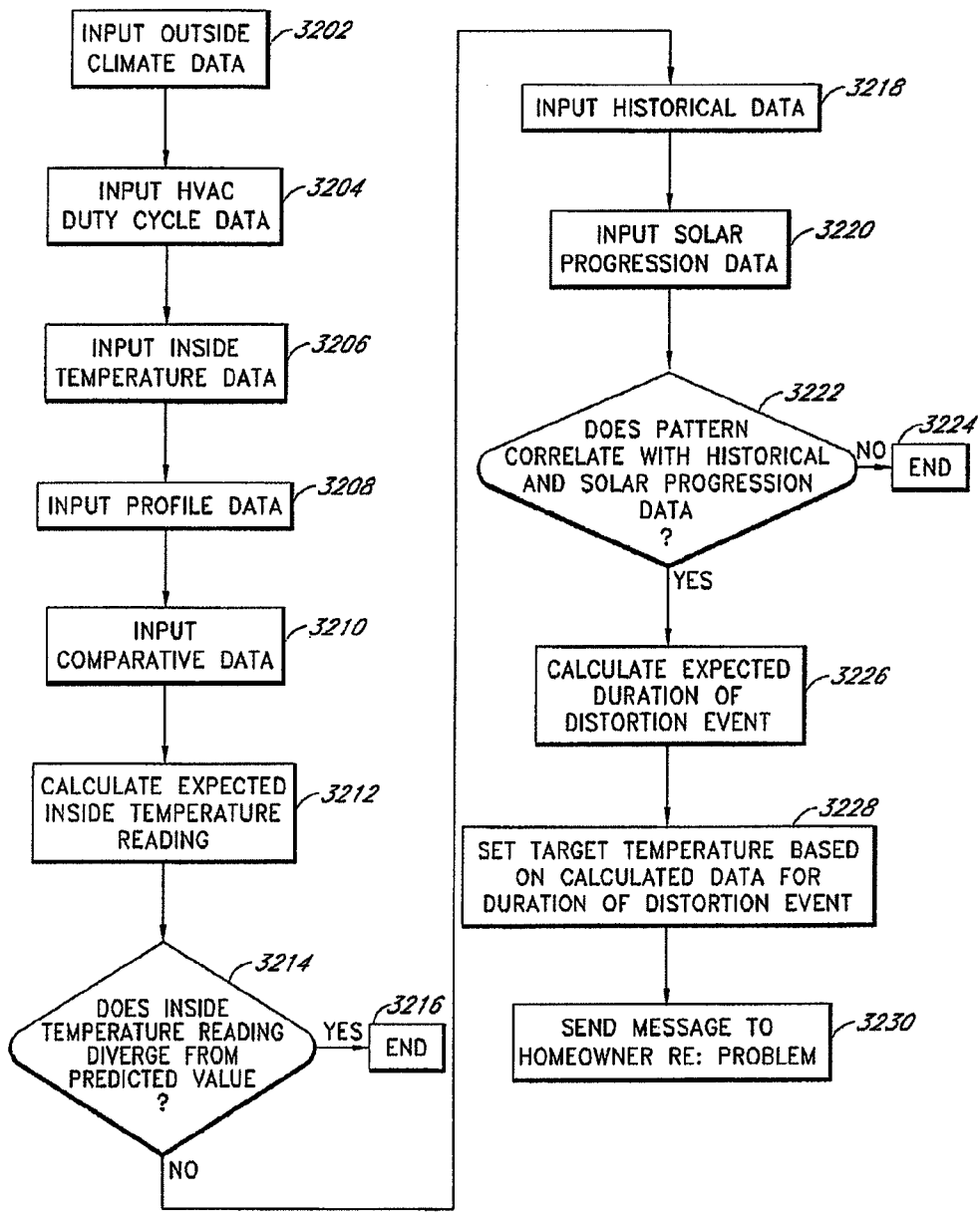
FIG. 32 is a flowchart illustrating the steps involved in correcting for erroneous readings in one conditioned space by referencing readings in another using an embodiment of the subject invention.

FIG. 32 illustrates the steps involved in diagnosing inaccurate temperature readings from load control device 108 due to improper location. In step 3202, the server retrieves climate data related to conditioned space X. Such data may include current outside temperature, outside temperature during the preceding, hours, outside humidity, wind direction and speed, whether the sun is obscured by clouds, and other factors. In step 3204, the server retrieves heater or air conditioner duty cycle data for conditioned space X. Such data may include target settings set by the load control device in current and previous periods, the timing of switch-on and switch-off events and other data. In step 3206, the server retrieves data regarding current and recent temperature readings as recorded by the load control device in conditioned space X. In step 3208, the server retrieves profile data for conditioned space X. Such data may include square footage, when the conditioned space was built and/or renovated, the extent to which it is insulated, its address, the make, model and age of the attached heater or air conditioner, and other data. In step 3210, the server retrieves comparative data from other conditioned spaces that have thermostats or load control devices that also report to the server. Such data may include interior temperature readings, outside temperature for those specific locations, duty cycle data for the associated heaters and air conditioners at those locations, profile data for the structures and heaters and air conditioners in those conditioned spaces and the calculated thermal mass index for those other conditioned space. In step 3212, the server calculates the expected temperature reading at the load control device based upon the input data. In step 3214, the server compares the predicted and actual values. If the calculated and actual values are at least roughly equivalent, the server concludes 3216 that there is no temperature-sensing-related anomaly. If the calculated and actual values are not roughly equivalent, the server retrieves additional historical information about past temperature readings in step 3218. In step 3220, the server retrieves solar progression data, i.e., information regarding the times at which the sun rises and sets on the days being evaluated at the location of the conditioned space being evaluated, and the angle of the sun at that latitude, etc. In step 3222, the server compares the characteristics of the anomalies over time, to see if, for example, abnormally high readings began at 3:06 on June $5^{th}$, 3:09 on June $6^{th}$, 3:12 on June $7^{th}$, and the solar progression data suggests that at the house being analyzed, that sun would be likely to reach a given place in that house three minutes later on each of those days. If the temperature readings do not correlate with the solar progression data, the server concludes 3224 that the sun is not causing the distortion by directly hitting the load control device. If the temperature readings do correlate with solar progression, the server then calculates 3226 the predicted duration of the distortion caused by the sun. In step 3228, the server calculates the appropriate setpoint information to be used by the load control device to maintain the desired temperature and correct for the distortion for the expected length of the event. For example, if the uncorrected setpoint during the predicted event is 72 degrees, and the sun is expected to elevate the temperature reading by eight degrees, the server may instruct the load control device to maintain a setpoint of 80 degrees during the duration of the distortion-causing event. In step 3230, the server sends the user a message describing the problem.

The instant invention may be used to implement additional energy savings by implementing small, repeated changes in setpoint. With simple temperature-controlled heaters and air conditioners (which are either on or off), energy consumption is directly proportional to setpoint—that is, the further a given setpoint diverges from the balance point (the natural inside temperature assuming no HVAC activity) in a given house under given conditions, the higher energy consumption will be to maintain temperature at that setpoint), energy will be saved by any strategy that over a given time frame lowers the average heating setpoint or raises the average cooling setpoint. It is therefore possible to save energy by adopting a strategy that takes advantage of human insensitivity to slow temperature ramping by incorporating a user's desired setpoint within the range of the ramp, but setting the average target temperature below the desired setpoint in the case of heating, and above it in the case of cooling. For example, a ramped summer setpoint that consisted of a repeated pattern of three phases of equal length set at 72° F., 73° F., and 74° F. would create an effective average setpoint of 73° F., but would generally be experienced by occupants as yielding equivalent comfort as in a room set at a constant 72° F. Energy savings resulting from this approach have been shown to be in the range of 4-6%.

The subject invention can automatically generate optimized ramped setpoints that save energy without compromising the comfort of the occupants. It would also be advantageous to create a temperature control system that could incorporate adaptive algorithms that could automatically determine when the ramped setpoints should not be applied due to a variety of exogenous conditions that make application of such ramped setpoints undesirable.

Figure 33:
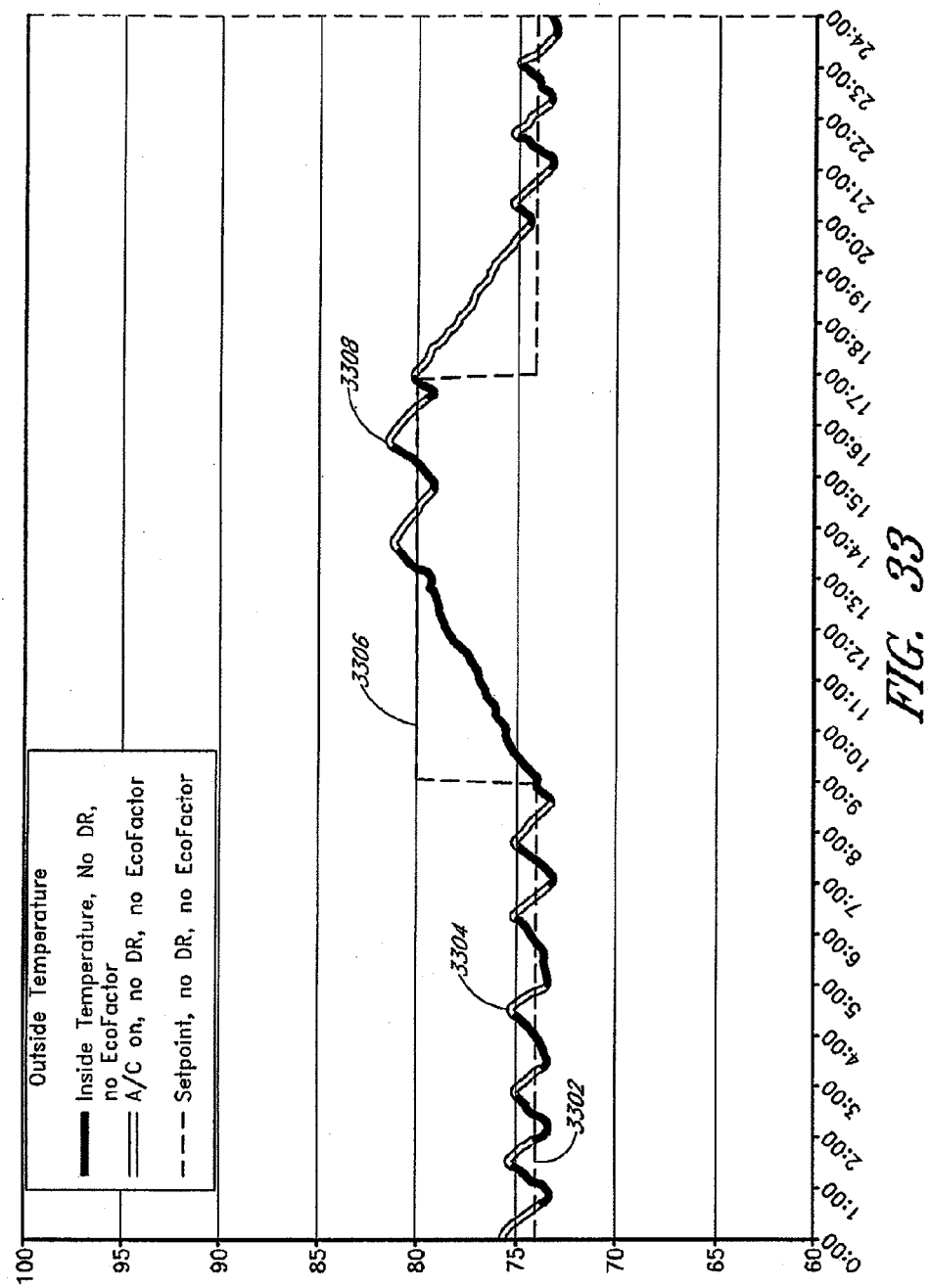
FIG. 33 shows the conventional programming of a programmable thermostat or load control device over a 24-hour period.

FIG. 33 represents the conventional programming of a thermostat or load control device controlling an air conditioner and the resulting temperatures inside a conditioned space. The morning setpoint 3302 of 74 degrees remains constant from midnight until 9:00 AM, and the inside temperature 3304 varies more or less within the limits of the hysteresis band of the thermostat or load control device during that entire period. When the setpoint changes to 80 degrees 3306, the inside temperature 3308 varies within the hysteresis band around the new setpoint, and so on. Whether the average temperature is equal to, greater or less than the nominal setpoint will depend on weather conditions, the dynamic signature of the structure, and the efficiency and size of the air conditioner. But in most cases the average temperature will be at least roughly equivalent to the nominal setpoint.

Figure 34:
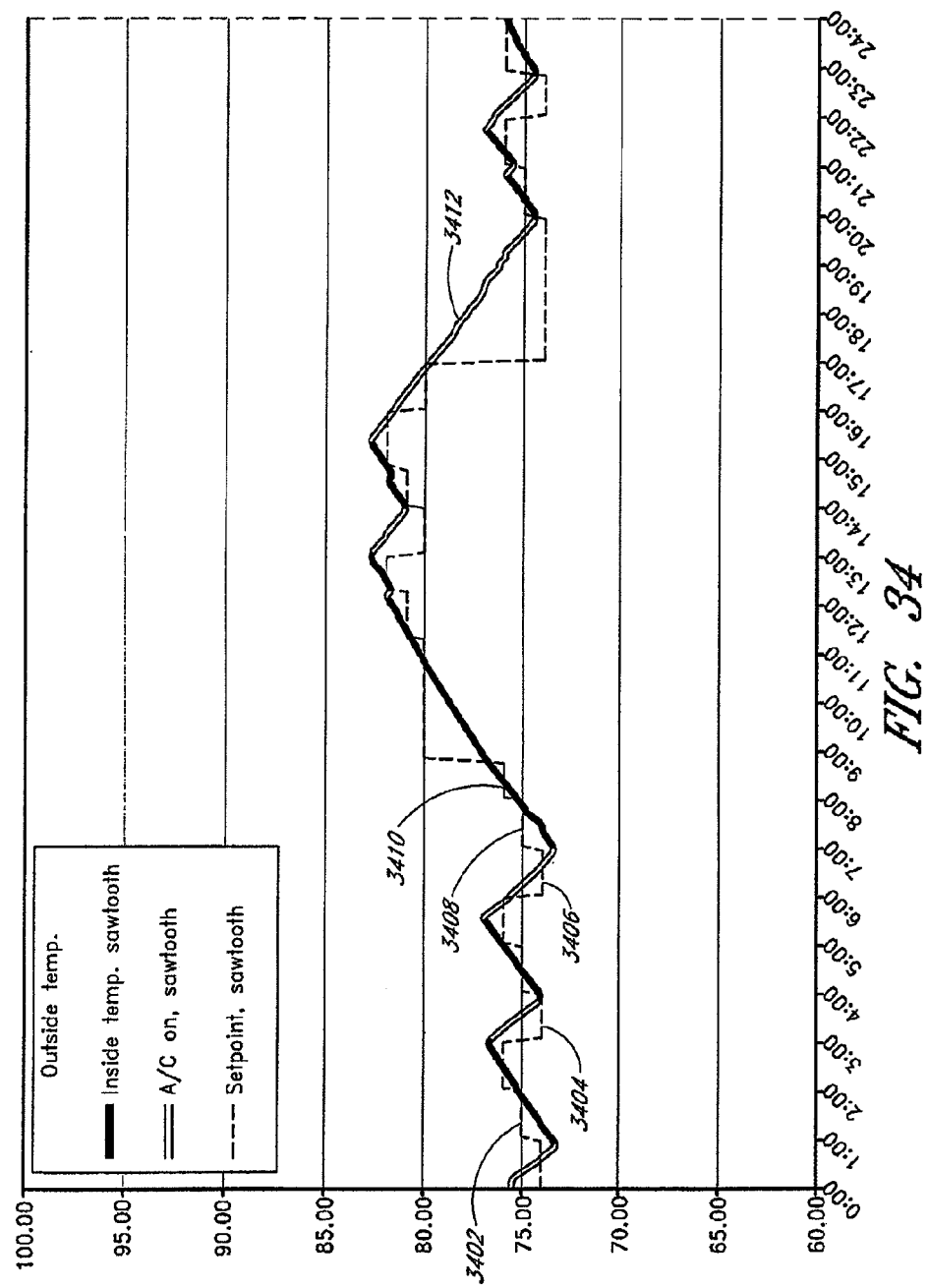
FIG. 34 shows the programming of a programmable thermostat or load control device over a 24-hour period using ramped setpoints.

FIG. 34 represents implementation of a three-phase ramped setpoint derived from the same user preferences as manifested by the settings shown in FIG. 33. Thus the user-selected setpoint for the morning is still 74 degrees, and is reflected in the setpoint 3404 at the start of each three-step cycle, but because (in the air conditioning context) the setpoint requested by the user is the lowest of the three discrete steps, rather than the middle step, the average setpoint will be one degree higher 3402, and the resulting average inside temperature will be roughly one degree warmer than the average temperature without use of the ramped setpoints, thereby saving energy.

In the currently preferred embodiment, the implementation of the ramped setpoints may be dynamic based upon both conditions inside the structure and other planned setpoint changes. Thus, for example, the ramped setpoints 3406, 3408 and 3410 may be timed so that the 9 AM change in user-determined setpoint from 74 degrees to 80 degrees is in effect anticipated, and the period in which the air conditioner is not used can be extended prior to the scheduled start time for the less energy-intensive setpoint. Similarly, because the server 106 is aware that a lower setpoint will begin at 5 PM, the timing can be adjusted to avoid excessively warm temperatures immediately prior to the scheduled setpoint change, which could cause noticeable discomfort relative to the new setpoint if the air conditioner is incapable of quickly reducing inside temperature on a given day based upon the expected slope of inside temperatures at that time 3412.

In order to implement such ramped setpoints automatically, algorithms may be created. These algorithms may be generated and/or executed as instructions on remote server 106 and the resulting setpoint changes can be transmitted to a given thermostat or load control device on a just-in-time basis or, if the load control device 108 is capable of storing future settings, they may be transferred in batch mode to such load control device. Basic parameters used to generate such algorithms include: the number of discrete phases to be used; the temperature differential associated with each phase; and the duration of each phase In order to increase user comfort and thus maximize consumer acceptance, additional parameters may be considered, including: time of day, outside weather conditions, recent history of manual inputs, and recent pre-programmed setpoint changes.

Time of day may be relevant because, for example, if the conditioned space is typically unoccupied at a given time, there is no need for perceptual programming. Outside weather is relevant because comfort is dependent not just on temperature as sensed by a thermostat or load control device, but also includes radiant differentials. On extremely cold days, even if the inside dry-bulb temperature is within normal comfort range, radiant losses due to cold surfaces such as single-glazed windows can cause subjective discomfort; thus on such days occupants may be more sensitive to ramping. Recent manual inputs (e.g., programming overrides) may create situations in which exceptions should be taken; depending on the context, recent manual inputs may either suspend the ramping of setpoints or simply alter the baseline temperature from which the ramping takes place.

Figure 35:
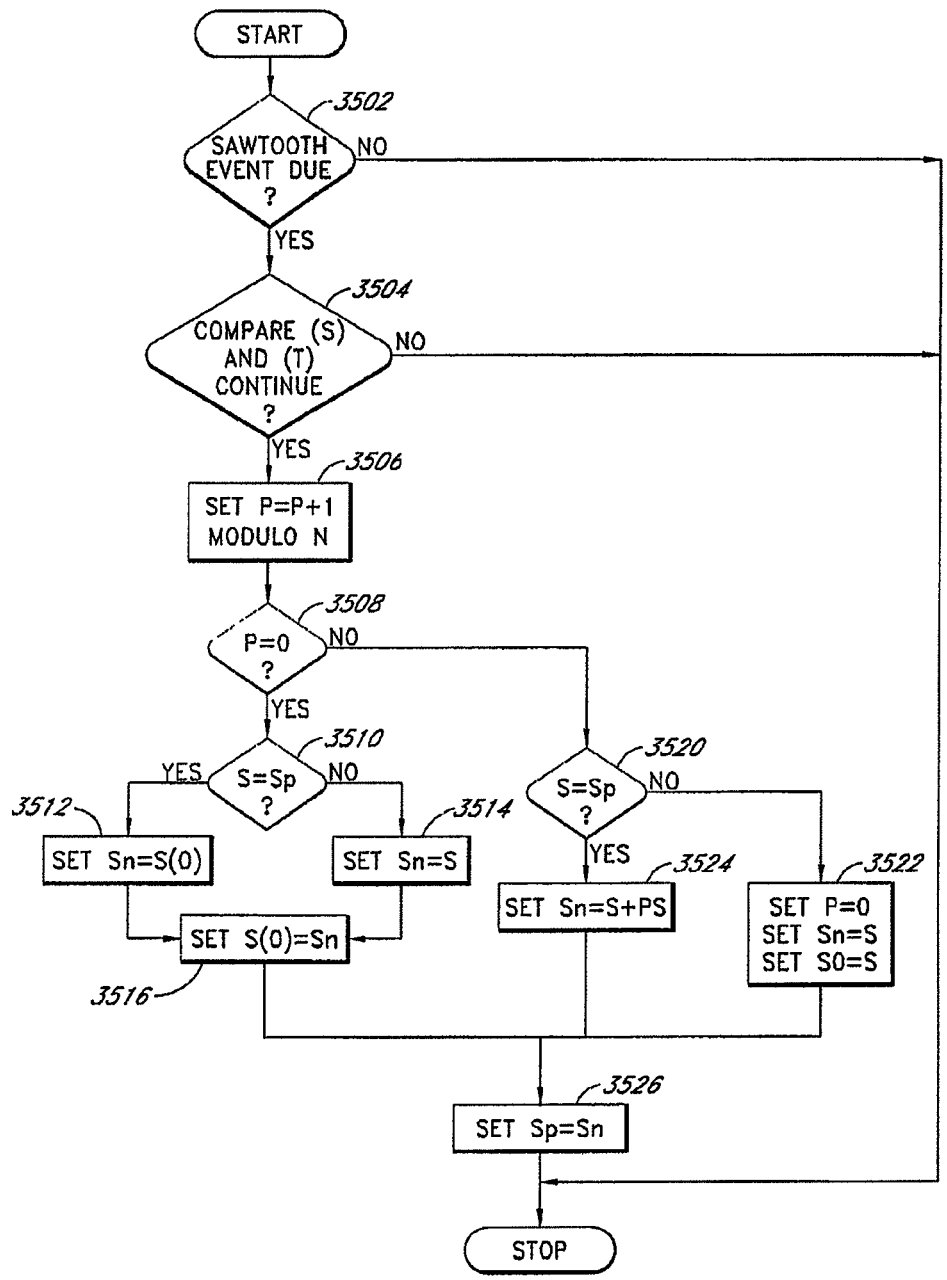
FIG. 35 shows the steps required for the core function of the ramped setpoint algorithm.

FIG. 35 shows the steps used in the core ramped setpoint algorithm in the context of a remotely managed system. In step 3502 the application determines whether to instantiate the algorithm based upon external scheduling criteria. In step 3504 the application running on a remote server retrieves from load control device 108 the data generated by or entered into the load control device, including current temperature settings, air conditioner or heater status and inside temperature. The algorithm performs preliminary logical tests at that point to determine whether further processing is required. For example, in the heating context, if the inside temperature as reported by the load control device 108 is more than 1 degree higher than the current setpoint, the algorithm may determine that running the ramped setpoint program will have no effect and therefore terminate. In step 3506 the algorithm advances to the next phase from the most recent phase; i.e., if the algorithm is just starting, the phase changes from "0" to "1"; if it has just completed the third phase of a three-phase ramp, the phase will change from "2" to "0". In step 3508 the application determines if the current phase is "0". If it is, then in step 1210 the algorithm determines whether current setpoint equals the setpoint in the previous phase. If so, which implies no manual overrides or other setpoint adjustments have occurred during the most recent phase, then in step 3512 the algorithm sets the new setpoint back to the previous phase "0" setpoint. If not, then in step 3514, the algorithm keeps the current temperature setting as setpoint for this new phase. In step 3516, the algorithm logs the resulting new setpoint as the new phase "0" setpoint for use in subsequent phases.

Returning to the branch after step 3508, if the current phase at that point is not phase "0", then in step 3520, the algorithm determines whether the current setpoint is equal to the setpoint temperature in the previous phase. If not, which implies setpoints have been adjusted by the house occupants, load control device schedules, or other events, then in step 3522, the application resets the phase to "0", resets the new setpoint associated with phase "0" to equal the current temperature setting, and sets the current setting to that temperature. Alternatively, if the current temperature setting as determined in step 3520 is equal to the setpoint in the previous phase, then in step 3524 new setpoint is made to equal current setpoint plus the differential associated with each phase change. In step 3526 the "previous-phase setpoint" variable is reset to equal the new setpoint in anticipation of its use during a subsequent iteration.

Figure 36:
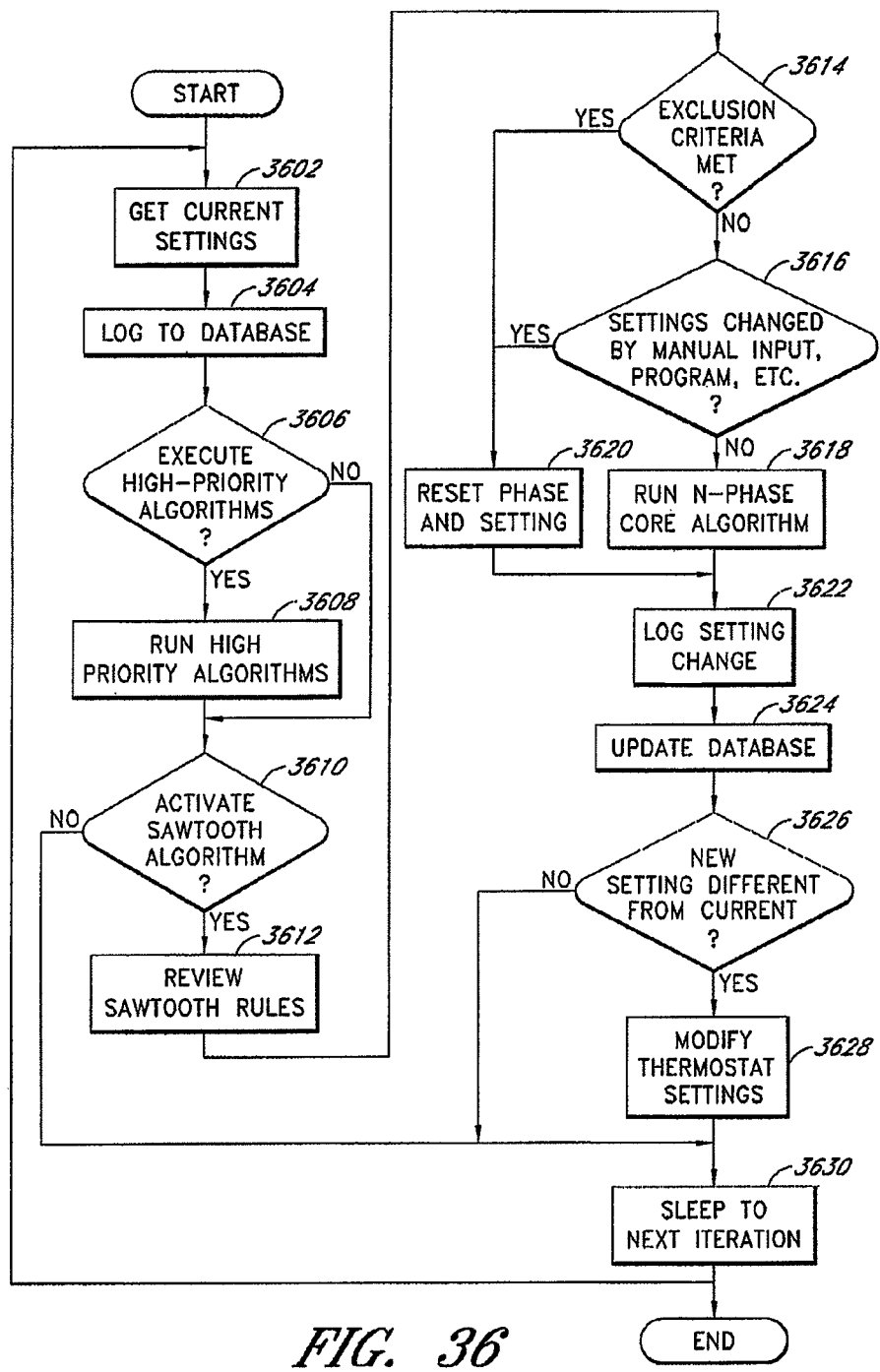
FIG. 36 shows a flowchart listing steps in the process of deciding whether to implement the ramped setpoint algorithm using an embodiment of the subject invention.

FIG. 36 shows one embodiment of the overall control application implementing the algorithm described in FIG. 35. In step 3602, the control application retrieves the current setting from the load control device. In step 3604, the setting is logged in database 300. In step 3606, the control program determines whether other algorithms that have higher precedence than the ramped setpoint algorithm are to be run. If another algorithm is to be run prior to the ramped setpoint algorithm, then the other program is executed in step 3608. If there are no alternate algorithms that should precede the ramped setpoint application then in step 1310, the control program determines whether the load control device has been assigned to execute the ramped setpoint program. If not, the control program skips the remaining actions in the current iteration. If the program is set to run, then in step 3612 the algorithm retrieves from database 300 the rules and parameters governing the implementation of the algorithm for the current application of the program.

In step 3614, the algorithm determines whether one or more conditions that preclude application of the algorithm, such as extreme outside weather conditions, whether the conditioned space is likely to be occupied, etc. If any of the exclusionary conditions apply, the application skips execution of the ramped setpoint algorithm for the current iteration. If not, the application proceeds to step 3616 in which the application determines whether the setpoint has been altered by manual overrides, setback schedule changes, or other algorithms as compared to the previous value as stored in database 300.

If the setpoint has been altered, the application proceeds to step 3620 discussed below. In step 3618, the program described in FIG. 35 is executed. In step 3620, the application resets the phase to "0". Certain temperature setting variables are reset in anticipation of their use in subsequent phases. These variables include the new phase 0 temperature setting which is anchored to the current actual temperature setting, and the new previous-phase setpoint which will be used for identifying setpoint overrides in the subsequent phase.

In step 3622, the system records the changes to the temperature settings to database 300. In step 3624, the system records the changes to the phase status of the algorithm to database 300. In step 3626, the application determines whether the new temperature setting differs from the current setting. If they are the same, the application skips applying changes to the load control device. If they are different, then in step 3628, the application transmits revised settings to the load control device. In step 3630, the application then hibernates for the specified duration until it is invoked again by beginning at step 3602 again.

Figure 37:
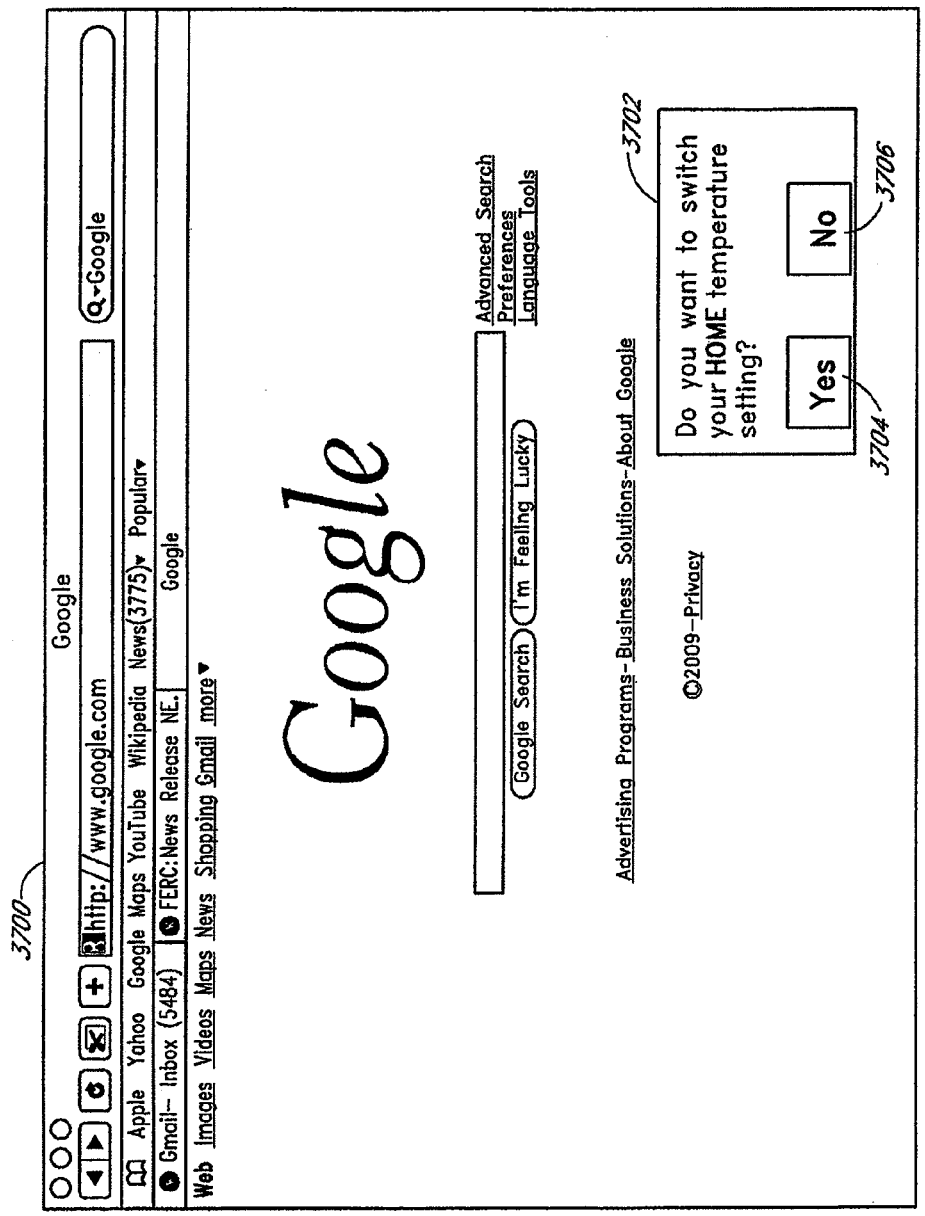
FIG. 37 shows the browser as seen on the display of the computer used as part of an embodiment of the subject invention.

The subject invention may also be used to detect occupancy through the use of software related to electronic devices located inside the conditioned structure, such as the browser running on computer or other device 104. FIG. 37 represents the screen of a computer or other device 104 using a graphical user interface connected to the Internet. The screen shows that a browser 3700 is displayed on computer 104. In one embodiment, a background application installed on computer 104 detects activity by a user of the computer, such as cursor movement, keystrokes or otherwise, and signals the application running on server 106 that activity has been detected. Server 106 may then, depending on context, (a) transmit a signal to load control device 108 changing setpoint because occupancy has been detected at a time when the system did not expect occupancy; (b) signal the background application running on computer 104 to trigger a software routine that instantiates a pop-up window 3702 that asks the user if the server should change the current setpoint, alter the overall programming of the system based upon a new occupancy pattern, etc. The user can respond by clicking the cursor on "yes" button 3704 or "No" button 3706. Equivalent means of signalling activity may be employed with interactive television programming, gaming systems, etc.

Figure 38:
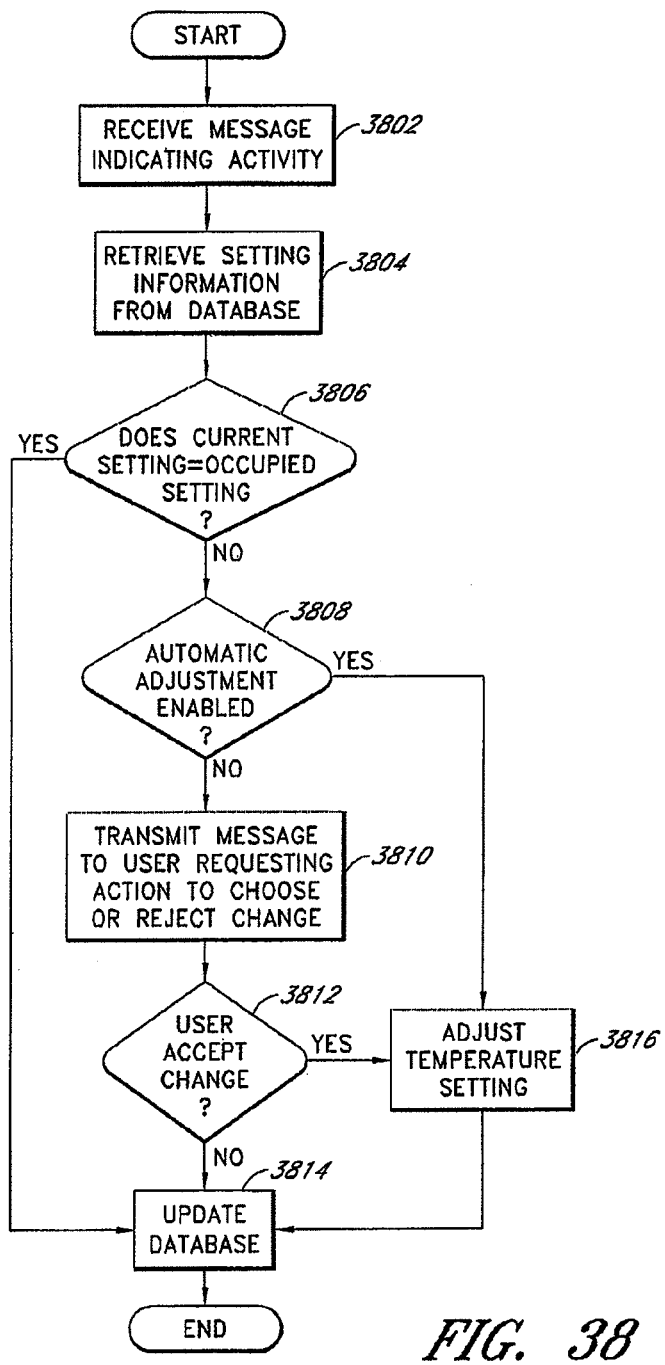
FIG. 38 is a flowchart showing the steps involved in the operation of one embodiment of the subject invention.

FIG. 38 is a flowchart showing the steps involved in the operation of one embodiment of the subject invention. In step 3802, computer 104 transmits a message to server 106 via the Internet indicating that there is user activity on computer 104. This activity can be in the form of keystrokes, cursor movement, input via a television remote control, etc. In step 3804 the application queries database 300 to retrieve setting information for the load control device. In step 3806 the application determines whether the current heating or air conditioning program is intended to apply when the conditioned space is occupied or unoccupied. If the settings then in effect are intended to apply for an occupied space, then the application terminates for a specified interval. If the settings then in effect are intended to apply when the conditioned space is unoccupied, then in step 3808 the application will retrieve from database 300 the user's specific preferences for how to handle this situation. If the user has previously specified (at the time that the program was initially set up or subsequently modified) that the user prefers that the system automatically change settings under such circumstances, the application then proceeds to step 3816, in which it changes the programmed setpoint for the load control device to the setting intended for the house when occupied. If the user has previously specified that the application should not make such changes without further user input, then in step 3810 the application transmits a command to computer 104 directing the browser to display a message informing the user that the current setting assumes an unoccupied space and asking the user in step 3812 to choose whether to either keep the current settings or revert to the pre-selected setting for an occupied space. If the user selects to retain the current setting, then in step 3814 the application will write to database 300 the fact that the users has so elected and terminate. If the user elects to change the setting, then in step 3816 the application transmits the revised setpoint to the load control device. In step 3814 the application writes the updated setting information to database 300.

Figure 39:
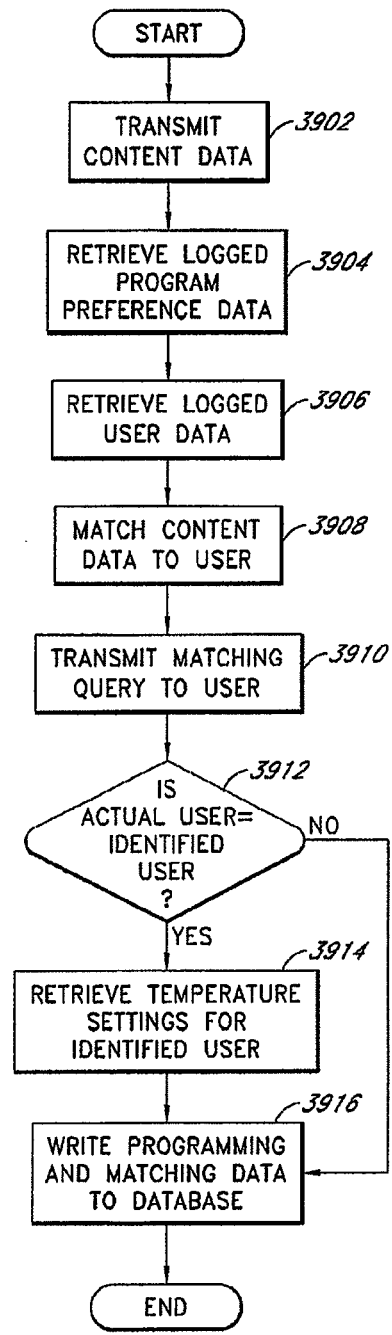
FIG. 39 is a flowchart that shows how an embodiment of the invention can be used to select different HVAC settings based upon its ability to identify which of multiple potential occupants is using the computer attached to the system.

FIG. 39 is a flowchart that shows how the invention can be used to select different heating and cooling settings based upon its ability to identify which of multiple potential occupants is using the computer attached to the system. In step 3902 computer 104 transmits to server 106 information regarding the type of activity detected on computer 104. Such information could include the specific program or channel being watched if, for example, computer 104 is used to watch television. The information matching, for example, TV channel 7 at 4:00 PM on a given date to specific content may be made by referring to Internet-based or other widely available scheduling sources for such content. In step 3904 server 106 retrieves from database 300 previously logged data regarding viewed programs. In step 3906 server 106 retrieves previously stored data regarding the occupants of the space. For example, upon initiating the service, one or more users may have filled out online questionnaires sharing their age, gender, schedules, viewing preferences, etc. In step 3908, server 106 compares the received information about user activity to previously stored information retrieved from database 300 about the occupants and their viewing preferences. For example, if computer 104 indicates to server 106 that the computer is being used to watch golf, the server may conclude that an adult male is watching; if computer 104 indicates that it is being used to watch children's programming, server 106 may conclude that a child is watching. In step 3910 the server transmits a query to the user in order to verify the match, asking, in effect, "Is that you, Bob?" In step 3912, based upon the user's response, the application determines whether the correct user has been identified. If the answer is no, then the application proceeds to step 3916. If the answer is yes, then in step 3914 the application retrieves the temperature settings for the identified occupant. In step 3916 the application writes to database 300 the programming information and information regarding matching of users to that programming.

In an alternative embodiment, the application running on computer 104 may respond to general user inputs (that is, inputs not specifically intended to instantiate communication with the remote server) by querying the user whether a given action should be taken. For example, in a system in which the computer 104 is a web-enabled television or web-enabled set-top device connected to a television as a display, software running on computer 104 detects user activity, and transmits a message indicating such activity to server 106. The trigger for this signal may be general, such as changing channels or adjusting volume with the remote control or a power-on event. Upon receipt by server 106 of this trigger, server 106 transmits instructions to computer 104 causing it to display a dialog box asking the user whether the user wishes to change heating or cooling settings.

While particular embodiments of the present invention have been shown and described, it is apparent that changes and modifications may be made without departing from the invention in its broader aspects and, therefore, the invention may carried out in other ways without departing from the true spirit and scope. These and other equivalents are intended to be covered by the following claims:

What is claimed is:

1. A system for controlling plug-in air conditioners and plug-in heaters comprising:
    at least one load control device at a first location, the load control device configured to connect to a first electrical outlet and to connect to a plug-in air conditioner or plug-in portable heater, the load control device located inside the space conditioned by the plug-in air conditioner or plug-in portable heater, the load control device further configured to control whether the plug-in air conditioner or the plug-in portable heater is "on" or "off", and wherein the load control device comprises at least one microprocessor that is configured to communicate over a computer network;
    one or more processors remotely located from the first location, wherein the one or more processors are configured to receive temperature measurements associated with the space conditioned by the plug-in air conditioner or plug-in portable heater, and receive measurements of outside temperatures associated with the first location,
    wherein the one or more processors are configured to calculate at least a first rate of change in temperature at said first location for periods during which the status of the plug-in air conditioner or plug-in portable heater is "on" and wherein said one or more processors are further configured to calculate at least a second rate of change in temperature at said first location for periods during which the status of the plug-in air conditioner or plug-in portable heater is "off",
    wherein the one or more processors are further configured to communicate operational control instructions to the microprocessor in the load control device via the computer network; and
    wherein the microprocessor, in the load control device, turns the plug-in air conditioner or the plug-in portable heater to "on" or "off" based on the operational instructions received from the one or more processors via the computer network.

2. The system of claim 1 wherein the load control device comprises a user interface.

3. The system of claim 1 wherein the one or more processors generate the operational control instructions based at least in part on the temperature measurements associated with the space conditioned by the plug-in air conditioner or the plug-in portable heater and based at least in part on the measurements of outside temperatures from at least one other source.

4. The system of claim 1 in which the plug-in air conditioner is mounted through an opening in a building envelope.

5. The system of claim 1 in which the plug-in portable heater is a space heater.

6. The system of claim 1 in which the load control device further measures the temperature of the space conditioned by the plug-in air conditioner or plug-in portable heater.

7. The system of claim 1 in which the load control device further measures at least one of the group consisting of the electrical current, and voltage passing through the load control device.

8. The system of claim 1 in which the load control device is configured to sense occupancy of the space conditioned by the plug-in air conditioner or plug-in portable heater.

9. The system of claim 1 in which the load control device is paired with a mobile device.

10. A system for controlling plug-in air conditioners and plug-in heaters comprising:
    at least one load control device at a first location, the load control device configured to connect to a first electrical outlet and to connect to a plug-in air conditioner or plug-in portable heater, the load control device located inside the space conditioned by the plug-in air conditioner or plug-in portable heater, the load control device further configured to control whether the plug-in air conditioner or the plug-in portable heater is "on" or "off", and wherein the load control device comprises at least one microprocessor that is configured to communicate over a computer network;
    one or more processors remotely located from the first location, wherein the one or more processors are configured to receive temperature measurements first source associated with the space conditioned by the plug-in air conditioner or plug-in portable heater, and receive measurements of outside temperatures associated with the first location, and wherein the one or more processors are further configured to communicate operational control instructions to the microprocessor in the load control device via the computer network, wherein the one or more processors generate the operational control instructions based at least in part on the location of a mobile device; and
    wherein the microprocessor, in the load control device, turns the plug-in air conditioner or the plug-in portable heater to "on" or "off" based on the operational instructions received from the one or more processors via the computer network.

11. A method for controlling plug-in air conditioners and plug-in heaters comprising:
    connecting at a first location, at least one load control device to a first electrical outlet and to a plug-in air conditioner or plug-in portable heater, the load control device located inside the space conditioned by the plug-in air conditioner or plug-in portable heater, the load control device further configured to control whether the plug-in air conditioner or the plug-in portable heater is "on" or "off", the load control device comprising at least a microprocessor that is configured to communicate over a computer network;

receiving temperatures associated with the space conditioned by the plug-in air conditioner or the plug-in portable heater at one or more processors remotely located from the first location;

receiving at the one or more processors, measurements of outside temperatures associated with the first location;

calculating with the one or more processors at least a first rate of change in temperature at said first location for periods during which the status of the plug-in air conditioner or plug-in portable heater is "on" and wherein said one or more processors are further configured to calculate at least a second rate of change in temperature at said first location for periods during which the status of the plug-in air conditioner or plug-in portable heater is "off";

receiving at the load control device, operational control instructions from the one or more processors via the computer network; and turning the plug-in air conditioner or the plug-in portable heater to "on" or "off" with the load control device based on the operational instructions received from the one or more processors via the computer network.

12. The method of claim 11 further comprising displaying a user interface on the load control device.

13. The method of claim 11 wherein the operational control instructions received from the one or more processors are based at least in part on the temperature measurements associated with the space conditioned by the plug-in air conditioner or the plug-in portable heater and based at least in part on measurements of outside temperatures obtained from the at least one other source.

14. The method of claim 11 in which the plug-in air conditioner is mounted through an opening in a building envelope.

15. The method of claim 11 in which the plug-in portable heater is a space heater.

16. The method of claim 11 further comprising measuring with the load control device, the temperature of the space conditioned by the plug-in air conditioner or plug-in portable heater with the load control device.

17. The method of claim 11 in which the load control device further measures at least one of the group consisting of electrical current, and voltage passing through the load control device.

18. The method of claim 11 in which the load control device further senses occupancy of the space conditioned by the plug-in air conditioner or plug-in portable heater.

19. The method of claim 11 further comprising pairing the load control device with a mobile device.

20. A method for controlling plug-in air conditioners and plug-in heaters comprising:

connecting at a first location, at least one load control device to a first electrical outlet and to a plug-in air conditioner or plug-in portable heater, the load control device located inside the space conditioned by the plug-in air conditioner or plug-in portable heater, the load control device further configured to control whether the plug-in air conditioner or the plug-in portable heater is "on" or "off", the load control device comprising at least a microprocessor that is configured to communicate over a computer network;

receiving temperatures associated with the space conditioned by the plug-in air conditioner or the plug-in portable heater at one or more processors remotely located from the first location;

receiving at the one or more processors, measurements of outside temperatures associated with the first location from at least one other source;

generating the operational control instructions based at least in part on the location of a mobile device;

receiving at the load control device, the operational control instructions from the one or more processors via the computer network; and turning the plug-in air conditioner or the plug-in portable heater to "on" or "off" with the load control device based on the operational instructions received from the one or more processors via the computer network.

* * * * *